(12) United States Patent
May et al.

(10) Patent No.: US 11,854,075 B1
(45) Date of Patent: Dec. 26, 2023

(54) SYSTEMS AND METHODS FOR END-TO-END CONSUMER LENDING AND FINANCING SOLUTIONS FOR THE CONSOLIDATION OF DEBT

(71) Applicant: The PNC Financial Services Group, Inc., Pittsburgh, PA (US)

(72) Inventors: Charles H. May, Pittsburgh, PA (US); Daniel Tallarico, Pittsburgh, PA (US); Jason Faybik, Pittsburgh, PA (US); Granville Wagner, Pittsburgh, PA (US); Roxanne Hutchinson, Pittsburgh, PA (US); Kelly Price, Pittsburgh, PA (US); Dejan Pujic, Broadview, OH (US); Rahul Deol Sinha, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 17/301,205

(22) Filed: Mar. 29, 2021

Related U.S. Application Data

(60) Provisional application No. 63/001,809, filed on Mar. 30, 2020.

(51) Int. Cl.
*G06Q 30/02* (2023.01)
*G06Q 30/06* (2023.01)
*G06Q 40/03* (2023.01)
*G06Q 30/0601* (2023.01)
*G06Q 30/0283* (2023.01)

(52) U.S. Cl.
CPC ......... *G06Q 40/03* (2023.01); *G06Q 30/0283* (2013.01); *G06Q 30/0641* (2013.01)

(58) Field of Classification Search
CPC .................................................. G06Q 40/025
USPC ..................................................... 705/35–45
See application file for complete search history.

(56) References Cited

U.S. PATENT DOCUMENTS

| | | | |
|---|---|---|---|
| 2007/0156552 A1* | 7/2007 | Manganiello | G06Q 40/00 705/35 |
| 2007/0265958 A1* | 11/2007 | Petralia | G06Q 40/06 705/38 |
| 2008/0103960 A1* | 5/2008 | Sweeney | G06Q 40/02 705/38 |
| 2012/0030095 A1* | 2/2012 | Marshall | G06Q 40/02 705/39 |
| 2016/0180452 A1* | 6/2016 | Caldwell | G06Q 20/227 705/35 |
| 2020/0387965 A1* | 12/2020 | Cella | G06N 3/08 |

OTHER PUBLICATIONS

*Match Grp., LLC v. Bumble Trading, Inc.*, No. 6:18-CV-00080-ADA, 2018 BL 539638 (W.D. Tex. Dec. 18, 2018).*

* cited by examiner

*Primary Examiner* — Robert R Niquette
(74) *Attorney, Agent, or Firm* — Buchanan Ingersoll & Rooney PC

(57) ABSTRACT

Embodiments of the systems and methods of using the same are configured to provide a financial solution product for customers seeking financing and advice for debt consolidation, home improvement, financing for school loans, finding the right credit card, and financing collateral. The systems and methods provide a means to dynamically calculate multiple financial solution products and present them to a user.

20 Claims, 100 Drawing Sheets

120
122
124
FIG. 5

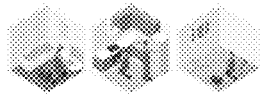
FIG. 6

What is the scope of the project?

152 — Cosmetic changes
Offers updates and changes without needing a permit. Items may include: flooring, counter tops, plumbing fixtures as appropriate, light fixtures, paint, and hardware. No new plumbing, electrical, cabinets, etc., are included. See less 154 — Typical Renovation
Involves mostly new work and materials, from the drywall to the fixtures. A permit is required. Items may include new electrical, some HVAC, insulation, drywall, texture, paint, cabinets, counter tops and plumbing fixtures as appropriate, flooring, trim work, and hardware. See less 156 — Down to the studs
Includes everything from the 'Typical Renovation' level, plus some interior structural rearrangement. Items may include new doors and windows, custom materials, longer lead times, and stretched job timelines. A permit is required. See less

▶ PNC CHOICE HOME EQUITY LINE OF CREDIT

Rates & Payments

▼ Why do we ask you?
Entering the fields below will help us find rate and payment options for you.

How much would you like to borrow?  ⟋ 201

Is this a secondary or a vacation home?
○ No   ● Yes

Do you have a mortgage or home equity loan/line on this home?
○ No   ● Yes  ——————————— 203

Do you plan to payoff the mortgage or home equity loan/line with this line? ●
○ No   ● Yes  ——————————— 205

Looking to consolidate debt?

We have a variety of products and tools to guide you down this path.

Use our Debt Consolidation Calculator    Learn about the Process of Consolidating Debt

  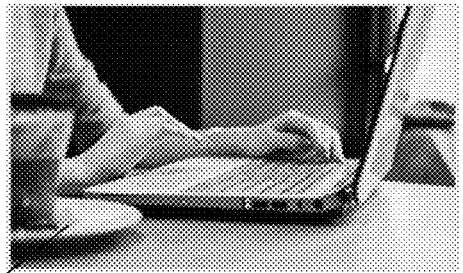

230                              232

PNC Products that help with debt consolidation:

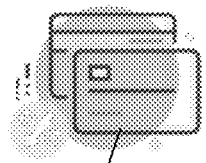  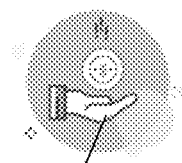  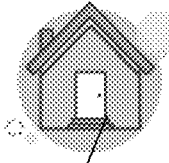  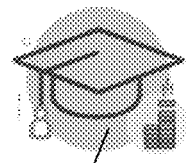

Browse low interest credit card | Get a person loan up to $35,000 | Own a home? Use your home's equity to consolidate debt. | Consolidate student debt with our Education Refinance Loan 234                236              238              240

468
Learn about finding the right car
Browse vehicle or compare different lending options.
Compare different auto lending options
Browse new and used vehicles
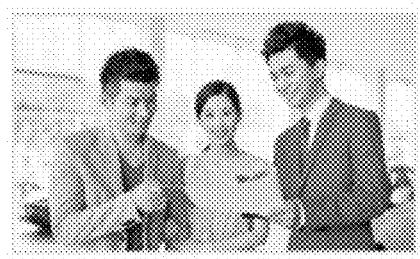
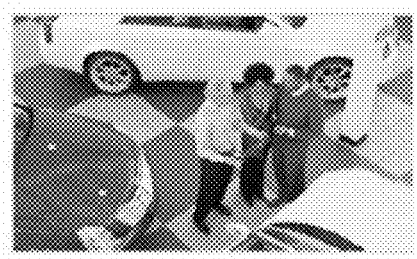
PNC Products for Auto Lending:
 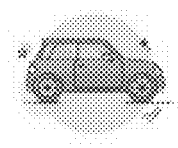 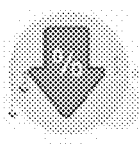 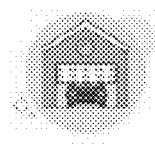 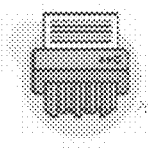
PNC Check Ready    PNC Total Auto    Refinance an Existing Auto Loan    Buying from a Private Party    Buying Out a Lease
470    472    474    476    478
FIG. 83

496

522

SYSTEMS AND METHODS FOR END-TO-END CONSUMER LENDING AND FINANCING SOLUTIONS FOR THE CONSOLIDATION OF DEBT

CROSS-REFERENCE TO RELATED APPLICATIONS

This application is related to and claims the benefit of U.S. Provisional Application No. 63/001,809, filed on Mar. 30, 2020, the entire contents of which is incorporated herein by reference.

FIELD OF THE INVENTION

Embodiments of the system and methods disclosed herein and of using the same are configured to provide a financial solution product for customers seeking financing and advice for debt consolidation, home improvement, financing for school loans, finding the right credit card, and/or financing collateral debt. The systems and methods disclosed herein provide a means to dynamically calculate multiple financial solution products and present them to a user in a manner that is convenient to understand and utilize.

BACKGROUND OF THE INVENTION

Trying to find the correct financial solution product can be complex, and to some, be an unpleasant experience. This may be especially so for individuals whom financing is uncharted territory. For instance, individuals are often forced to navigate a myriad of regulatory controls, tax implications, and financial vehicle offerings just to begin to understand the process. This is only compounded when individuals are trying to compare financial offerings that are not normalized (i.e., cannot be readily compared) and when individuals are trying to use the offered financial product to finance another complex project (e.g., a home improvement project). Such tasks rise to the level of capital budgeting that is usually reserved for accountants and financiers. Many individuals are simply too busy or unsophisticated to compile and analyze the vast amounts of information to make intelligent decisions about such financial products. Providing individuals with distilling information and access to such information that is tailored to their needs (as opposed to general, abstract, and sometimes obscure information) is largely left to the time-consuming process of speaking with a professional (e.g., a financer, an accountant, a lawyer, etc.).

The present invention is directed at overcoming one or more of the above-mentioned problems.

SUMMARY OF THE INVENTION

Systems and methods disclosed herein are designed to provide a dynamic approach to finding a financial solution product for an individual. The system receives inputs by a user and acquisitions data from a database and other third-party computer devices in communication with the system to provide a user with a comprehensive yet distilled presentation of different financial solution products. The resultant financial solution products are dynamically calculated, taking into account several factors including the updated inputs from the user and the updated data acquisitioned based on those inputs. In other words, the system is configured to provide up-to-date financial solution products and comparisons of the same in real-time. Without the methods and systems provided herein, a user would be required to compile disparate information from disparate sources, analyze and package the information, and present it in a comprehensible way. With all the information and disparate information sources involved, a large amount of time would be required to perform such a task (and that is assuming a user is sophisticated enough to perform such a task and has the means to access such information). The amount of time that is required renders this task impracticable. This is especially so in the fast paced world of financing, arbitrate, fluctuating rates, regulatory changes, etc. Thus, even if a user could perform such a task, the results they would come up with would be outdated. Furthermore, for individuals (e.g., non-corporate entities) seeking financing solutions for smaller projects (e.g., debt consolidation, home improvement, financing for school loans, finding the right credit card, refinancing debt, etc.), the overall cost of the project do not justify performing all of the work and/or the professional assistance to make the requisite capital budgeting assessments for finding an appropriate financial solution product. In other words, the costs of making an assessment outweigh the amount of financing trying to be obtained. Thus, even if a user could perform such a task and could perform it quickly enough so that the results would be up-to-date, the costs involved would outweigh the benefit of reviewing and selecting the best financial solution product. For these reasons, individuals tend to haphazardly select any financial solution product that will suffice. Embodiments of the systems and methods disclosed herein, however, alleviate these problems by providing a technical solution by which a computer system is able to dynamically calculate multiple financial solution products and present them to a user. The system further provides a means to quickly and accurately evaluate the various financial solution products, select an appropriate solution(s), and coordinate activities between parties to secure financing that is the best solution(s).

This is all done a fraction of the cost that would otherwise be required. This not only saves costs for the individual seeking financing, but also for the institutions that offer such products. Without the methods and systems disclosed herein, such institutions have to employ the professionals to make the assessments, keep them on-hand or on stand-by, and have access to the disparate information sources. Furthermore, such institutions have to expend the time and energy presenting and explaining the information in a meaningful and comprehendible way. Again, this tends to not be worth the cost of doing so when the finance solution is for smaller amounts that would be used for financing smaller projects. This is why such institutions merely provide general information with obscure literature. Yet, when using the present invention, reliance on these outdated and costly mechanisms is reduced or eliminated. A user can then approach the institution with a distilled list of financial solution products, the list comprising information that is comprehensible to the individual and that is robust enough for the institution to provide the requisite advice and financial vehicle to achieve the solution.

In this regard, the system provides a technical solution embodied in the way information is displayed via a computer system and how the computer system is interacted with by a user. The system achieves this via a specific interfacing and interactive platform that facilitates automatically acquisitioning and presenting the pertinent data based on a multitude of factors and variables. The concerted interaction and orchestrated operations allows a user to simultaneously delegate activities controlled by the host computer system and make quick, real-time assessments with minimal expenditure of time. As noted above, traditional financing planning is done via a static conversation with a professional or using some sort of a static calculator method. The disclosed system, however, provides much more fluid calculations and assessments that dynamically adjust based on many factors.

In an exemplary embodiment, the communication system includes a host system, a server, a database, and a communication network forming a centrally accessed platform. The communication system further includes a client device in communication with the host system. The host system is configured transmit data to the client device to generate a graphical user interface (GUI), the GUI being configured to provide at least one operating module to facilitate data entry to the host system and data retrieval from the host system via the client device. The at least one operating module is configured to generate a financial solution for any one or combination of borrowing money to consolidate debt, home remodeling and renovation projects, paying for college and student lending, finding the right credit card, and financing collateral debt.

In some embodiments, the financial solution includes a plurality of financial solution products presented to a user via the client device. In some embodiments, the plurality of financial solution products is presented as a side-by-side comparison. In some embodiments, the financial solution includes at least one financial solution product, and the at least one operating module is configured to generate a financial solution product application display, allowing a user of the client device to apply for the at least one financial solution product.

In some embodiments, the at least one operating module includes a home improvement module. In some embodiments, the home improvement module is programmed to utilize a home improvement calculator to determine a cost or estimated cost of a home improvement project. In some embodiments, the home improvement module is programmed to generate a home improvement cost estimate display, allowing a user to enter information regarding the home improvement project. In some embodiments, the information regarding the home improvement project includes whether the home improvement project is a renovation, an addition, or an expansion.

In some embodiments, the at least one operating module includes a debt consolidation module, a school loan module, a credit card module, and/or a financing module. In some embodiments, the debt consolidation module is programmed to utilize a debt consolidation calculator to determine a total amount of debt to be consolidated, the school loan module is programmed to utilize a student loan calculator to determine refinancing and/or new loan options, the credit card module is programmed to utilize a credit card calculator to determine credit card options, and the financing module is programmed to utilize a financing calculator to determine financing options. In some embodiments, the debt consolidation module is programmed to generate a debt consolidation calculator display, allowing a user to enter information regarding debt, the school loan module is programmed to generate a student loan calculator display, allowing a user to enter information regarding school loans, the credit card module is programmed to generate a find a right credit card calculator display, allowing a user to enter information regarding fining a credit card option, and the financing module is programmed to generate a financing calculator display, allowing a user to enter information regarding financing options. In some embodiments, the information regarding the debt includes total debt, the current monthly payments for the total debt, and the effective interest rate for the total debt, the information regarding the school loans includes total balance of the user's student loans, the current student loan monthly payments, and the interest rate across all of the user's student loans, the information regarding finding a credit card option includes primary use information, and the information regarding financing options includes vehicle information related to the financing. In some embodiments, the information regarding the debt includes itemized debt, the current monthly payments for the itemized debt, and the effective interest rate for the itemized debt.

In an exemplary embodiment, the method for providing a centrally accessed platform for providing financial solution products involves forming a centrally accessed platform comprising a host system, a server, a database, and a communication network. The method further involves placing a client device in communication with the host system. The method further involves transmitting data from the host system to the client device to generate a graphical user interface (GUI), the GUI being configured to provide at least one operating module to facilitate data entry to the host system and data retrieval from the host system via the client device. The method further involves generating a financial solution via the at least one operating module, the financial solution being for any one or combination of borrowing money to consolidate debt, home remodeling and renovation projects, paying for college and student lending, finding the right credit card, and financing collateral debt.

In some embodiments, the financial solution includes a plurality of financial solution products presented to a user via the client device. In some embodiments, the plurality of financial solution products is presented as a side-by-side comparison. In some embodiments, the financial solution includes at least one financial solution product, and the at least one operating module generates a financial solution product application display, allowing a user of the client device to apply for the at least one financial solution product.

In some embodiments, the at least one operating module includes a home improvement module, a debt consolidation module, a school loan module, a credit card module, and/or a financing module. In some embodiments, the home improvement module utilizes a home improvement calculator to determine a cost or estimated cost of a home improvement project. The debt consolidation module utilizes a debt consolidation calculator to determine a total amount of debt to be consolidated. The school loan module utilizes a student loan calculator to determine refinancing and/or new loan options. The credit card module utilizes a credit card calculator to determine credit card options. The credit card module utilizes a credit card calculator to determine credit card options. In some embodiments, the home improvement module generates a home improvement cost estimate display, allowing a user to enter information regarding the home improvement project. The debt consolidation module generates a debt consolidation calculator display, allowing a user to enter information regarding debt. The school loan module generates a student loan calculator display, allowing a user to enter information regarding school loans. The credit card module generates a find a right credit card calculator display, allowing a user to enter information regarding fining a credit card option. The financing module generates a financing calculator display, allowing a user to enter information regarding financing options.

In an exemplary embodiment, a communication system includes a host system, a server, a database, and a communication network forming a centrally accessed platform. The system includes a client device in communication with the host system. The host system is configured transmit data to the client device to generate a graphical user interface (GUI), the GUI being configured to provide an operating module to facilitate data entry to the host system and data retrieval from the host system via the client device. The operating module is configured to generate a financial solution for borrowing money to consolidate debt.

In some embodiments, the financial solution includes a plurality of financial solution products presented to a user via the client device.

In some embodiments, the plurality of financial solution products is presented as a side-by-side comparison.

In some embodiments, the financial solution includes a financial solution product. The operating module is configured to generate a financial solution product application display, allowing a user of the client device to apply for the financial solution product.

In some embodiments, the operating module include a debt consolidation module.

In some embodiments, the debt consolidation module is programmed to provide a user an option to itemize debts.

In some embodiments, the operating module is configured to generate an itemized debt table.

In some embodiments, the operating module is configured to generate an itemized debt confirmation window.

In some embodiments, the itemized debt confirmation window includes a debt summary table and an expected payoff date and the overall interest a user will pay if the user makes the monthly payments to satisfy the total debt.

In some embodiments, the debt consolidation module is programmed to utilize a debt consolidation calculator to determine a total amount of debt to be consolidated.

In some embodiments, the debt consolidation module is programmed to generate a debt consolidation calculator display, allowing a user to enter information regarding debt.

In some embodiments, the information regarding the debt includes total debt, the current monthly payments for the total debt, and the effective interest rate for the total debt.

In some embodiments, the information regarding the debt includes itemized debt, the current monthly payments for the itemized debt, and the effective interest rate for the itemized debt.

In an exemplary embodiment, a method for providing a centrally accessed platform for providing financial solution products involves forming a centrally accessed platform comprising a host system, a server, a database, and a communication network. The method involves placing a client device in communication with the host system. The method involves transmitting data from the host system to the client device to generate a graphical user interface (GUI), the GUI being configured to provide an operating module to facilitate data entry to the host system and data retrieval from the host system via the client device. The method involves generating a financial solution via the operating module, the financial solution being for borrowing money to consolidate debt.

In some embodiments, the financial solution comprises a plurality of financial solution products presented to a user via the client device.

In some embodiments, the plurality of financial solution products is presented as a side-by-side comparison.

In some embodiments, the financial solution includes at least one financial solution product. The operating module generates a financial solution product application display, allowing a user of the client device to apply for the financial solution product.

In some embodiments, the operating module includes a debt consolidation module.

In some embodiments, the debt consolidation module utilizes a debt consolidation calculator to determine a total amount of debt to be consolidated.

In some embodiments, the debt consolidation module generates a debt consolidation calculator display, allowing a user to enter information regarding debt.

In an exemplary embodiment, a communication system can include a host system, a server, a database, and a communication network forming a centrally accessed platform. The system can include a client device in communication with the host system, and a loan officer device in communication with the host system. The host system is configured transmit data to the client device to generate a graphical user interface (GUI), the GUI being configured to provide an operating module to facilitate data entry to the host system and data retrieval from the host system via the client device, the data including a total consolidated debt comprising a plurality of debts held by the user. The operating module includes a debt consolidation module and is configured to generate a financial solution for borrowing money to consolidate the debts, the financial solution comprising a plurality of financial solution products presented to a user via the client device. The operating module is configured to generate an itemized debt table including the plurality of debts and the plurality of financial solution products. The operating module is configured to allow a user to select at least one financial solution product from the plurality of financial solution products. The operating module is configured to generate, for each of the selected financial solution products, an itemized debt confirmation window that includes a debt summary table, an expected payoff date, and the overall interest a user will pay if the user makes the monthly payments to satisfy the total consolidated debt. The operating module is configured to generate a financial solution product application display, allowing a user of the client device to apply for any one or combination of the selected financial solution products within the itemized debt confirmation window by transmitting details of the any one or combination of the selected financial solution product to a loan officer device.

In some embodiments, the debt consolidation module is programmed to provide a user an option to enter the plurality of debts as a whole debt amount.

In some embodiments, the debt consolidation module is programmed to provide a user an option to enter the plurality of debts as itemized debt amounts.

In some embodiments, the debt consolidation module is programmed to generate an itemized debt window to assist a user with entering the plurality of debts as itemized debt amounts by providing a loan type drop-down box, allowing a user to select a loan type and enter an associated debt amount for the loan type, an associated annual percentage rate for the loan type, and an associated monthly payment for the loan type.

In some embodiments, the itemized debt window includes an X icon configured to allow a user to delete any one or combination of loan types.

In some embodiments, the debt consolidation module is programmed to utilize a debt consolidation calculator to determine a total amount of debt to be consolidated.

In some embodiments, the itemized debt confirmation window includes a calculated total debt amount, a calculated monthly payment for the calculated total debt amount, and a calculated effective interest rate for the calculated total debt amount.

In some embodiments, the plurality of financial solution products is presented as a side-by-side comparison.

In some embodiments, the side-by-side comparison includes a "goal" criteria selector, the criteria including paying off debt more quickly and/or minimizing monthly payments. The goal criteria selector, when actuated, reconfigures the side-by-side comparison in accordance with the goal criteria.

In some embodiments, the side-by-side comparison is in tabular format.

In some embodiments, the side-by-side comparison is in graphical format.

In some embodiments, the graphical format includes an interactive line graph.

In some embodiments, the interactive line graph is configured to generate a text box when a curser is hovered over the line.

In an exemplary embodiment, a method for providing a centrally accessed platform for providing financial solution products involves forming a centrally accessed platform comprising a host system, a server, a database, and a communication network. The method involves placing a client device in communication with the host system. The method involves placing a loan officer device in communication with the host system. The method involves transmitting data from the host system to the client device to generate a graphical user interface (GUI), the GUI being configured to provide an operating module to facilitate data entry to the host system and data retrieval from the host system via the client device, the data including a total consolidated debt comprising a plurality of debts held by the user. The method involves generating a financial solution for borrowing money to consolidate the debts, the financial solution comprising a plurality of financial solution products presented to a user via the client device. The method involves generating an itemized debt table including the plurality of debts and the plurality of financial solution products. The method involves allowing a user to select at least one financial solution product from the plurality of financial solution products. The method involves generating, for each of the selected financial solution products, an itemized debt confirmation window that includes a debt summary table, an expected payoff date, and the overall interest a user will pay if the user makes the monthly payments to satisfy the total consolidated debt. The method involves generating a financial solution product application display, allowing a user of the client device to apply for any one or combination of the selected financial solution products within the itemized debt confirmation window by transmitting details of the any one or combination of the selected financial solution product to a loan officer device.

The method can further involve providing a user an option to enter the plurality of debts as a whole debt amount.

The method can further involve providing a user an option to enter the plurality of debts as itemized debt amounts.

The method can further involve generating an itemized debt window to assist a user with entering the plurality of debts as itemized debt amounts by providing a loan type drop-down box, allowing a user to select a loan type and enter an associated debt amount for the loan type, an associated annual percentage rate for the loan type, and an associated monthly payment for the loan type.

The method can further involve utilizing a debt consolidation calculator to determine a total amount of debt to be consolidated.

The method can further involve presenting the plurality of financial solution products as a side-by-side comparison.

The method can further involve presenting the side-by-side comparison in a tabular format and/or a graphical format.

Various other objects, aspects and advantages of the present disclosure can be obtained from a study of the specification, the drawings, and the appended claims.

BRIEF DESCRIPTION OF THE DRAWINGS

Further possible embodiments are shown in the drawings. The present invention is explained in the following in greater detail as an example, with reference to exemplary embodiments depicted in the drawings. It should be appreciated that like reference numbers used in the drawings may identify like components. In the drawings:

FIGS. 5-10 show exemplary home improvement cost estimate displays that can be displayed via an embodiment of the system.

FIGS. 13-15 show exemplary home improvement cost estimate displays configured to allow a user to select the scope of improvement being conducted.

FIGS. 18-20 show exemplary home improvement cost estimate displays configured to providing a user with the estimated cost of the home improvement project.

FIGS. 27-34 show exemplary home equity financing option displays for a calculated home improvement cost estimate and associated home improvement project.

FIG. 35 shows an exemplary debt consolidation application display.

FIG. 36 shows an exemplary debt consolidation landing page.

FIGS. 40-42 show exemplary debt consolidation option result displays illustrating consolidation option results computed by the system.

Figure 56:
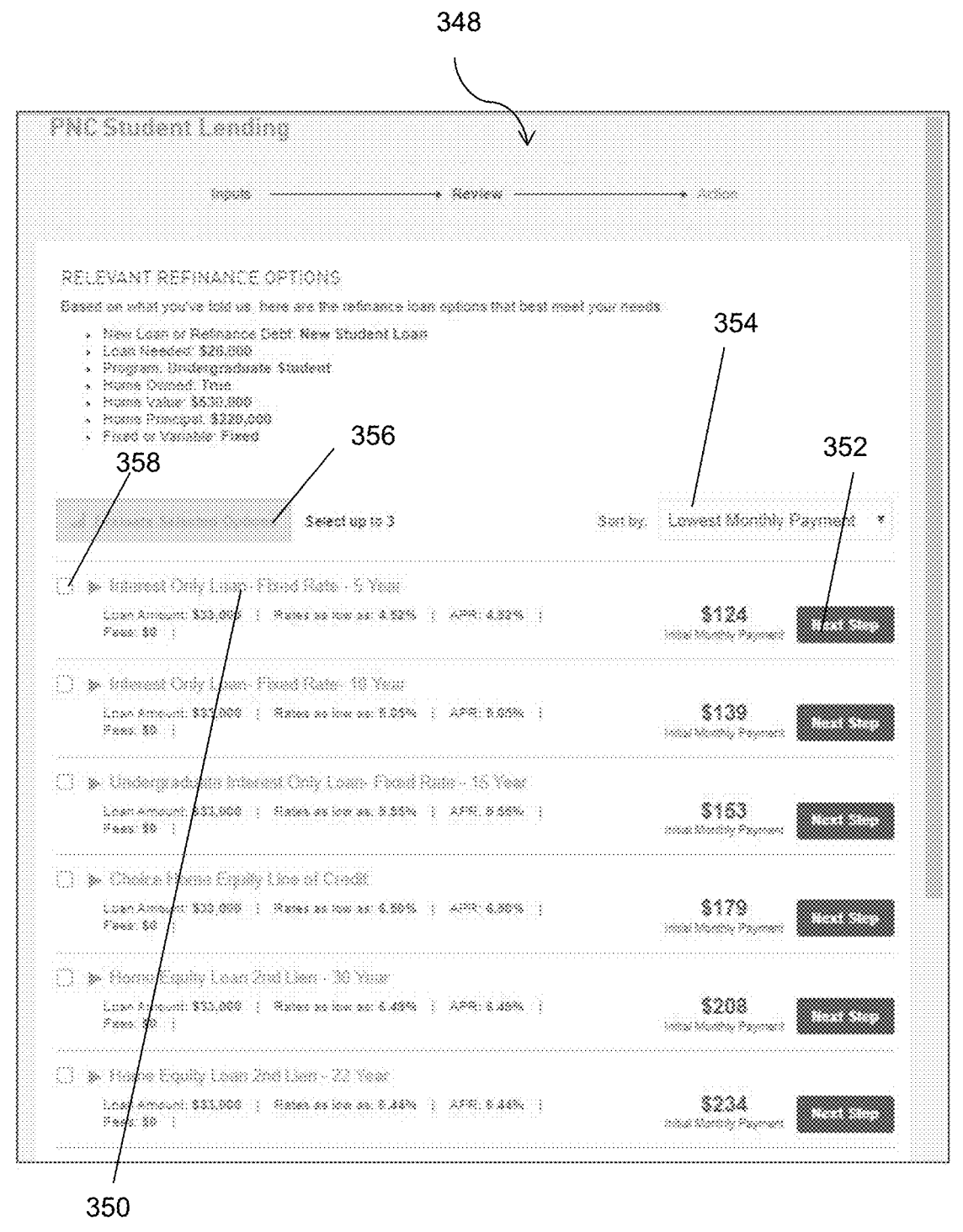

FIGS. 56-60 show an exemplary student loan option result display.

FIG. 83 shows an exemplary financing landing page.

DETAILED DESCRIPTION OF THE INVENTION

Exemplary Network and Computer System Architectures

Figure 1:
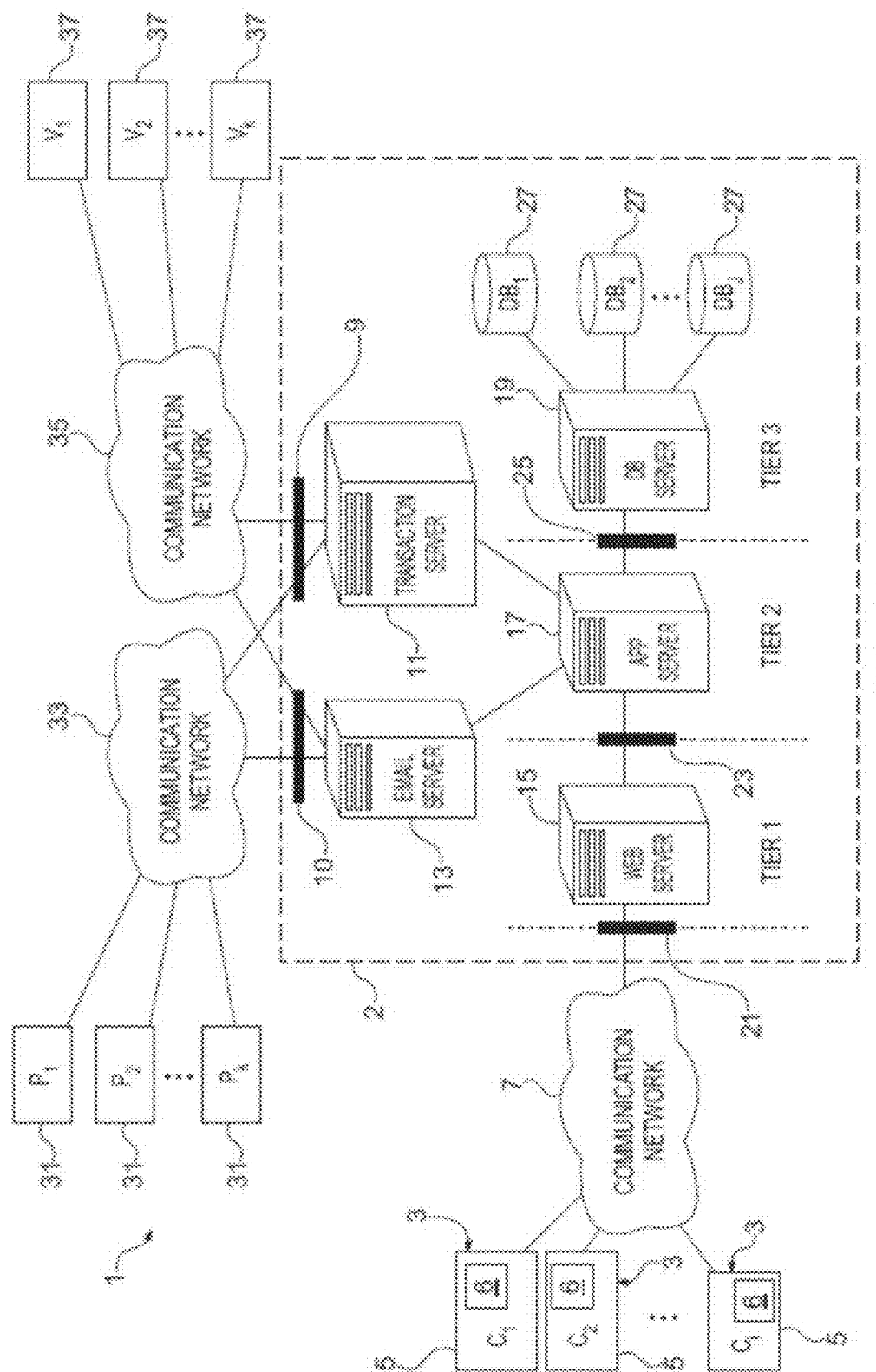
FIG. 1 illustrates exemplary network architecture for various exemplary embodiments of the present disclosure.
Figure 2:
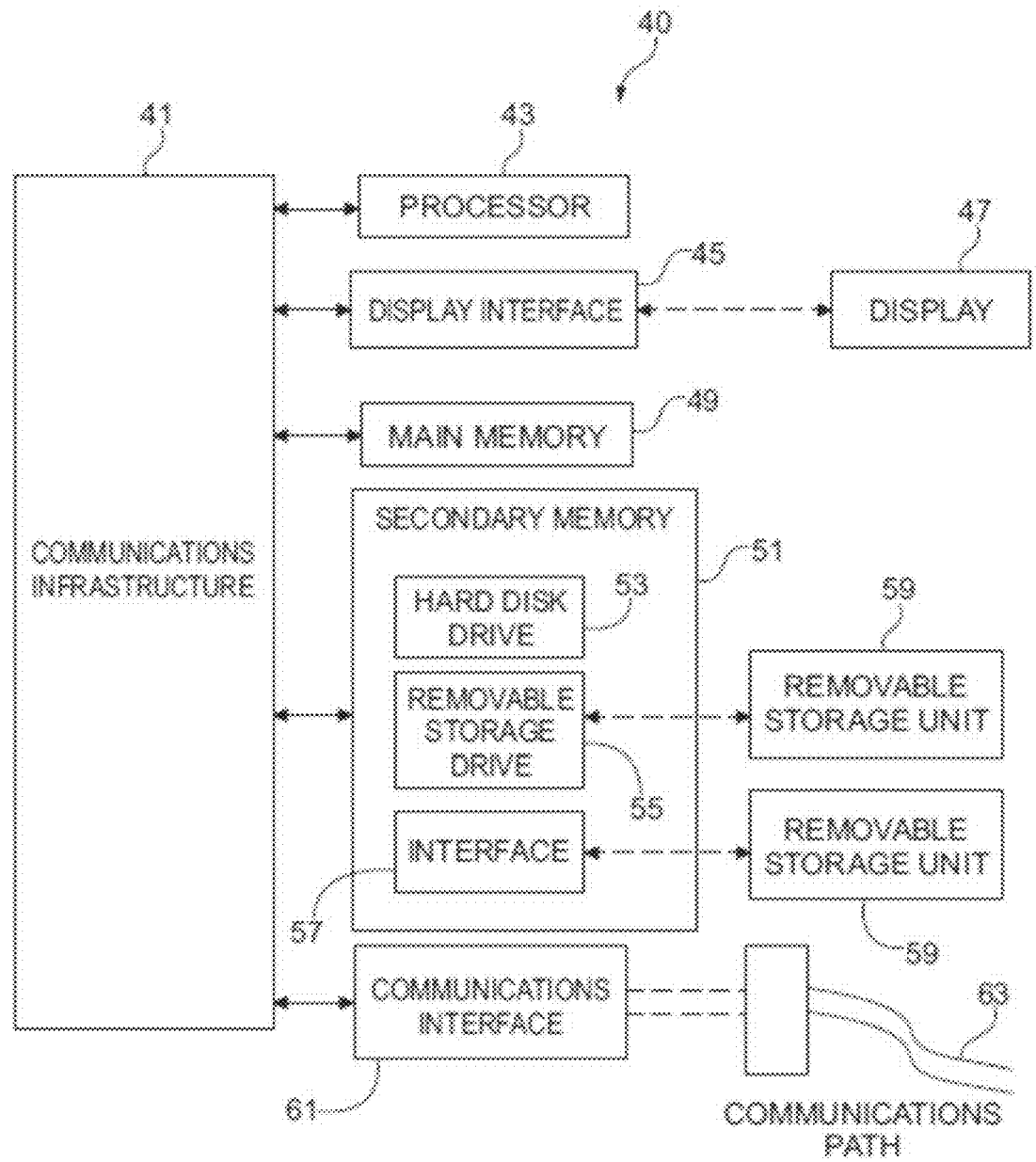
FIG. 2 depicts an example computer system in which embodiments of the present invention may be implemented.

FIGS. 1 and 2 illustrate a network architecture and computer system, respectively, that can be used to carry out any of the methods and process steps disclosed herein.

FIG. 1 illustrates a system 1 according to embodiments of the present disclosure. As shown in FIG. 1, the system 1 includes a host system 2 in communication with one or more client devices $C_1, C_2, \ldots, C_i$3 (may also referred to as a "client 3") via a communications network 7. Any one or combination of the clients 3 can be a computer device such as a personal computer (PC), an electronic tablet, a smart phone, an internet appliance, or other type of computer device that can include at least one processor connected to at least one non-transitory memory and at least one transceiver unit. The processor can be any type of hardware processor element such as a microprocessor, a controller, a microcontroller, a central processing unit, etc. The non-transitory memory can be any type of memory storage unit such as flash memory, a hard drive, other type of memory storage device, etc. The transceiver unit can be any type of transceiver system that can include a transceiver configured for wireless communications and/or a transceiver configured for wired communications with one or more other communication devices such as, for example, base stations, routers, other type of communication nodes, etc. The communications network 7 can be the Internet, although it will be appreciated that any public or private communication network, using wired or wireless channels, suitable for enabling the electronic exchange of information between one or more clients 3 and the host system 2 may be utilized.

It is contemplated for the host system 2 to be implemented by an institution, such as for example, a financial institution, and be configured to provide network-based product and service features to users (e.g., customers of the institution that access the host system 2) associated with the clients 3. A user of the system 1 can be a customer or an administrator. The customers can be individual customers accessing the host system 2 via a client device 3. Administrators of the host system 2 can also access the host system 2 via a client device 3. The system 1 can also be configured to communicate with other parties (e.g., loan officers, finance officers, application officers, credit card specialists, etc.) via other devices 3.

The clients 3 can include any form of mobile or portable network-enabled computing device configured to transmit and receive information via the communications network 7 using wired or wireless connections. Clients 3 are capable of receiving user input via an input device 6. The input device 6 may be one or more of a touch-sensitive display such as a touch screen interface, a keyboard, a microphone, or a pointing device such as a mouse or stylus. Clients 3 can also include a display device such as, for example, a liquid crystal display screen, television, or computer monitor, that is capable of rendering at least one interactive Graphical User Interface (GUI). Each input device 6 of a client 3, or that is communicatively connected to a client 3, allows a user to interact with any one or combination of the GUIs disclosed herein to instruct the network and systems discussed herein to display, edit, and/or otherwise manipulate information, which is then displayed in the display device of a client 3.

The GUIs can be rendered on a display device of one or more server computer devices of the host system 2, such as the email server 13, transaction server 11, web server 15 (which can also be referred to as a website server or website hosting server), application server 17 (which can also be referred to as an app server), and database server 19. Each server can be a computer device of the host system 2. For instance, each server can be configured as a computer device such as a computer, a work station or other type of server computer system that includes hardware. The hardware can include at least one processor communicatively coupled to at least one non-transitory memory and at least one transceiver unit. The processor of each server computer system may execute at least one application for hosting a service offered to clients or other communication devices that are communicatively connectable to the server computer system.

In exemplary embodiments, a client 3 can be, but is not limited to, a personal computer, a Personal Digital Assistant (PDA), a tablet computing device, a smart phone, an internet appliance, a computer device operating the Android operating system (OS) from Google Inc., an electronic device running the Microsoft Windows® Mobile OS, an electronic device running the Microsoft Windows® Phone OS, an electronic device running the iOS OS from Apple, Inc., a mobile phone, a hand held computer, a netbook computer, a palmtop computer, a laptop computer, an ultra-mobile PC, a portable gaming system, or another similar type of mobile computing device having a capability to communicate via the communications network 7.

In some embodiments, the host system 2 can be based on a multi-tiered network architecture, and can include one or more of a web server 15(Tier 1), an application server 17 (Tier 2), and a database server 19 (Tier 3). The web server 15 corresponds to the first tier of the host system 2 and is configured to communicate with the communication network 7 via a border firewall 21, and with the application server 17 via an application firewall 23. The web server 15 can be configured to accept information requests, such as, for example, HTTP requests, from one or more of the clients 3 via the communication network 7 and to provide responses thereto. The responses may include, for example, HTTP responses including static and/or dynamic HTML documents for providing a user interface (UI) to users via the clients 3. For some embodiments, the UI may be shown on a display via an internet browser application running on a client 3 a user is operating or a client to which a user is associated such that a user is able to provide input via use of the UI so that the input from the user provided to the UI is transmittable from the client 3 to an element of the host system 2. Additionally, the web server 15 may further be configured to authenticate each user before allowing access to the UI and other resources associated with the host system 2. Authentication may be performed, for example, by validating a received account identifier (ID) or user name and a corresponding password. The ID/user name and password may be input in the UI using an input device 6 of the client 3.

In some embodiments, the host system 2 receives information from a user as input data. The input data may not be suitable for display via the GUI, thus requiring reconfiguration of the input data to output data. The input data can be acquisitioned from the information stored within the non-transitory memory of the host system 2 and/or received by inputs and/or uploads by a user through an input device 6.

In some embodiments, the application server 17 corresponds to the second tier of the host system 2 and can be configured to communicate with the web server 15 via the application firewall 23 and with the database server 19 via an internal firewall 25. The application server 17 may host one or more applications executing logic to provide account reconciliation service features to each user via their respective user interfaces (UIs). The application server 17 may receive account credentials (e.g., an account ID/user name and password), input and selections (e.g., a request to access particular account features) from the UI of each client 3 via the web server 15. Based on this and other information received from the clients 3, applications hosted by the application server 17 may be invoked to perform data acquisition and manipulation functions and to generate corresponding informational content. Acquisitioned data may be communicated to the web server 15 and subsequently presented to the users using, for example, a dynamic web page or interactive GUI of the UI. Information provided to the user client device for display in the GUI can also be transmitted via the host system's use of one or more Application programming interface (API) connections it may have or that it may form with one or more party 31 devices and/or one or more provider 37 devices. Information provided to a client computer device via an API connection may include information that is only transitorily stored in the host system but is otherwise not within a database or other non-transitory memory of a host system. For instance, the host system can be in communication with a device of a provider 37 to obtain information via an API connection with that provider-device and provide the information to the user-client computer device for display on the GUI. The information obtained from the API connection can be manipulated by the host system 2 for having information displayed in a desired format. Additionally, or as an alternative, such information or a portion of such information obtained via an API connection can be provided by the host system 2 to the client computer device without substantially changing the data for display in the GUI. Additionally, the application server 17 may host an application for enabling users to conduct email communications with the host system 2 and with other parties.

In some embodiments, the database server 19 can correspond to the third tier of the host system 2 and be configured to communicate with the application server 17 via the internal firewall 25. The database server 19 manages one or more databases $DB_1, DB_2, \ldots, DB_j$ 27 that store data to support one or more applications hosted by the application server 17 or elsewhere. Database information requested by a particular application is retrieved from the databases 27 by the database server 19, communicated to the requesting application, and updated by the database server 19 as needed.

The host system 2 may further include an email server 13 which is configured to communicate with the application server 17. In some embodiments, the host name of the email server 13 is determined by a registered domain name of the host institution (e.g., xyzbank.com), but other nomenclature may be used. In embodiments, the email server 13 includes an email client application configured to enable exchange of electronic communications between the clients 3 and one or more parties $P_1, P_2, \ldots, P_k$ 31 external to the host system 2 via a communications network 33. The communication networks 7, 33 may be a common communication network (e.g., the Internet) or portions of a common communication network (e.g., separate local area networks connected together via the internet).

Although only a single email server 13, transaction server 11, web server 15, application server 17, and database server 19 are depicted in FIG. 1 it is to be understood that in certain embodiments, the functionalities of one or more of these servers can be implemented as a cluster of computing devices operating in a cluster or server farm.

The parties 31 may be computer devices associated with any person or entity with whom a user desires to communicate regarding particular aspects of the system 1. Such parties 31 may include, but are not limited to, computer devices controlled by parties offering services to the customer that are ancillary to those offered by the financial institution.

As illustrated in FIG. 1, the host system 2 may include an email firewall 10 disposed between the email server 13 and the communication network 33 to protect network traffic and electronic communications between the parties 31 and the host system 2. To supplement network traffic protection provided by the email firewall 10, the email server 13 may implement one or more policies and anti-virus scanning software for intercepting email (e.g., "spam" email) unrelated to financial matters and possibly including malicious content. A user of a client 3 may be allowed to view intercepted email and authorize trusted senders, such as a particular one or more selected parties or providers.

The host system 2 may further include a transaction server 11 which is configured to communicate with the application server 17. The transaction server 11 typically includes a client transaction application for enabling transactions. For example, transactions may take place between the clients 3 (customers of the host institution) and one or more financial service providers $V_1, V_2, \ldots, V_k$ 37 external to the host system 2 via a communications network 35. The communication networks 7, 33, 35 may be a common communication network (e.g., the Internet) or may be separate local area networks, enterprise networks, or other types of networks that are each communicatively connected together via the Internet.

As shown in FIG. 1, a transaction firewall 9 is disposed between the transaction server 11 and the communications network 35 for protecting network traffic and communications between the providers 37 sent via the communication network 35 and the host system 2.

The clients 3, as discussed herein, may be PCs and/or other network-enabled devices (e.g., cell phones, mobile phones, mobile tablets, PDAs, etc.) configured to transmit and receive information via the communication network 7 using a wired or wireless connection. The clients 3 may include a suitable browser software application (e.g., Internet Explorer, Internet Explorer Mobile, Chrome, Safari, Firefox, Blazer, etc.) for enabling the user to display and interact with information exchanged via the communication network 16. The clients 3 may thus access and navigate static and/or dynamic HTML documents of the UI.

The display devices of the clients 3 can differ depending on the type of computing device used as a particular client 3. For example, a display device of a tablet device, netbook, or laptop is typically an integrated LCD screen, which is often smaller than a monitor or console such as the display device for a workstation or desktop PC. Similarly, the display device of a mobile computing device may be a relatively small display such as mobile phone display.

The input devices 6 can also vary depending on the characteristics of a particular client 3 and its display device of that client. For example, the input device 6 of a tablet, netbook, or laptop client may include a relatively small physical or touchscreen keyboard, an integrated camera, trackpad, and/or microphone, while the input device 6 of a desktop PC or workstation client such as client 3 will typically include a physical QWERTY or Dvorak keyboard and a mouse. Also, for example, an input device of a mobile client will typically lack a full physical keyboard and may instead comprise one or more of a touch-screen keyboard, a microphone, an integrated camera, a trackpad, a scroll wheel, a track ball, a T9 keyboard, a button, and a touch screen display device. In embodiments, any of the display devices can be a touch screen display. It is to be understood that in the case of a touch screen interface, the input device 6 can include the configuration of the display device that allows contact with the screen of the display device or positioning of an object near the screen of the display device to provide input as well as a tool (e.g., a stylus) that is capable of interacting with the touch screen that can be used to select, slide, drag, and resize (i.e., expand, maximize, shrink, and/or minimize) interactive UI elements through pointing, pinching, and scrolling gestures.

The UIs generated by the system 1 can be tailored to or customized for a particular client 3 based on the capabilities of the platform used by that client 3. The platform comprises physical capabilities of the client computing device such as, memory capacity in terms of random access memory (RAM) and read only memory (ROM), central processing unit (CPU) capabilities in terms of clock speed and available processing capacity, available storage in terms of disk space or flash memory, communications capabilities in terms of current wired and/or wireless network connectivity and a communications interface such as a network interface card (NIC) of the computing device, capabilities of the display device, and capabilities of the input device 6. These physical capabilities and others can be determined based on a manufacturer, model number, serial number, a Media Access Control address (MAC address) and/or another unique identifier of a computing device used as a client 3.

The platform of a client 3 also includes software and firmware components, such as an operating system (OS) running on the client 3, Internet browser(s), native software applications installed, and privileges/permissions associated with the client 3 or a user associated with the client computer device. The privileges/permissions may be controlled by the host system 2 based on a user and/or an entity associated with the client 3 and can include data access, communications, and application execution privileges.

The UIs for mobile clients may be rendered as streamlined 'mobile friendly' versions of the 'full' UI for ease of use on relatively small display devices. In embodiments, mobile friendly UIs may have reduced capabilities and/or display a lesser level of detail as compared to UI utilized for larger electronic appliances such as a PC or a workstation. A mobile friendly UI can also be tailored to accept input from input devices for a specific platform of a mobile client. The mobile friendly UIs can be automatically selected by the host system 2 in response to detecting one or more platform characteristics of a particular mobile client. Alternatively, a user of a mobile client can be prompted within the full UI to opt-in to using the mobile friendly UIs in response to detecting that the client is accessing the host system 2 via a mobile computing device. In cases where a user's mobile client has display devices and input devices capable of using the UI, the user may not wish to use the mobile friendly UI. The full UI can allow certain features to be performed and displayed with a greater level of detail than the mobile friendly UIs. For example, the granularity of illustrations and functions may be finer (i.e., more detailed) in a full UI as compared to the mobile friendly UIs.

The one or more of the communications networks 7, 33, 35 can be any network or combination of networks that can carry data communications. Such networks can include, but are not limited to, wireless data networks such as a Wi-Fi, 3G, and a 4G/LTE network. In addition, the communications networks 7, 33, and 35 shown in FIG. 1 can include, but are not limited to a wired Ethernet network, a local area network (LAN), a medium area network, a wide area network (WAN) such as the Internet, etc. In exemplary implementations of a system including wireless networks, one or more of the communications networks 7, 33, and 35 can support protocols and technology including, but not limited to, Internet or World Wide Web protocols and/or services. Intermediate network routers, gateways, or server may be provided between components of the architecture and the system depending upon a particular application or environment.

Network architecture having a multi-tiered network architecture can be achieved through the application of the disclosed communication systems and methods. With such a configured network, a reduction of real time operating systems may be realized. For example, the network architecture may be implemented with only two real time operating systems. As shown, the user interface components can be employed in-house. More control of the user experience and flexibility for changes that may occur in the future can be achieved by such a configuration. In addition, open source software can be used, in conjunction with the in-house user interface components, to implement web services that will insulate the user interface from the back-end system. Such a configuration may facilitate an agnostic system on the user interface side. This can also enable integration of the back-end system into other front-end platforms.

FIG. 2 illustrates an example computer system 40 in which embodiments of the present disclosure, or portions thereof, may be implemented as computer-readable code. For example, the various aspects of a UI can be implemented in computer system 40 using hardware that can include a non-transitory computer readable media having instructions stored thereon connected to a processor configured to execute the instructions to cause the computer system to implement a method as defined by the instructions. The hardware of the computer system 40 can also be configured to work in connection with software and firmware. For example, each client 3, each provider 37, each party 31, the email server 13, transaction server 11, web server 15, application server 17, and/or database server 19 described above with reference to FIG. 1 can be implemented as computer system 40 or include the structure of the computer system 40. Also, the respective display devices of clients 3 and the above-listed server computing systems can be implemented in a display 47, which, together with the display interface 45, can be configured to render any GUI discussed herein or any visual component to a UI discussed herein.

The processor 43 may be a special purpose or a general purpose processor device. As will be appreciated by persons skilled in the relevant art, the processor 43 may also be a single processor in a multi-core/multiprocessor system, such system operating alone, or in a cluster of computing devices operating in a cluster or server farm. The processor 43 can be a hardware processor that is connected to a communication infrastructure 41, for example, a bus, message queue, network, or multi-core message-passing scheme. The communications infrastructure 41 can communicatively connect the processor 43 to the display interface 45, display 47, main memory 49, secondary memory 51, elements of the secondary memory 51 such as a hard disk drive 53, removable storage drive 55, interface 57 for a removable storage unit 59, and/or a communications interface 61.

The computer system 40 can also include a main memory 49 (e.g., random access memory (RAM)), and may also include a secondary memory 51. The secondary memory 51 may include, for example, a hard disk drive 53 and removable storage drive 55. Removable storage drive 55 may comprise a floppy disk drive, a magnetic tape drive, an optical disk drive, a flash memory, or the like.

The removable storage drive 55 may read from and/or writes to a removable storage unit 59 in a well-known manner. The removable storage unit 59 may comprise a floppy disk, magnetic tape, optical disk, Universal Serial Bus ("USB") drive, flash drive, memory stick, etc. which is read by and written to by removable storage drive 55. As will be appreciated by persons skilled in the relevant art, the removable storage unit 59 includes a non-transitory computer usable storage medium such as non-transitory memory having computer software, computer files, and/or data stored therein.

In alternative implementations, the secondary memory 51 may include other similar means for allowing computer programs or other instructions to be loaded into computer system 40. Such means may include, for example, a removable storage unit 59 and an interface 57. Examples of such means may include a program cartridge and cartridge interface (such as that found in video game devices), a removable memory chip (such as an EPROM, or PROM) and associated socket, and other removable storage units and interfaces which allow software and data to be transferred from the removable storage unit to computer system 40.

The computer system 40 may also include a communications interface 61. In embodiments, the communications interface 61 can include one or more transceivers. The communications interface 61 can be configured to allow software and data to be transferred between the computer system 40 and external devices. The communications interface 61 may include a modem, a network interface (such as an Ethernet card), a communications port, a PCMCIA slot and card, or the like. Software and data transferred via the communications interface 61 may be in the form of signals, which may be electronic, electromagnetic, optical, or other signals capable of being received by communications interface 61. These signals may be provided to the communications interface 61 via at least one communications path 63. The communications path 63 carries signals and may be implemented using wire or cable, fiber optics, a phone line, a cellular/wireless phone link, an radio frequency link or other communications channels.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments. A processor device may be a single processor, a plurality of processors, or combinations thereof. Processor devices may have one or more processor "cores."

Various embodiments of the present disclosure are described in terms of this example computer system 40. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

As used herein, the terms 'computer readable storage medium,' 'computer program medium,' 'non-transitory computer readable medium,' and 'computer usable medium' are used to generally refer to tangible and non-transitory. Signals carried over the communications path 63 can also embody the logic described herein. The computer readable storage medium, computer program medium, non-transitory computer readable medium, and computer usable medium can also refer to memories, such as main memory 49 and secondary memory 51, which can be memory semiconductors (e.g., DRAMs, etc.) or other types of memory devices.

Computer programs (also called computer control logic and software) are generally stored in a main memory 49 and/or secondary memory 51. The computer programs may also be received via a communications interface 61. Such computer programs, when executed, can enable computer system 40 to become a specific purpose computer able to implement the present disclosure as discussed herein. In particular, the computer programs, when executed, enable the processor 43 to implement processes of the present disclosure discussed below. Such computer programs or other software may be stored in a computer program product and loaded into the computer system 40 using the removable storage drive 55, interface 57, hard disk drive 53, or communications interface 61.

The client 3, the provider 37, and/or the party 31 can each be structured as a computer system having a structure of the computer system shown in FIG. 2. Each server of the host system 2 can also have a structure of the computer system shown in FIG. 2.

Exemplary System and Method Implementations

Figure 3:
FIG. 3 shows exemplary operating modules that can be displayed with an embodiment of the system.

Referring to FIG. 3, embodiments of the system 1 and methods of using the same are configured to provide a financial solution product for customers seeking financing and advice for projects. These projects can include debt consolidation, home improvement, financing for school loans, finding the right credit card, refinancing debt, etc. The financial solution(s) is/are rendered in a GUI and presented as a plurality of navigational displays and operating modules on the client device(s) 3. These navigational displays and operating modules allow a user to enter data via the client device 3 and acquisition data from the host system 1, which is processed and filtered by the system 1 so that activities and functions can be coordinated to generate certain outputs. These outputs are presented to a user via the user's client device 3. The outputs are dynamic, in that they are continually updated based on the data inputs and the data acquisitioned. The GUI includes actuatable icons that allow a user to navigate through the displays and operating modules, manipulate graphical elements, save data, transmit data, etc. The actuatable icons can be actuated by clicking on it via mouse cursor, taping on it via a touch pad, etc.

FIG. 3 shows five operating modules: a debt consolidation module 102, a home improvement module 104, a school loan module 106, a credit card module 108, and a financing module 110. The debt consolidation module 102 is configured to provide financing and advice related to borrowing money to consolidate debt. The home improvement module 104 is configured to provide financing and advice related to home remodeling and renovation projects. The school loan module 106 is configured to provide financing and advice related to paying for college and student lending. The credit card module 108 is configured to provide financing and advice related to finding the right credit card for a user. The financing module 110 is configured to provide financing and advice related to financing collateral debt (e.g., a home, a vehicle, etc.). More or less modules can be used. For instance, one skilled in the art, with the benefit of the present disclosure, will appreciate that other projects that would require a smaller amount of financing or financing assessments can be embodied as an operating module.

The modules 102-110 are presented on a financial solution product landing page 100 as actuatable icons that allow a user to enter the system 1 via any of the operating modules 102-110. Once entered into the system 1, a user can navigate to any operating module or display screen. For instance, any of the operating modules and/or display screens can include other actuatable icons allowing a user to navigate through the system 1 (e.g., to and between other display screens or operating modules), issue commands, enter data, retrieve data, save information, download reports, continue to the next page or screen, go back to a previous page or screen, etc. Entering data can be achieved via textual inputs entered in a text box icon, selecting from a drop down menu of a drop-down icon, selecting from a list of options via a radio button icon, selecting from a list of actuatable text from an actuatable text icon, etc.

Figure 4:
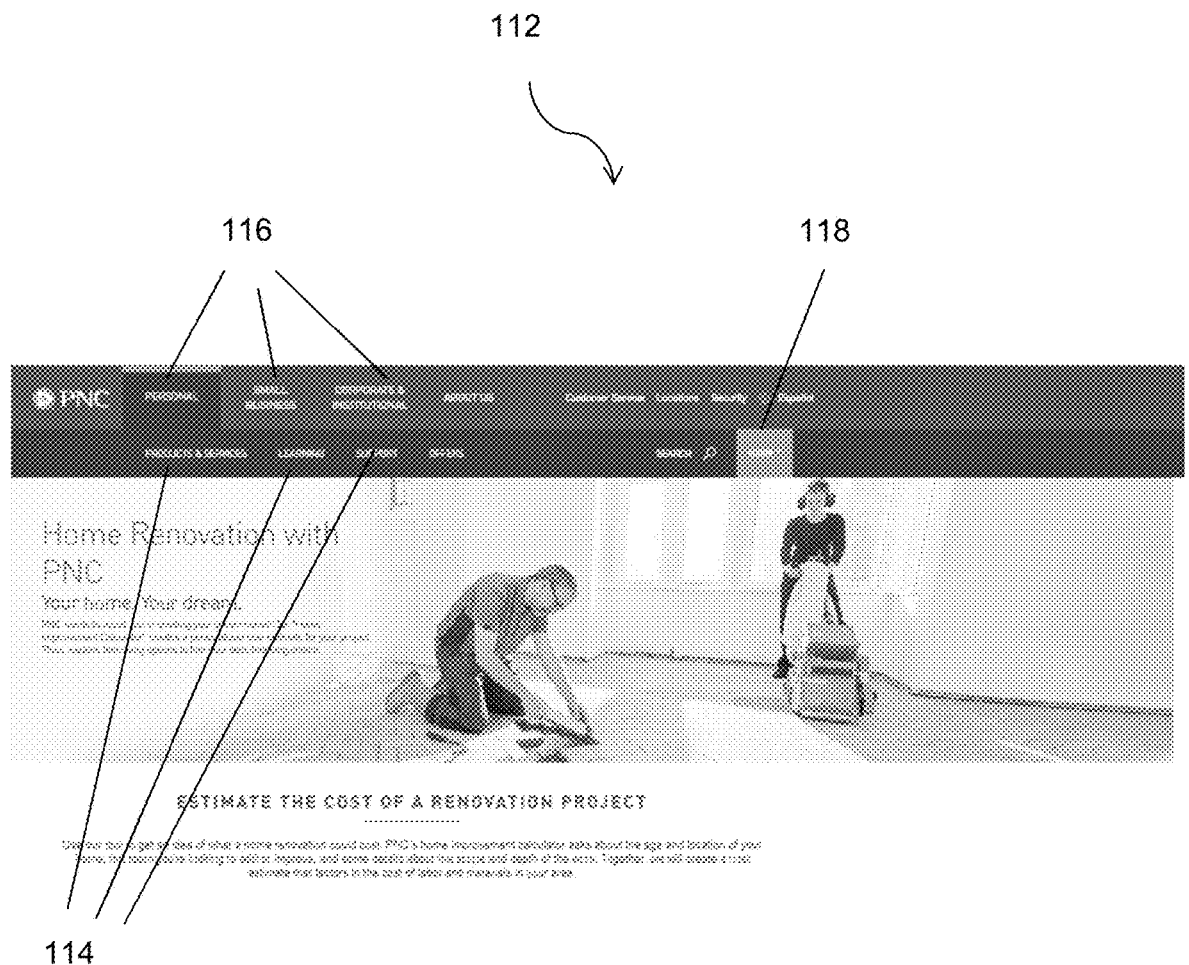
FIG. 4 shows an exemplary home improvement landing page that can be displayed via an embodiment of the system.
Figure 7:
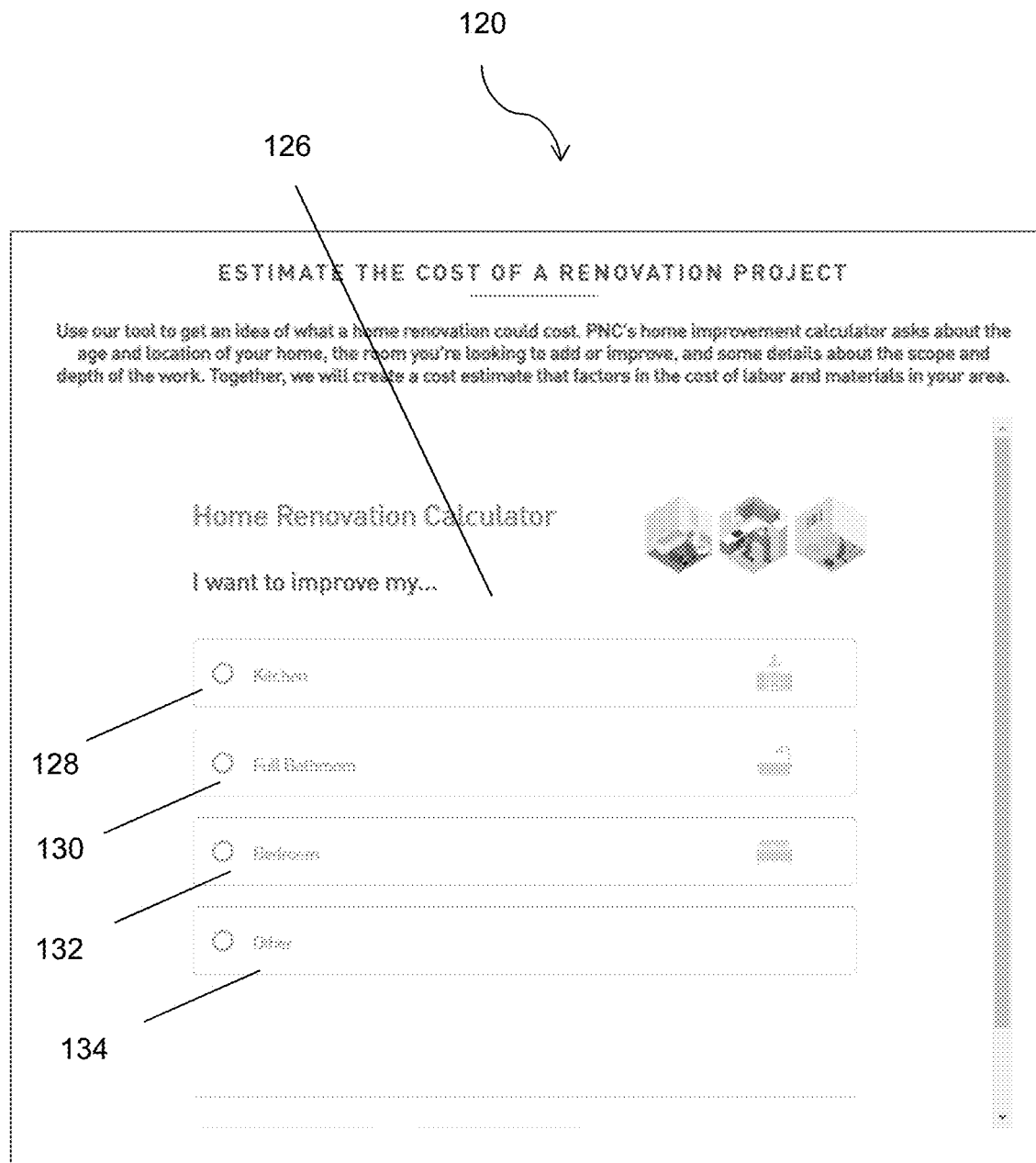
Figure 8:
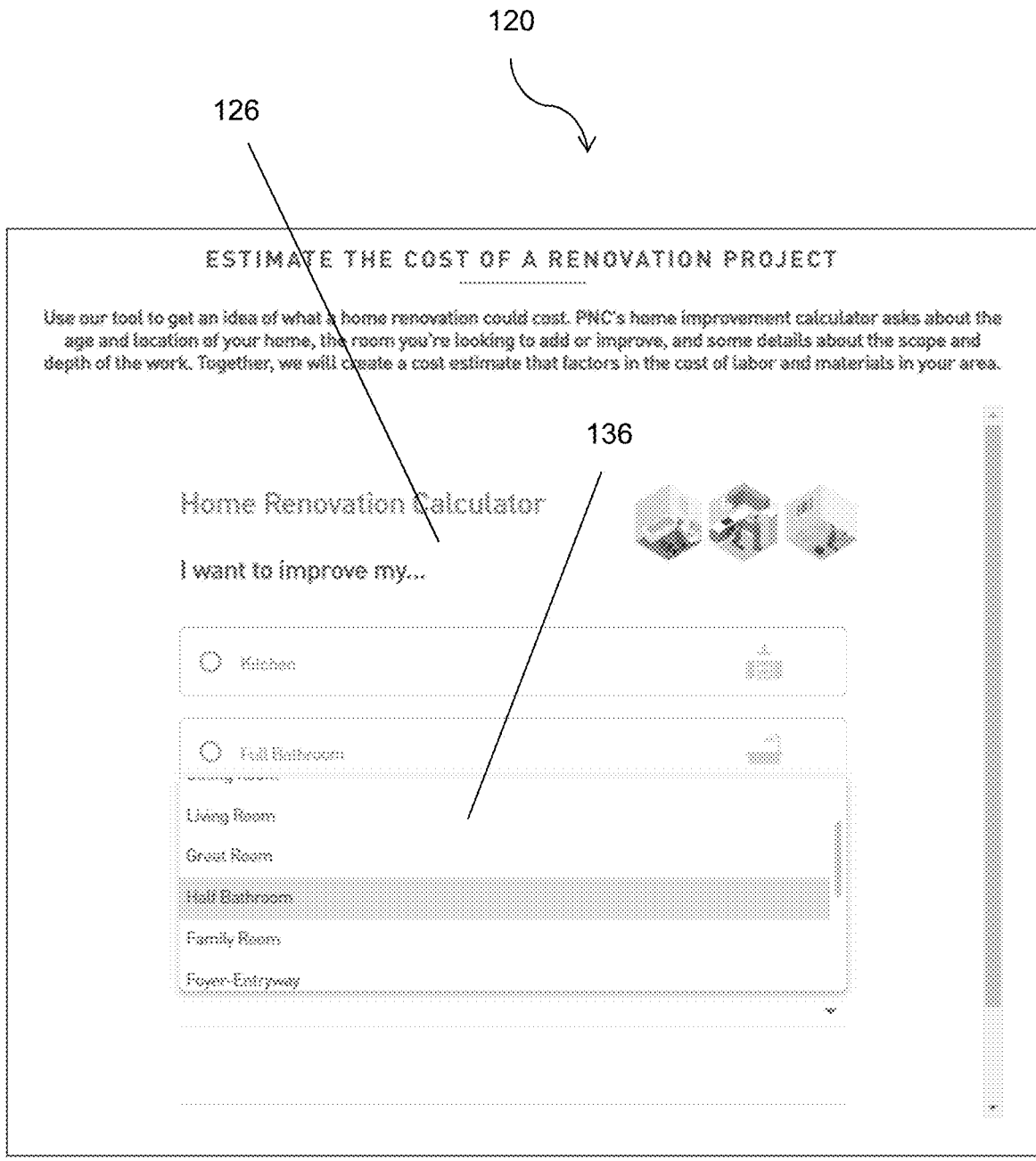
Figure 9:
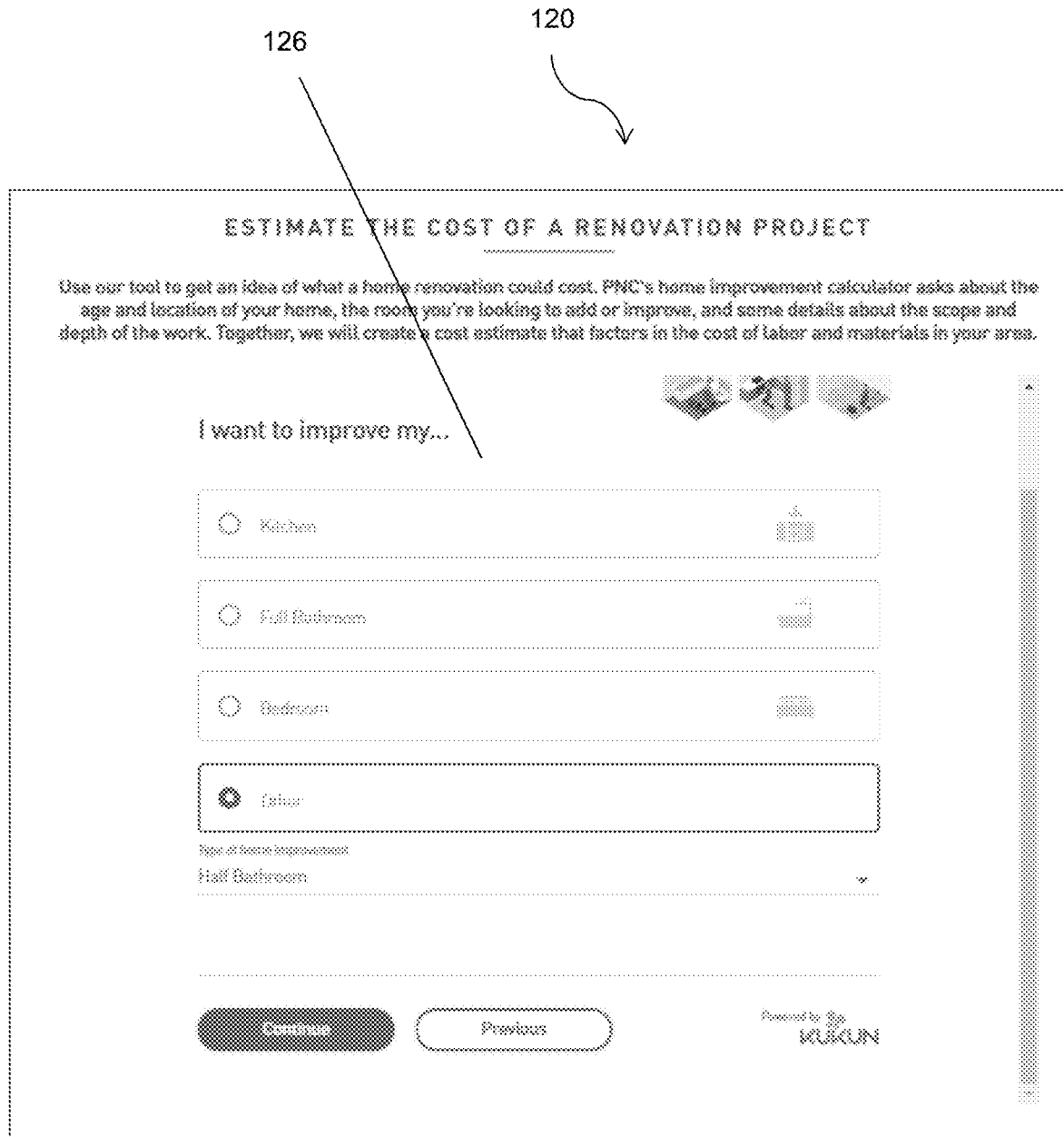
Figure 10:
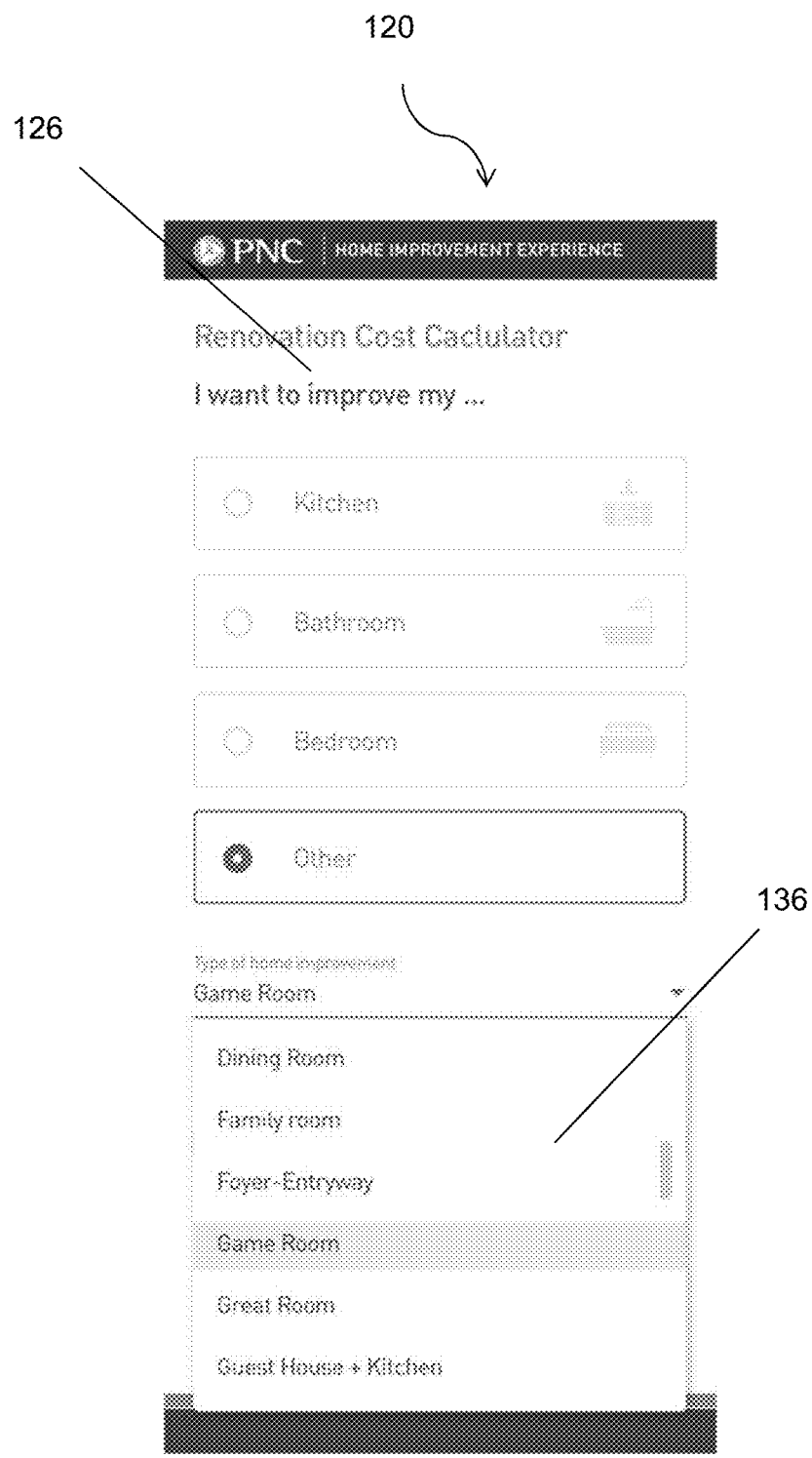

The home improvement module 104 will be discussed first. As shown in FIG. 4, upon entering the home improvement module 104, the system 1 directs a user to the home improvement landing page 112. The home improvement landing page 112 (as well as any of the display screens disclosed herein) can include tutorial and informational icons 114 (linking a user to videos, brochures, webpages, literature, support, etc. about a particular financial solution product), user-classification icons 116 (allowing a user to identify as an individual, a small business, a corporate entity, etc.), a log-in icon 118 (allowing a user to set up an account and save data for a particular project to that account so that the user can exit the system 1 and re-enter at a later time to pull up the saved data), etc.

Referring to FIGS. 5-10, the home improvement module 104 includes a home improvement cost estimate display 120 that allows a user to begin to enter data for the purposes of calculating the cost or estimated cost of a desired home improvement project. A home improvement project can be a project of which a user is seeking a financial solution product via the system 1. For instance, a user may wish to obtain a list of financial products and financial advice regarding obtaining financing to pay for a home improvement project. The first step would be to determine the cost or estimated cost of the home improvement project. In this regard, the system 1 is programmed to utilize a home improvement calculator based at least on information entered by a user. The home improvement calculator will take into account a multitude of variables, at least of which will depend on the location of the home. Costs associated with home improvements and the projected value the home improvement project would add to the home can depend on the location of the home, and thus this will be a variable the calculator uses. The data entered includes the postal zip code 122 of the home to which the desired renovation will occur, the year 124 the home was built, etc. These data can be entered in the form of textual inputs. The home improvement cost estimate display 120 also includes a home-area selection box 126 allowing a user to select which portion of the home is being improved. The data can be entered via selection of radio buttons. For instance, the home-area selection box 126 can present a user with home-areas and associated selectable radio buttons that include a kitchen radio button 128, a bathroom radio button 130, a bedroom radio button 132, an other radio button 134, etc. In some embodiments, the home-area text is actuatable so as to provide a home-area category drop-down menu 136, allowing a user to narrow the home area further. For instance, the bathroom home-area text may be selectable to allow a user to select the following from a drop-down menu: Living Room, Great Room, Hall Bathroom, Family Room, Foyer-Entryway, etc. As another example, the "other home area" text may be selectable to allow a user to select the following from the drop-down menu: Dining Room, Family Room, Foyer-Entryway, Game Room, Great Room, Guest House+ Kitchen, etc.

More than one home-area can be selected. For instance, a user can enter data for a home improvement for a kitchen and for a bathroom. The home improvement calculator can generate an estimated cost for each home-area separately and in combination, as well as provide financing options and advice for the same. As noted above, the home improvement calculator will use a multitude of variables to estimate the cost of the home improvement project. Some of these variables will be entered by the user via the home improvement module 104 and some of the variables will be acquisitioned by the system 1 from the database or from third party third party providers, publically available reports, etc. The data acquisitioned will depend on the data entered by the user.

Figure 11:
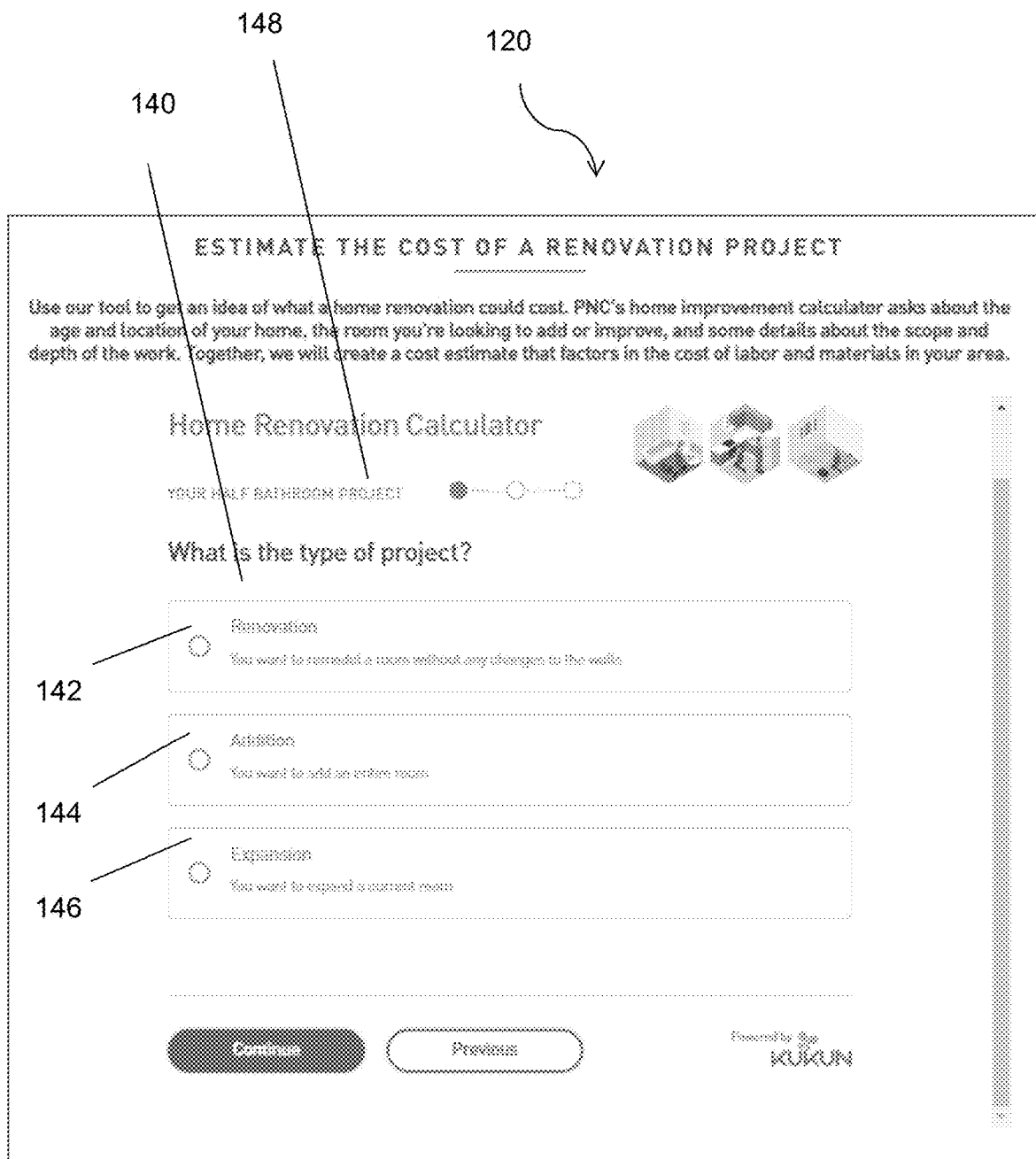
FIGS. 11-12 show exemplary home improvement cost estimate displays configured to allow a user to select the type of improvement being conducted.
Figure 12:
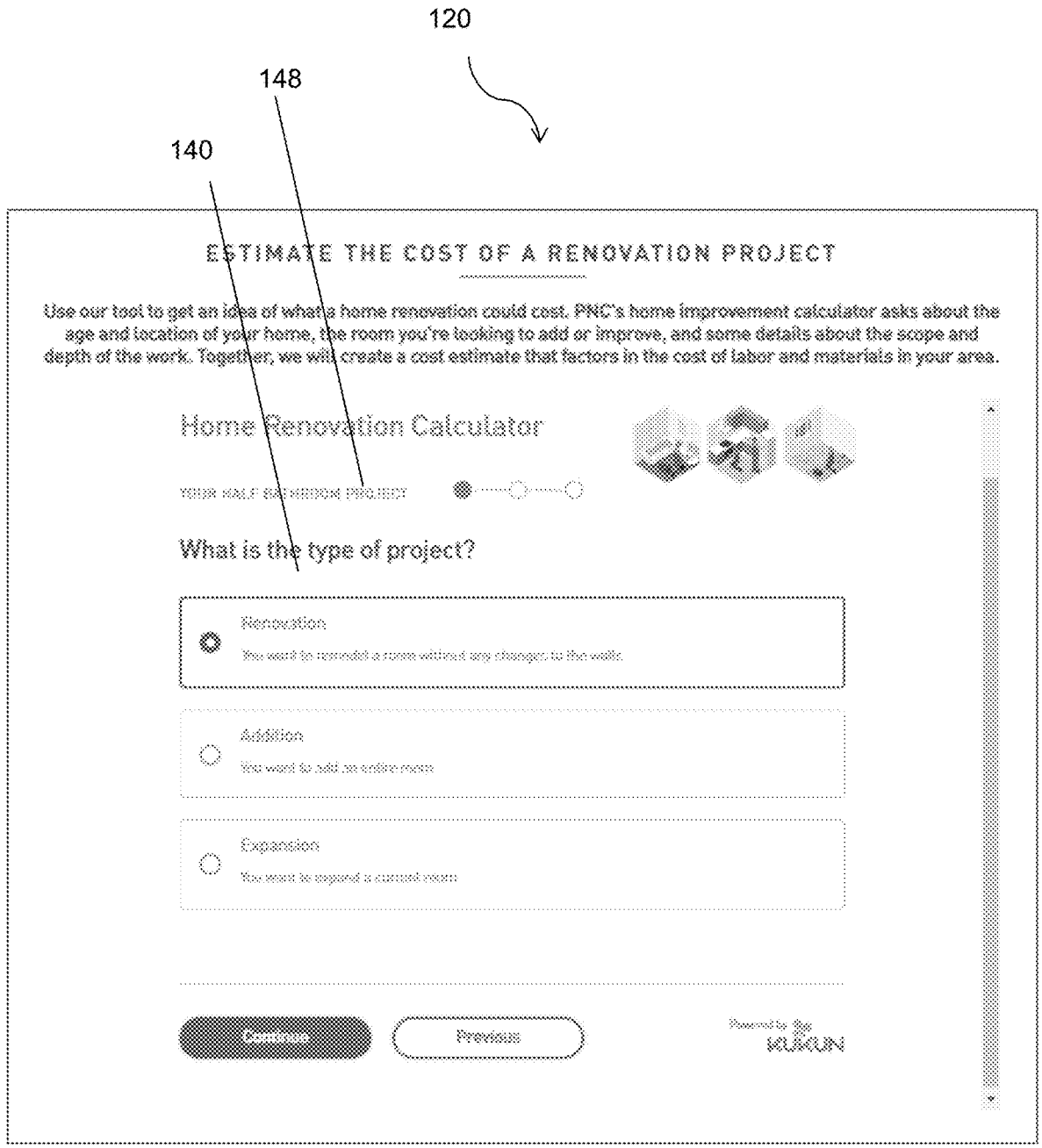

Referring to FIGS. 11-12, the home improvement cost estimate display 120 also includes a type of home improvement selection box 140, allowing a user to select the type of improvement being conducted. The data can be entered via selection of radio buttons. For instance, the type of home improvement selection box 140 can present a user with improvements and associated selectable radio buttons that include a renovation radio button 142 (e.g., remodel a room without any changes to the walls), an addition radio button 144 (e.g., adding an entire room to the home), an expansion radio button 146 (e.g., expanding a current room), etc. The home improvement cost estimate display 120 is also programmed to display the home-area 148 to which the type of improvement pertains. For instance, FIGS. 11-12 show a home-area 148 of a bathroom for which the user is selecting the type of home improvement. This is done to provide a user with a visual reminder of the home-area 148 that had been selected via the home-area selection box 126.

Figure 13:
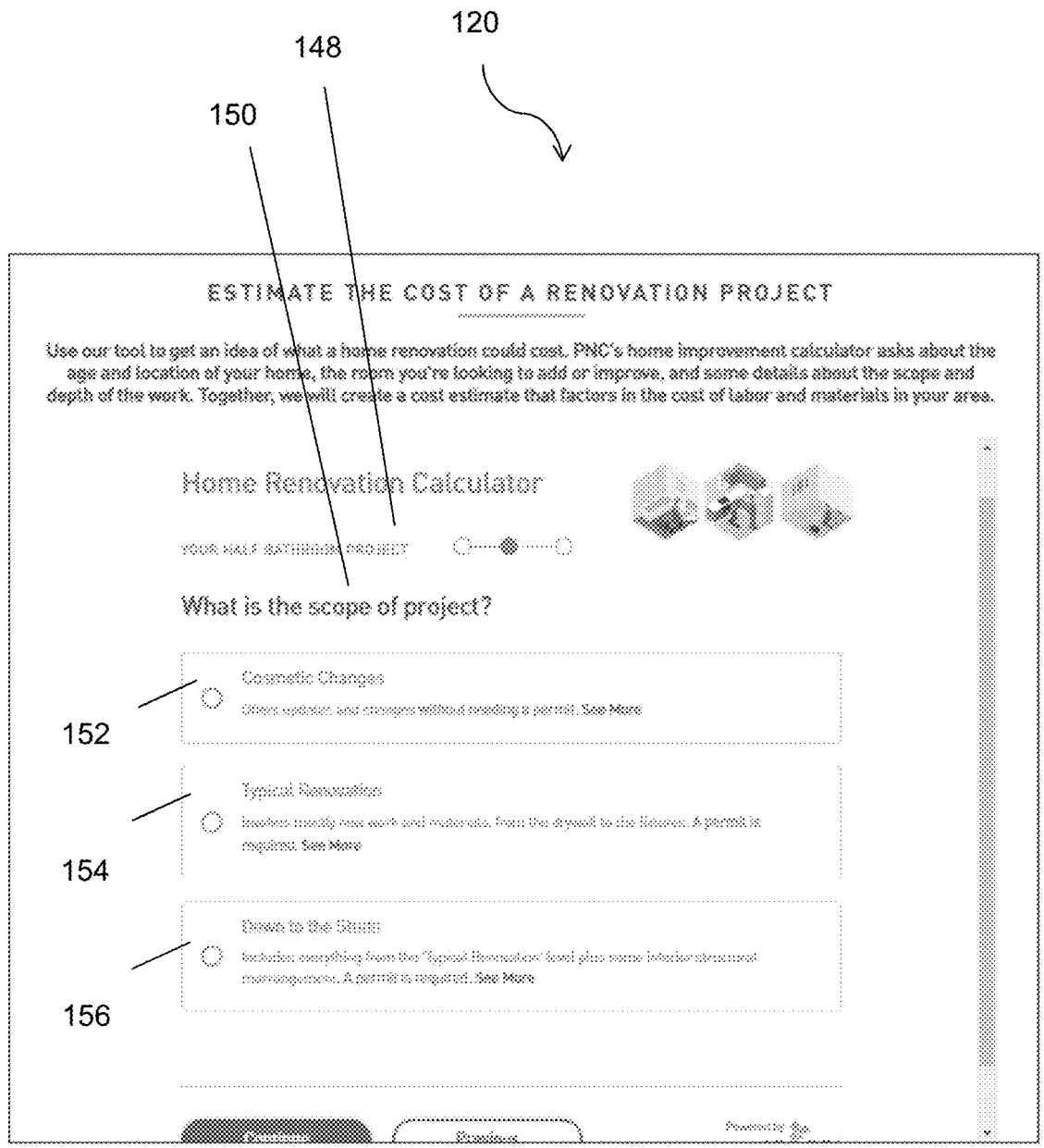
Figure 14:
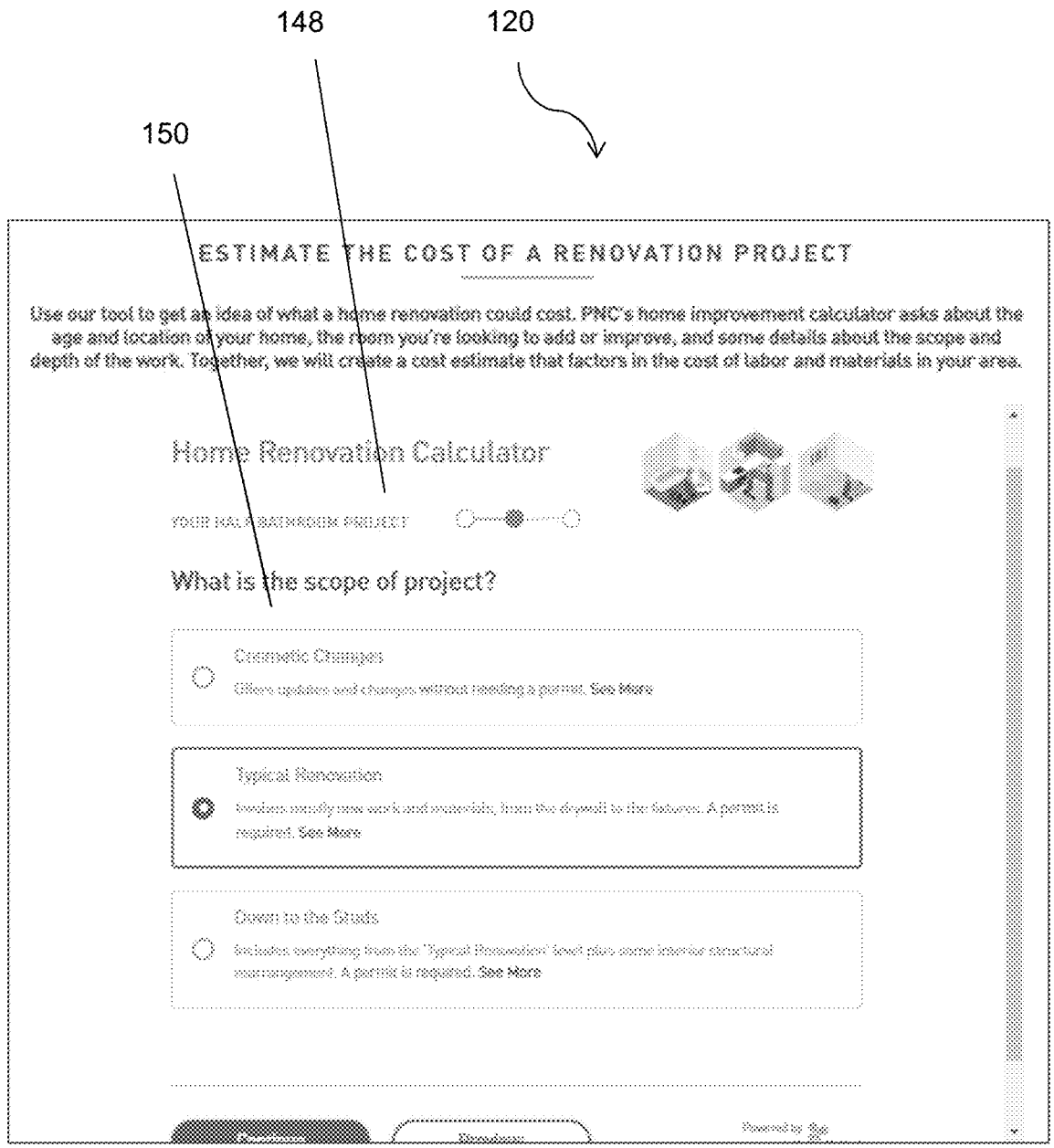

Referring to FIGS. 13-15, the home improvement cost estimate display 120 also includes a scope of home improvement selection box 150, allowing a user to select the scope of improvement being conducted. The data can be entered via selection of radio buttons. For instance, the scope of home improvement selection box 150 can present a user with scopes and associated selectable radio buttons that include a cosmetic change radio button 152 (e.g., updates and changes without needing a permit), a typical renovation radio button 154 (e.g., mostly new work and materials—a building permit is required), a down to the studs radio button 156 (e.g., typical renovation type work plus some interior structural rearrangement—a building permit is requires), etc. The scope of home improvement selection box 150 can also provide a "see more" actuatable text for each scope category to allow a user to read about the details of the scopes provided by expanding the informational text regarding each scope (see FIG. 15).

Figure 16:
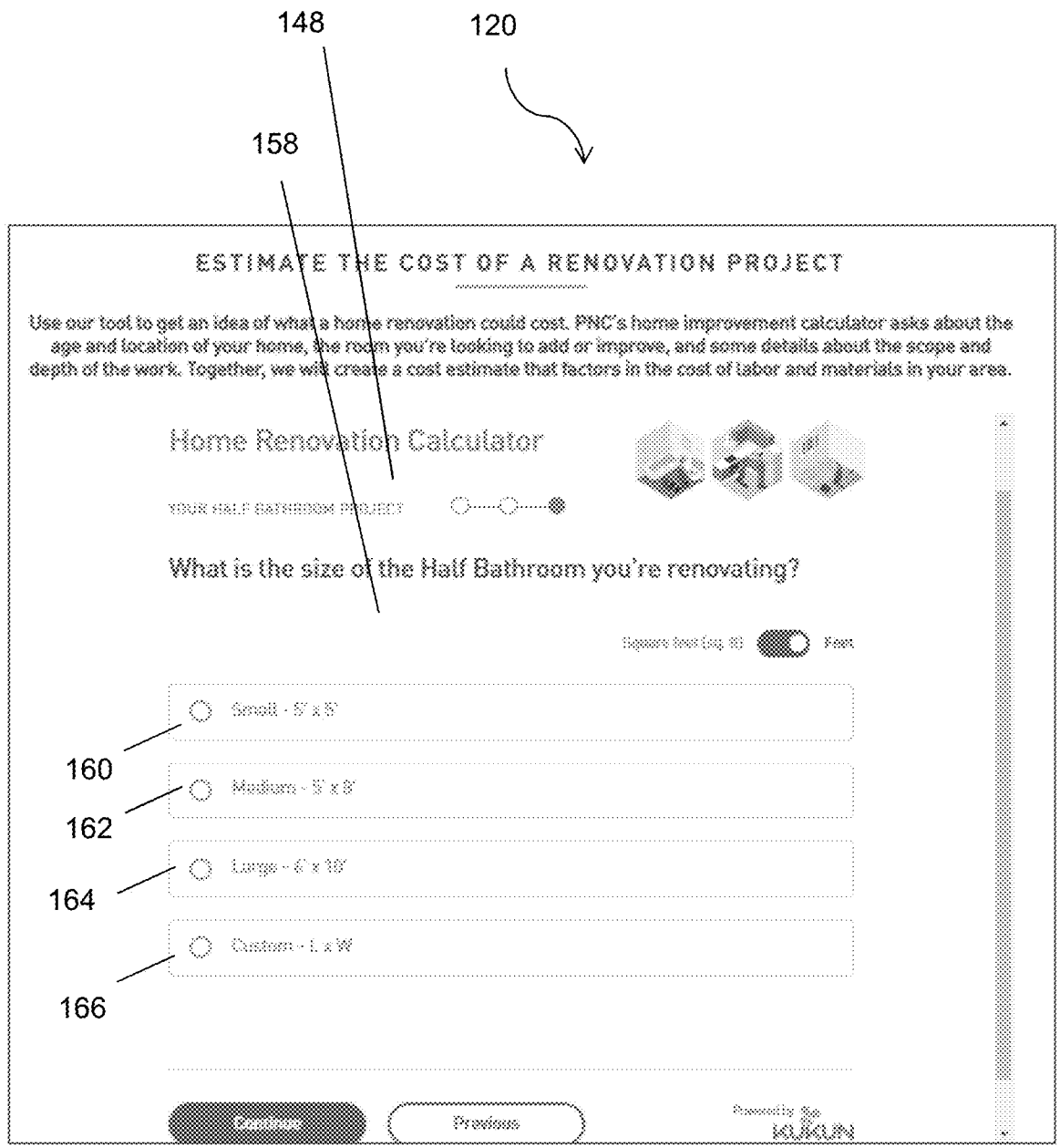
FIGS. 16-17 show exemplary home improvement cost estimate displays configured to allow a user to select the size of the room for which the improvement will be conducted.
Figure 17:

Referring to FIGS. 16-17, the home improvement cost estimate display 120 also includes a home-area size of home improvement selection box 158, allowing a user to select the size of the home-area. The data can be entered via selection of radio buttons. For instance, the home-area size of home improvement selection box 158 can present a user with sizes and associated selectable radio buttons that include a small radio button 160, a medium radio button 162, a large radio button 164, a custom radio button 166, etc. In the exemplary display shown in FIG. 16, the small size is 5 feet by 5 feet, the medium size is 5 feet by 8 feet, and the large size is 6 feet by 10 feet, wherein the dimensions represent the square footage dimensions of the room being improved upon. With the custom size, a user would specify the dimensions (e.g., enter a value for the length and the width of the room). This can be achieved by entering the dimensions via textual inputs in a customized length box 168 and a customized width box 170. The home-area size of home improvement selection box 158 can also include a units toggle button 172 to allow a user to toggle between English and metric units.

Figure 18:
Figure 19:
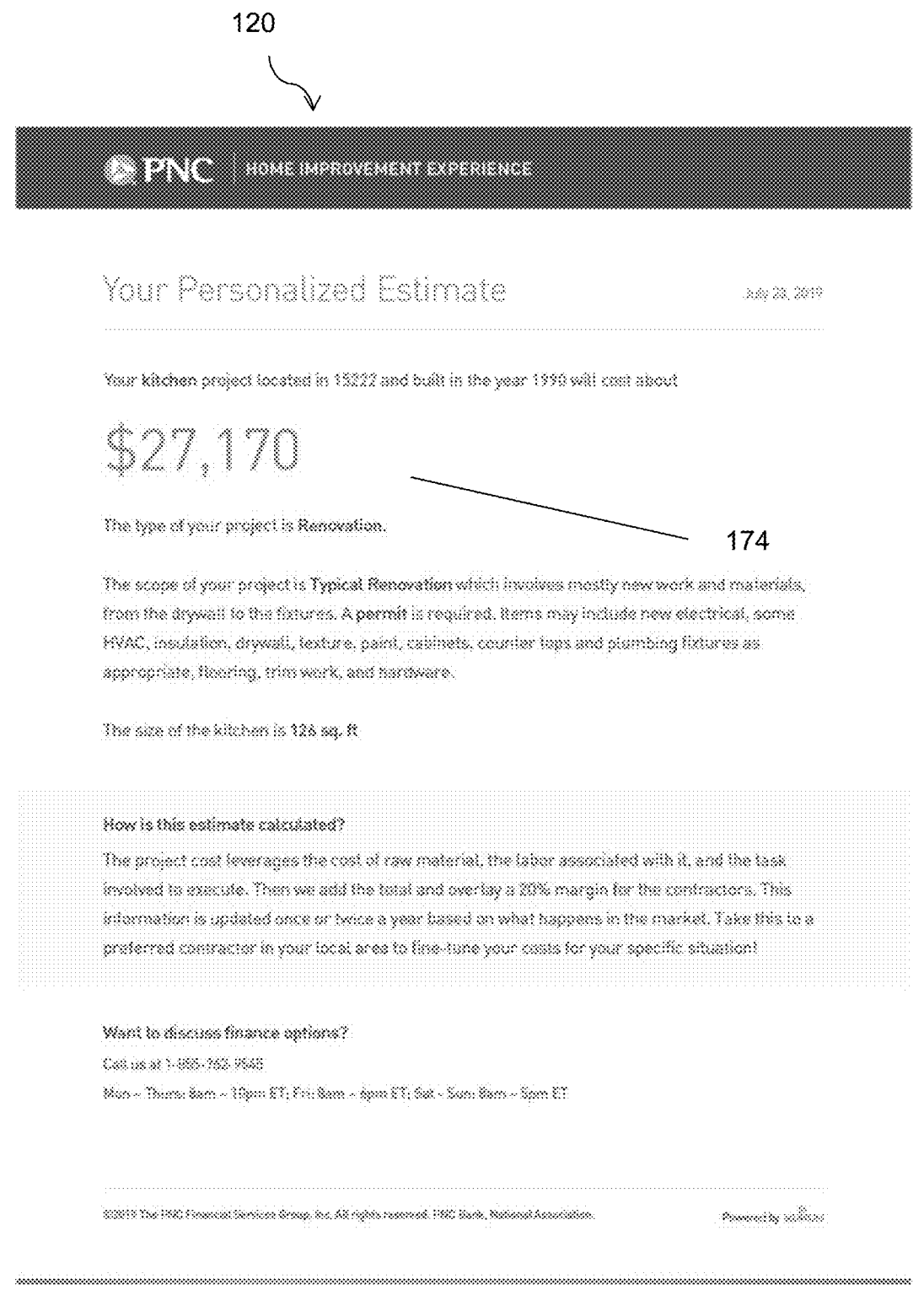
Figure 20:
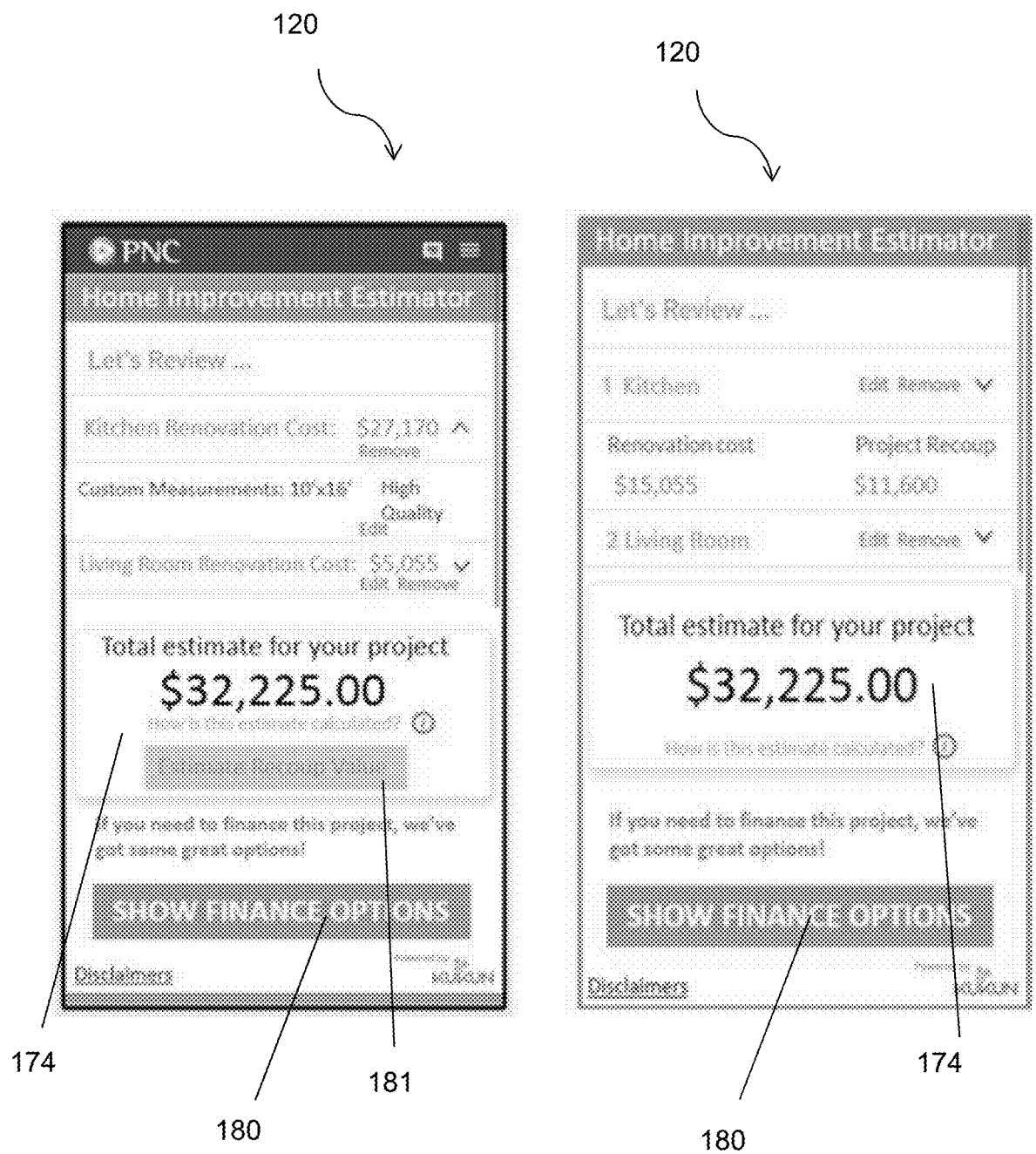
Figure 21:
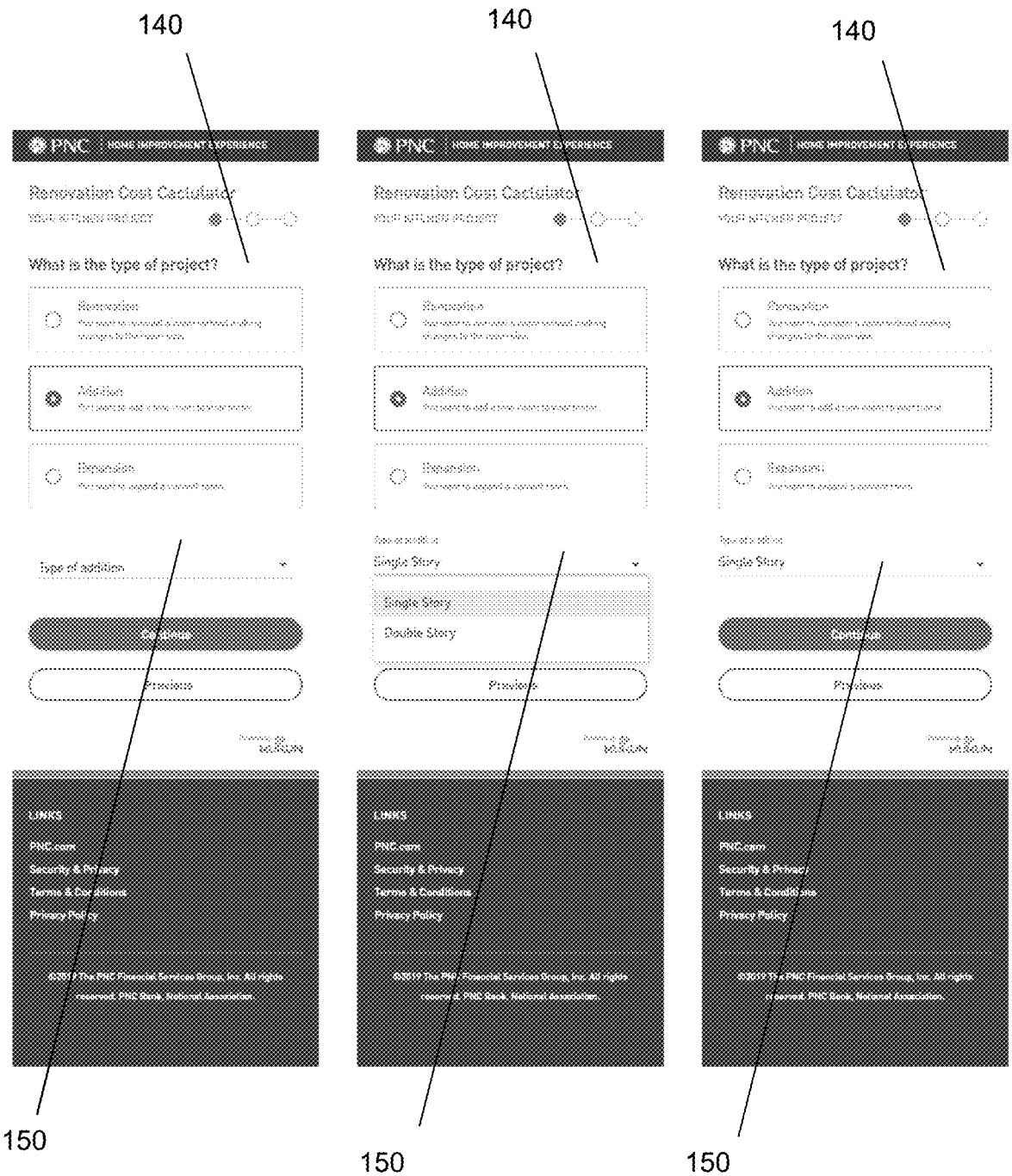
FIGS. 21-26 show exemplary home improvement cost estimate displays being implemented for different types of home improvement projects.
Figure 22:
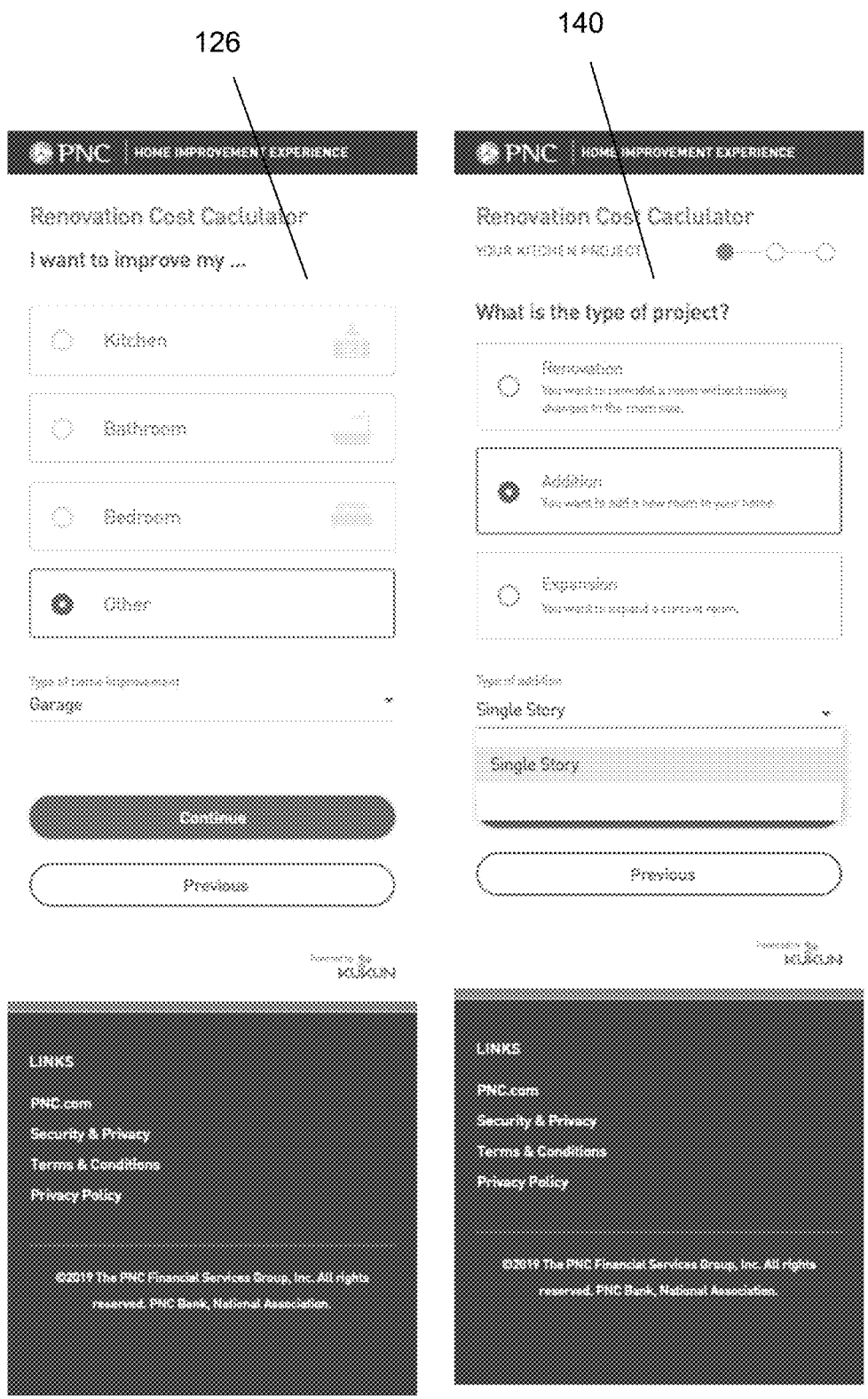
Figure 23:
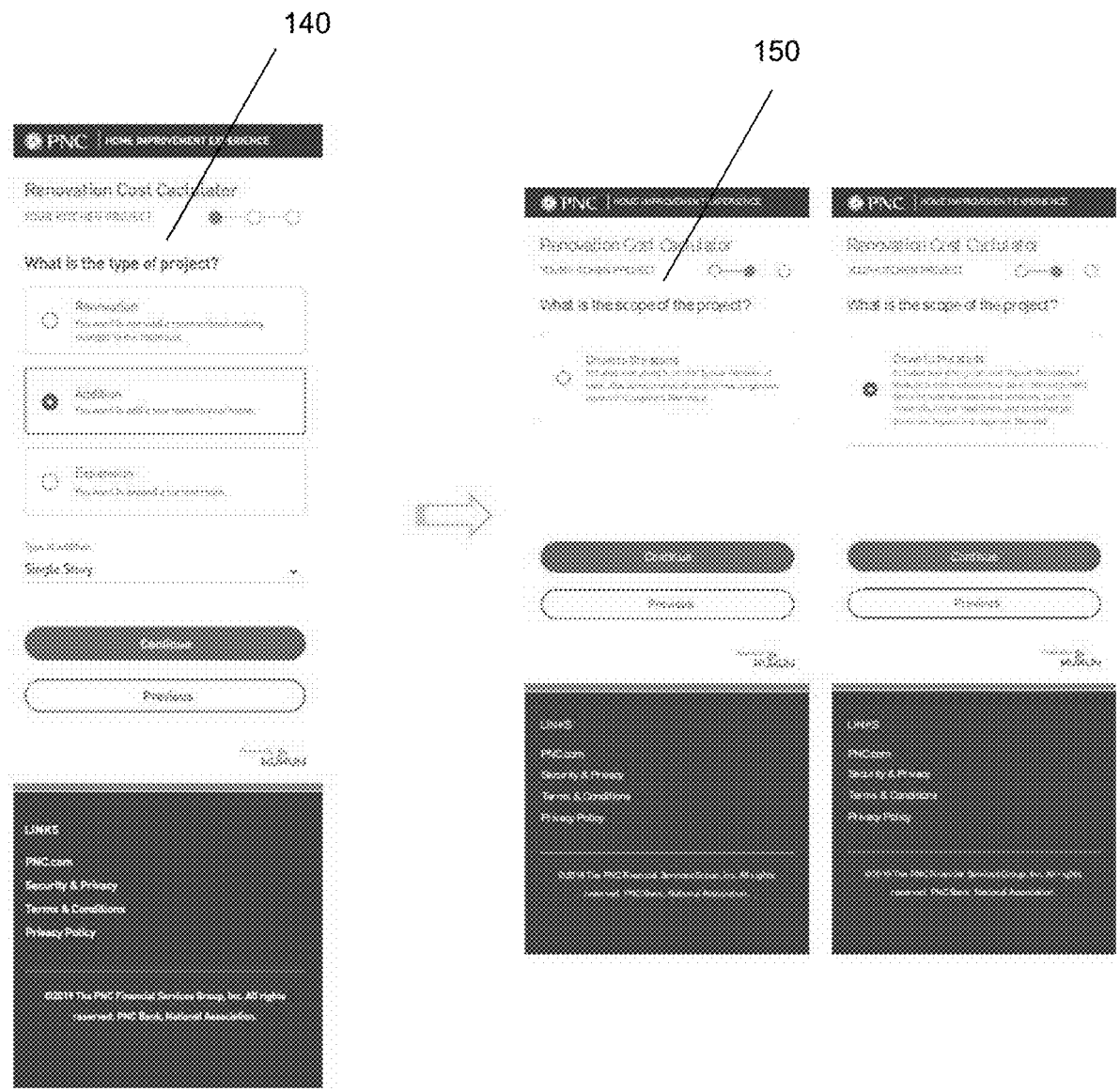

Referring to FIGS. 18-20, the home improvement cost estimate display 120 also includes a cost estimate display 174, providing a user with the estimated cost of the home improvement project. The calculation is based on the information provided by the user and the data acquisitioned by the system 1, wherein the system 1 uses the average costs associated with raw materials and labor within the area defined by the zip code. For instance, the system 1 can acquisition the raw material and labor costs from third party providers, publically available reports, etc. These data can be stored on the memories associated with the system to be acquisitioned from the memories or acquisitioned from the third parties directly each time a cost estimate is requested. The cost estimate display 174 also provides a "How is this calculated?" actuatable text 176 (providing details of the calculation) and a "Show project details" actuatable text 178 (providing details of the project). The system 1 is also configured to provide a user with a calculated recoup value (e.g., realizing return of an amount equal to the cost of the project). Again, this calculation is based on the average returns on investments associated with such projects. A user can access the recoup value via the estimate recoup value button 181 (see FIG. 20). In some embodiments, the system 1 provides a user with the estimated effects of the renovation in addition to or in the alternative to the recoup value. This can include the estimated increase in value of a user's home based on the home improvement.

Figure 24:

Referring to FIG. 20, as noted herein, a user can enter data for more than one home improvement project (e.g., for more than on room in the home, for more than one home, etc.). The home improvement calculator can generate an estimated cost for each project, as well as provide financing options and advice for the same. The system 1 is configured to save the details and the cost estimates for each project and allow a user to retrieve such data at the user's discretion. The user can share such information with other users (e.g., a loan officer of the financial institution, etc.). This can be achieved by emailing details of the project (e.g., downloading it as a pdf) via the project download button 182 (see FIG. 24). In some embodiments, the system 1 is configured to share such information with other users automatically so as to allow them to provide financing options and advice. In further embodiments, the system 1 is configured to automatically extract certain data regarding the project and generate financial options and advice automatically to a user. A user can access the financing options and advice via the finance options button 180.

Figure 25:
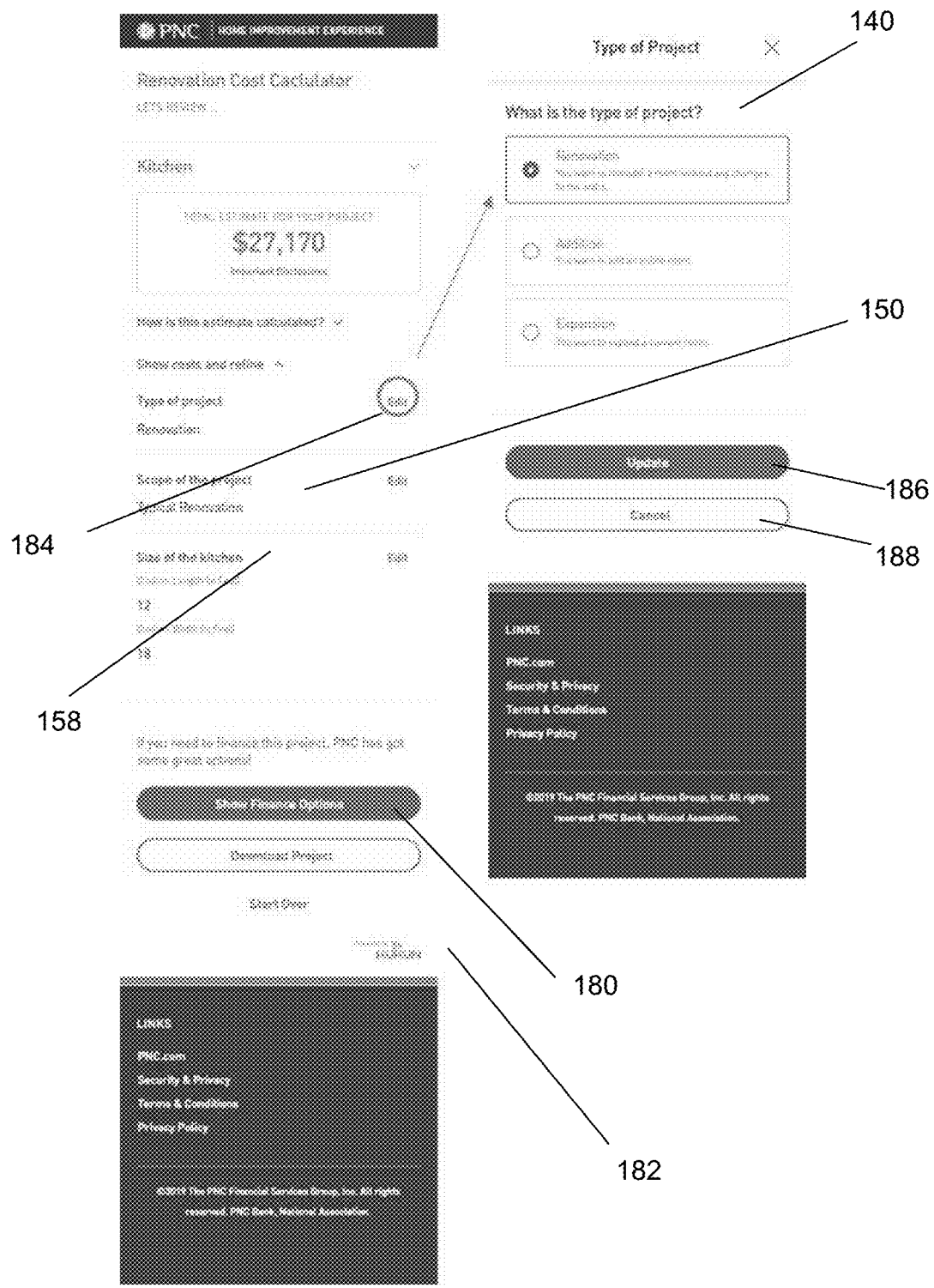
Figure 26:
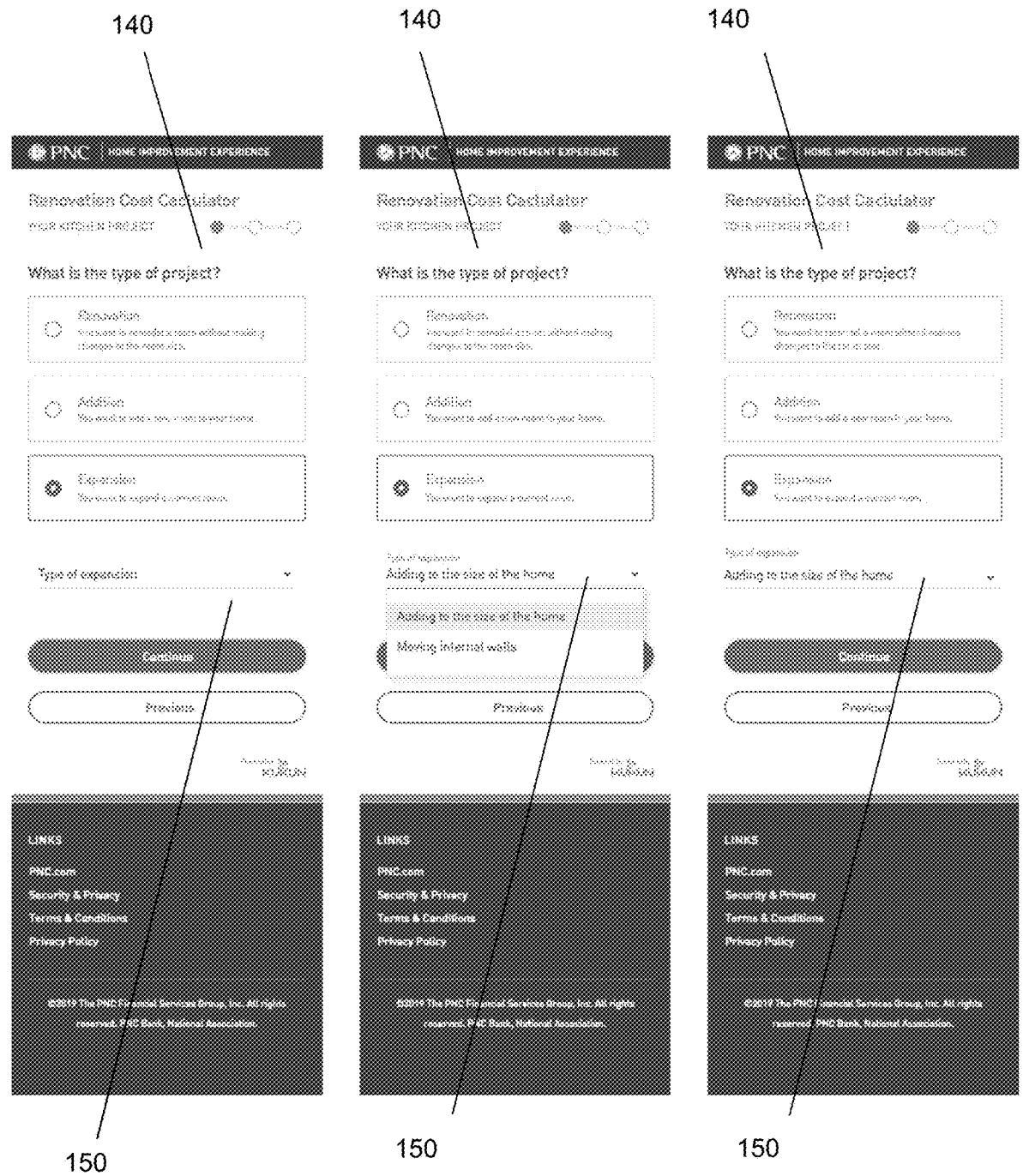
Figure 27:
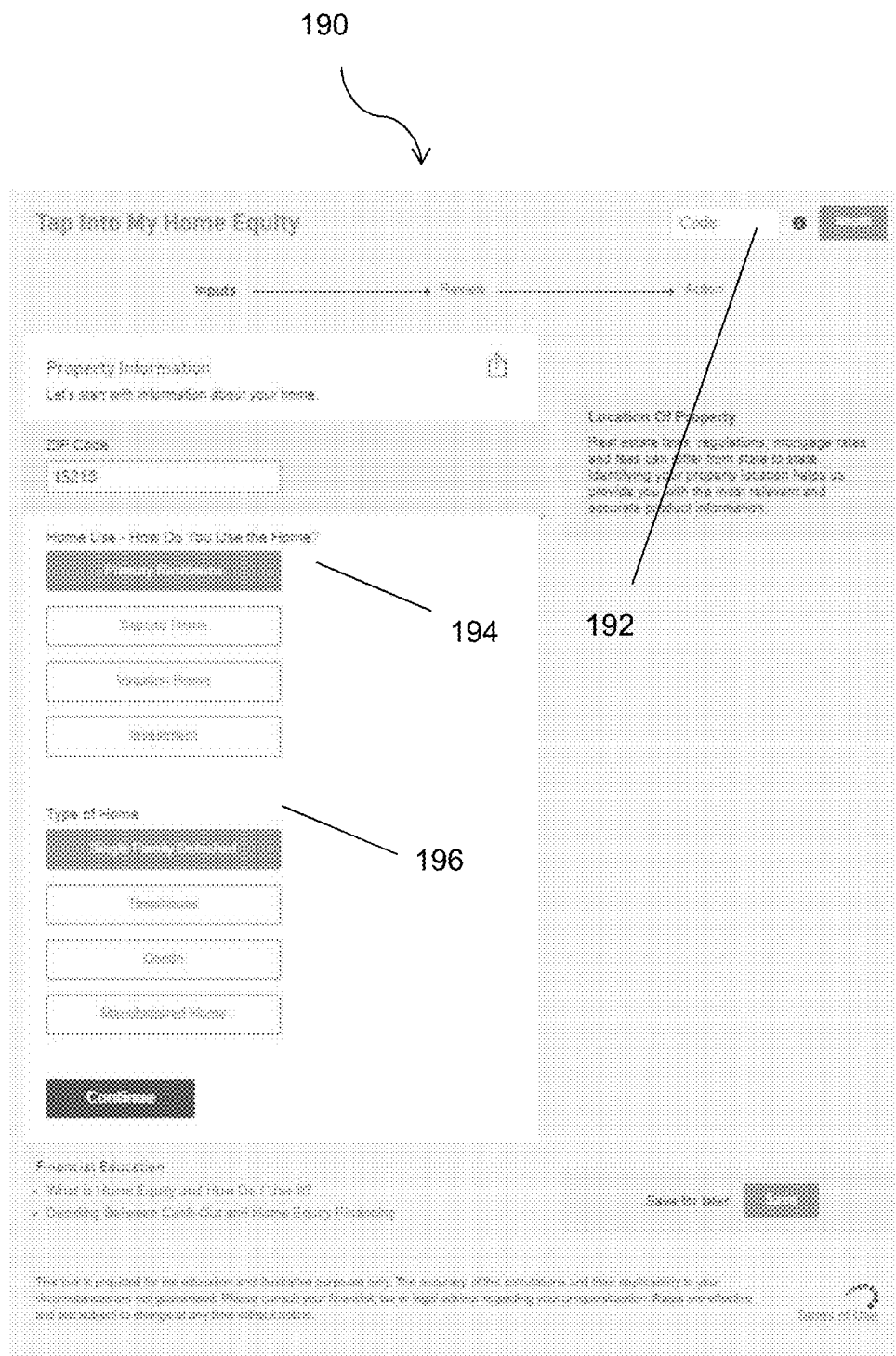
Figure 29:
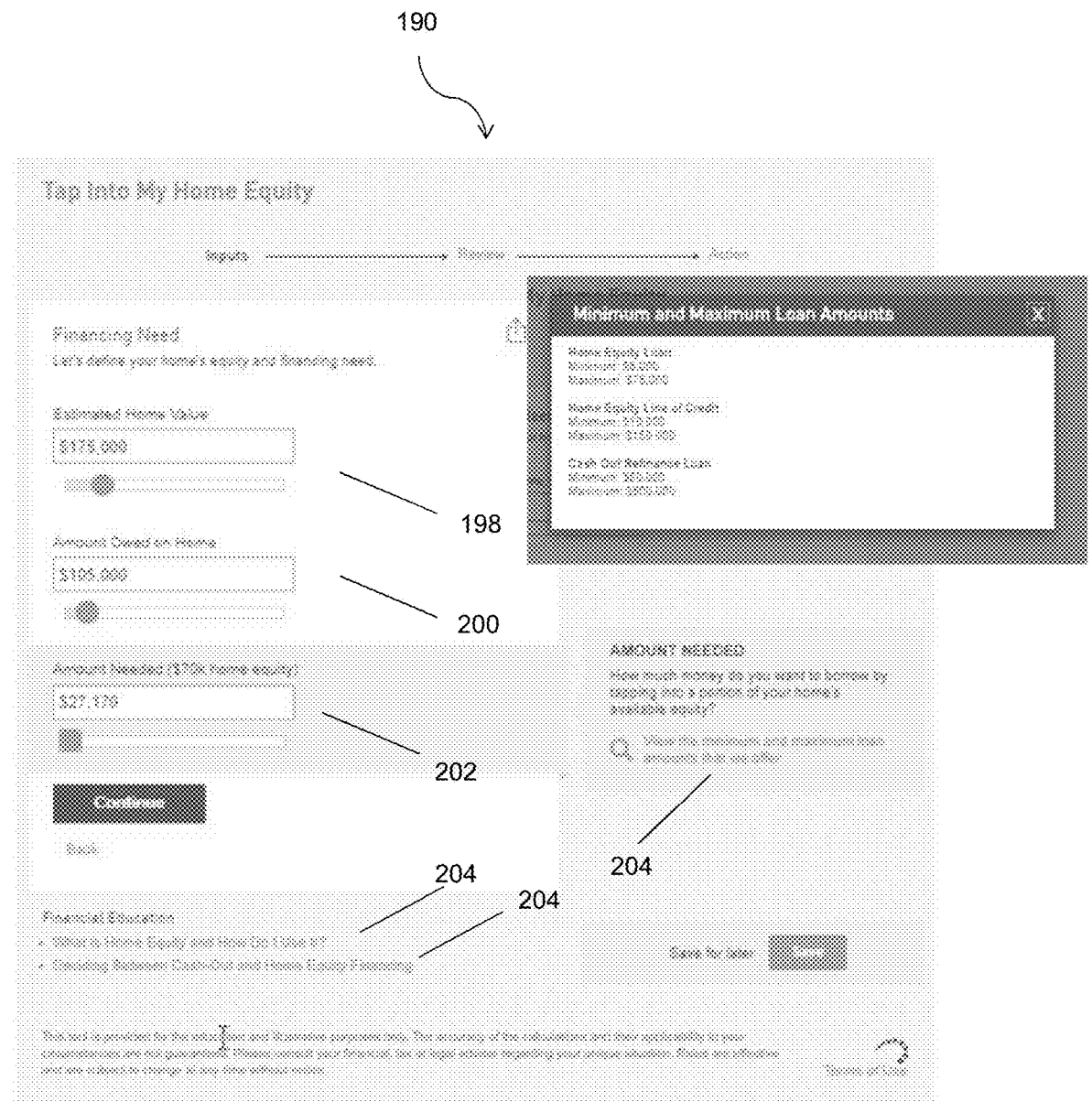
Figure 30:
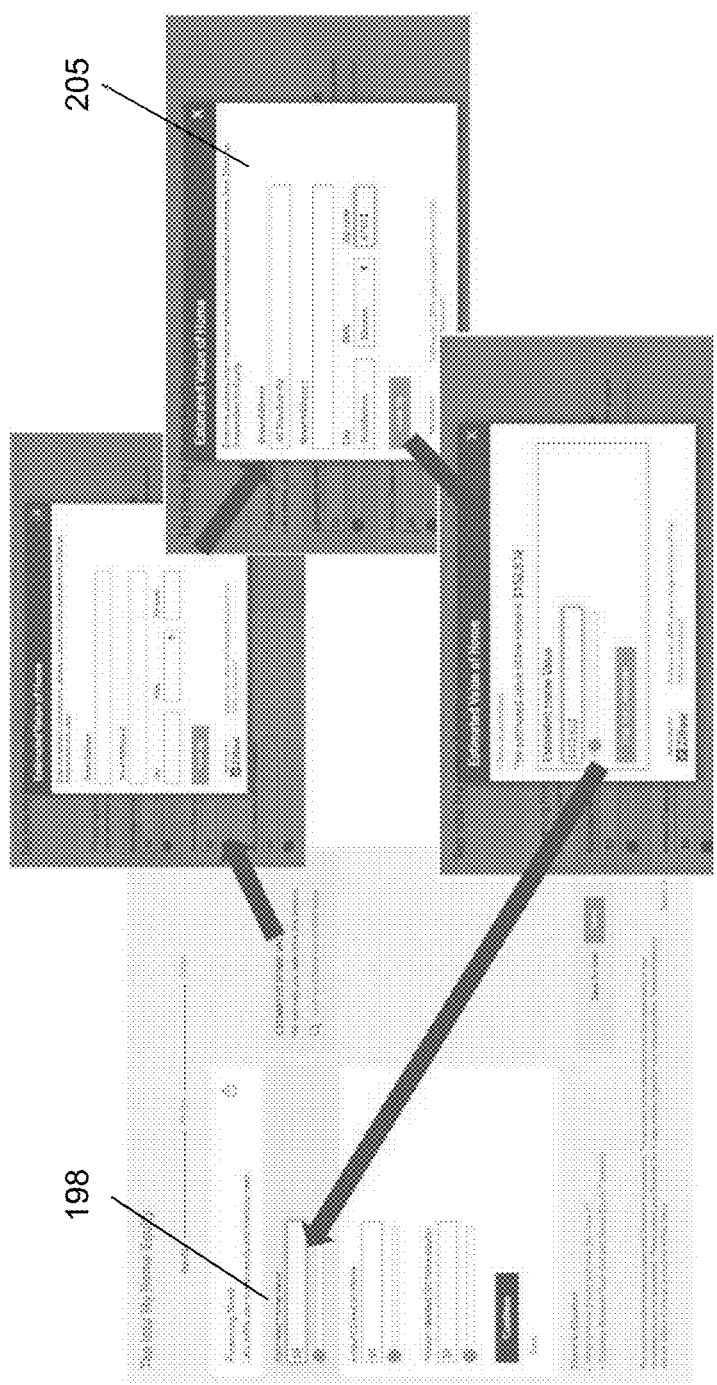

As noted herein, a user can select the type of home improvement project to be performed. FIGS. 21-26 show exemplary home improvement cost estimate displays being implemented for different types of home improvement projects (e.g., a renovation, an addition, and an expansion). FIG. 25 shows an embodiment of the home improvement module 104 in which the displays presented therein have an "edit" actuatable text 184, allowing a user to make edits to the data entered, including allowing a user to change the type of home improvement being performed. The effects of the edits can be implemented via the update button 186 or disregarded via the cancel button 188.

Referring to FIGS. 27-34, some of the financing options provided by the system 1 regarding the home improvement project(s) can be a home equity line of credit, home equity loan, a cash-out refinancing loan, etc. FIGS. 27-34 show exemplary home equity financing option displays 190 for a calculated home improvement cost estimate and associated home improvement project. This display 190, or at least some portions of it, may be part of the debt consolidation module 102, which will be explained in detail later. In fact, some or all of displays 190, 206, 220, and 226 (shown in FIGS. 27-35) can be part of the debt consolidation module 102. This demonstrates the dynamic and fluid nature of the system 1 (e.g., the system can be configured to that users can access any of the displays from any of the modules). It should be noted that while displays 190, 206, 220, and 226 of FIGS. 27-35 are described and illustrated now as being able to be accessed via the home improvement module 104, the system 1 can alternatively be configured so that these displays are solely dedicated to the debt consolidation module 102 and can only be accessed via the debt consolidation module 102.

Upon the system 1 determining the cost estimate for a project and after a user selects the finance options button 180, the system 1 generates the home equity financing option display 190. One of the financing options can be taping into the user's home equity to finance the home improvement project. In this regard, the system 1 calculates the collateral for the home improvement project, factors in any primary and/or secondary home loan rates and terms, generates a code to be sent to the user via email, text, regular post mail, etc., and generates a financing option result. The code 192 can be entered via the code box 192 to allow a user to pull the financing option result and display it on the client device 3. The zip code will be pre-populated based on the user entered data via the home improvement cost estimate display 120. A user can also provide information about the collateral to be used. For instance, the financing option display 190 can prompt the user to select answers related to the use 194 of the home being used as collateral (e.g., primary residence, second home, vacation home, investment, etc.), the type 196 of home being used as collateral (single family home, townhouse, condo, manufactured home, etc.), estimated home value 198, amount owed on the home 200, the amount needed for the home equity line of credit 202, the address of the home 205, the amount to be borrowed 201, if the home is mortgaged or if a line of equity is secured in the home 203, if the user plans to pay off the mortgage or line of credit 205, etc. These data can be entered via any one or combination of textual inputs, radio buttons, drop down menus, slide bars, etc. Other home equity tutorials 204 (e.g., informational links and pop-ups) can be displayed, which can include "What is Home Equity and How Do I Use it" link, "Deciding Between Cash-Out and Home Equity Financing" link, "View the minimum and maximum loan amounts that we offer" link and popup window, etc. The system 1 can also acquisition pertinent information from third parties, such as Zillow for example, to assist in providing estimates and making calculations.

Figure 31:
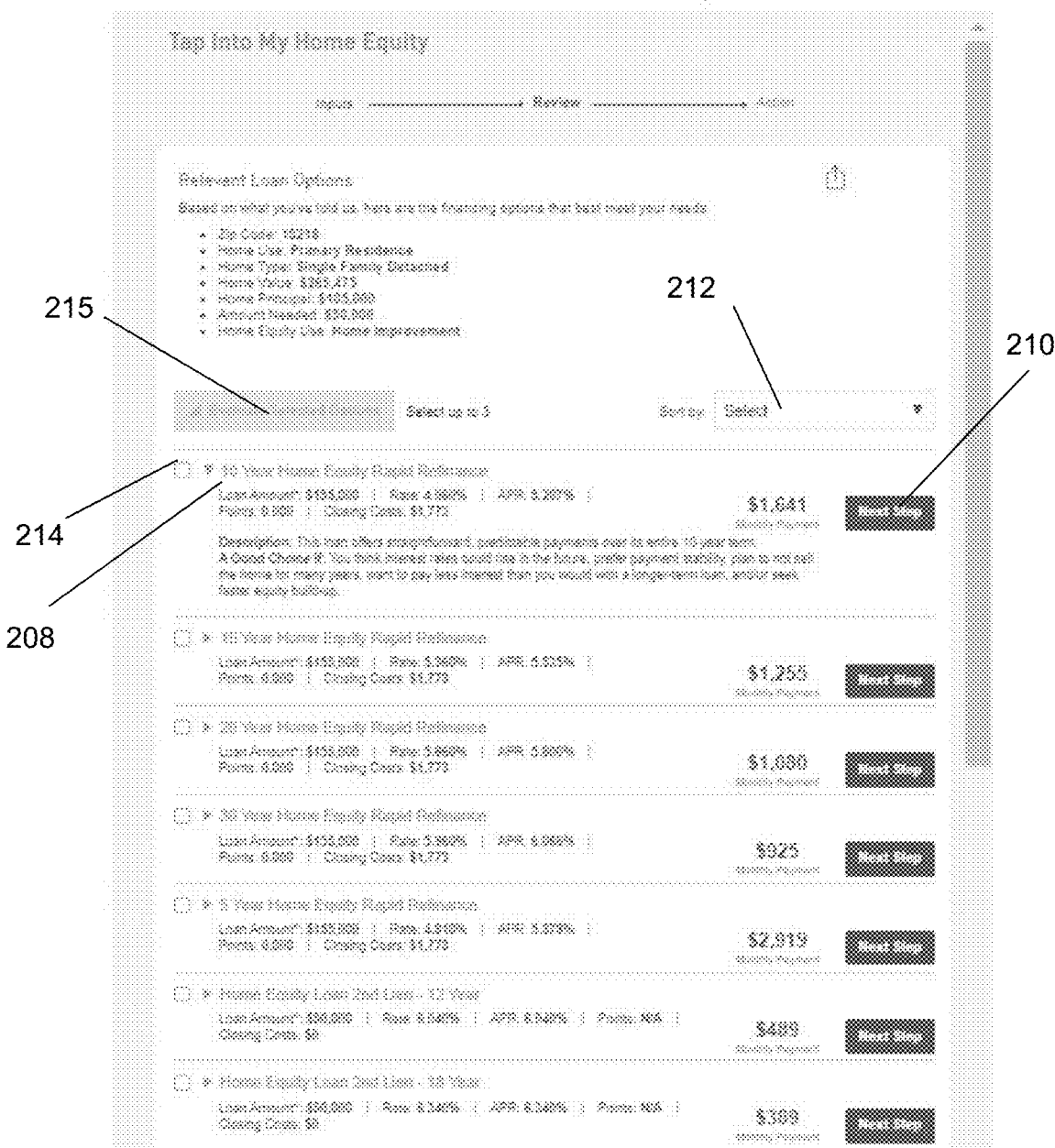
Figure 32:
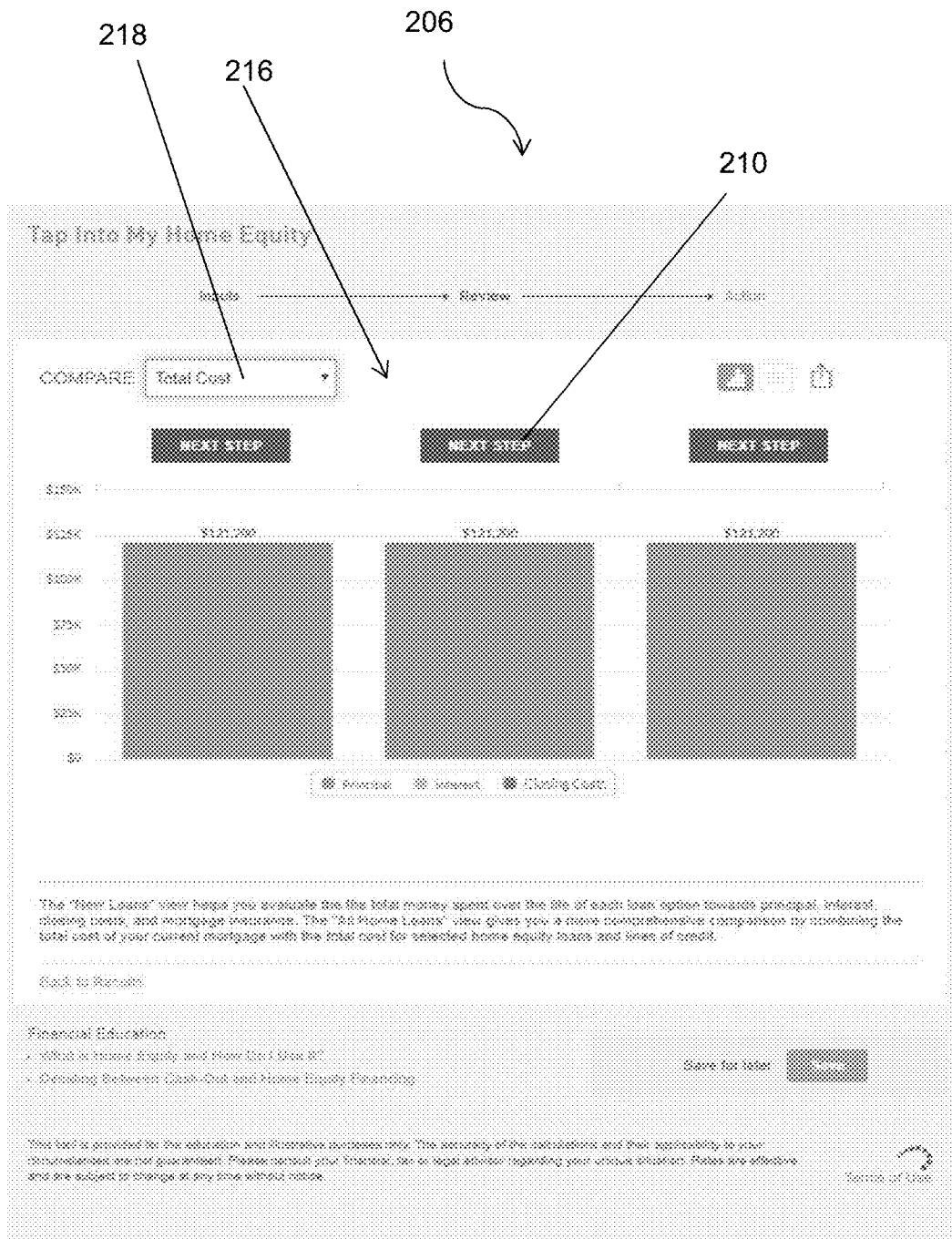
Figure 33:
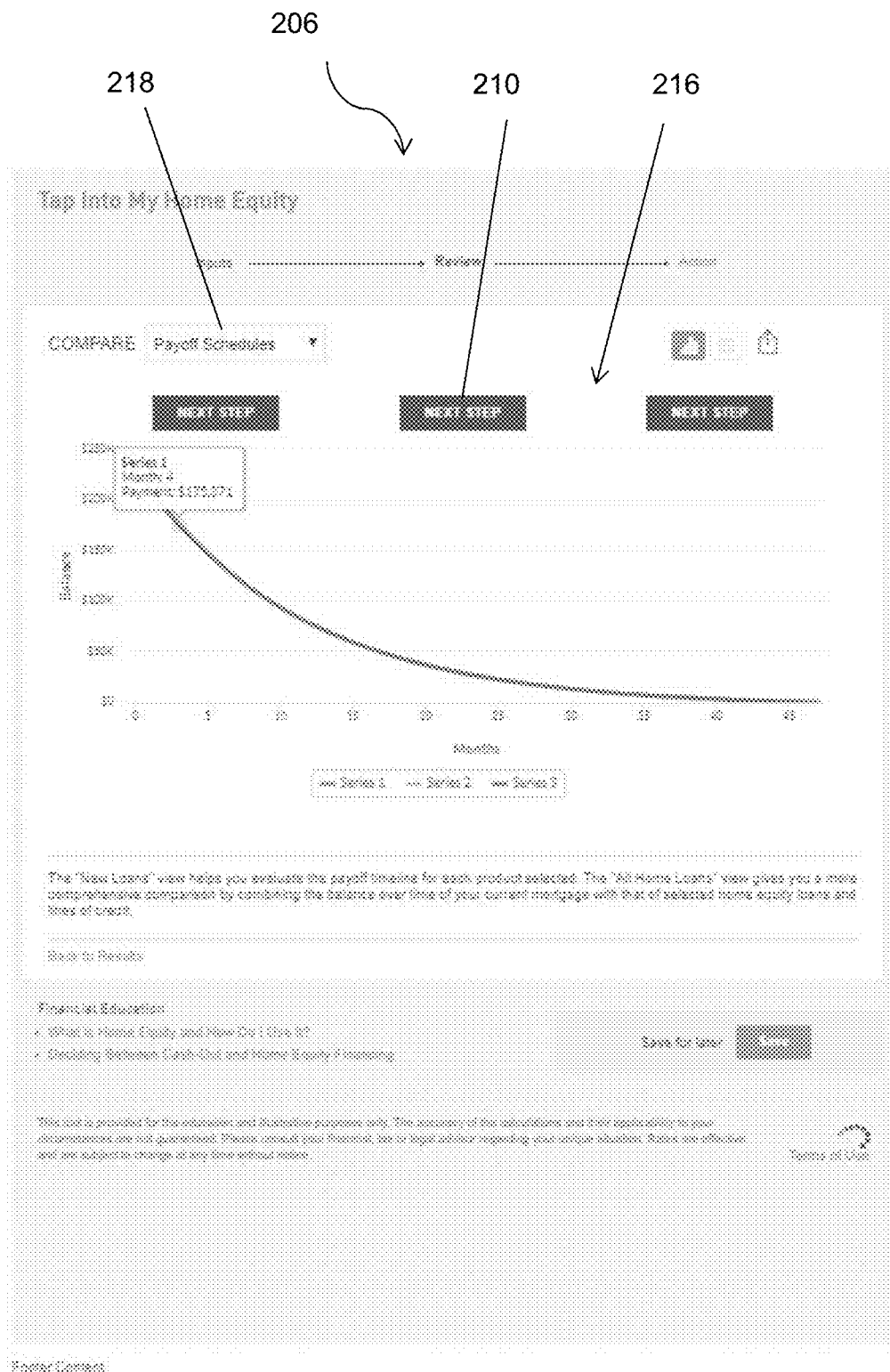

FIGS. 31-33 show financial option result displays 206 presenting financial option results computed by the system 1. Based on the information entered by the user and the data acquisitioned by the system 1, the system 1 can generate a list (in tabular format) of home equity options to be used for financing. Each option 208 is displayed with a truncated explanation of details and a Next Step 210 button to navigate a user through an application process (an application process pertaining to applying for the financial option). The financial option result display 206 includes a sort button 212 to allow a user to sort the tabulated list by a criterion 218 (e.g., term of loan, number of points, APR, fees, total cost, payoff schedule, etc.). The financial option result display 206 also includes an "Evaluate Selected Options" 215, which prompts the system 1 to provide the user with a more detailed and/or graphical comparison of selected (selectable via the selectable check boxes 214) options. When selecting the Evaluate Selected Options 215, the options selected are presented as a side-by-side comparison 216 for a specific criterion 218 (selectable via a drop down menu). For instance, FIG. 32 shows a side-by-side comparison 216 for three selected options based on the criterion for total cost. In some embodiments, the side-by-side comparison 216 can be graphical (e.g., bar graph as shown in FIG. 32, a line plot as shown in FIG. 33, etc.).

Figure 34:
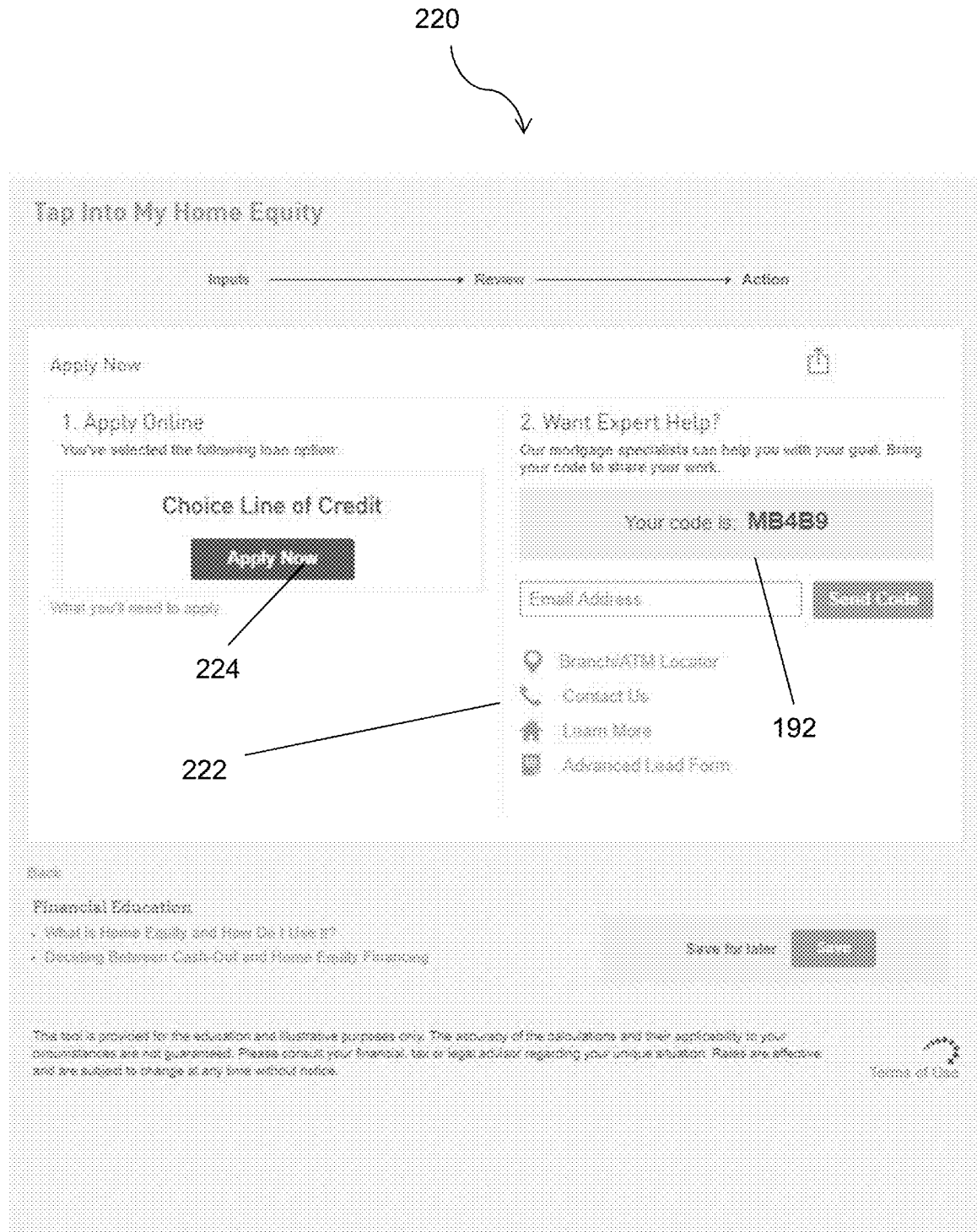

Referring to FIG. 34, upon selecting the Next Step 210 button, the system 1 navigates the user through a financing application process by populating a home equity financing application display 220. A user can enter the code 192 or the code 192 can be automatically populated, which will transmit the details of the financing options and home improvement project to a loan officer, for example. A user can enter their contact information (e.g., email, phone number, etc.) to provide the loan officer the ability to contact them. The home equity financing application display 220 includes additional support information 222, such as Branch/ATM locator information, Contact Information, Learn More literature, Advance Lead Forms, etc. The home equity financing application display 220 also includes an apply now 224 button to allow a user to apply for a desired financing product.

Figure 35:
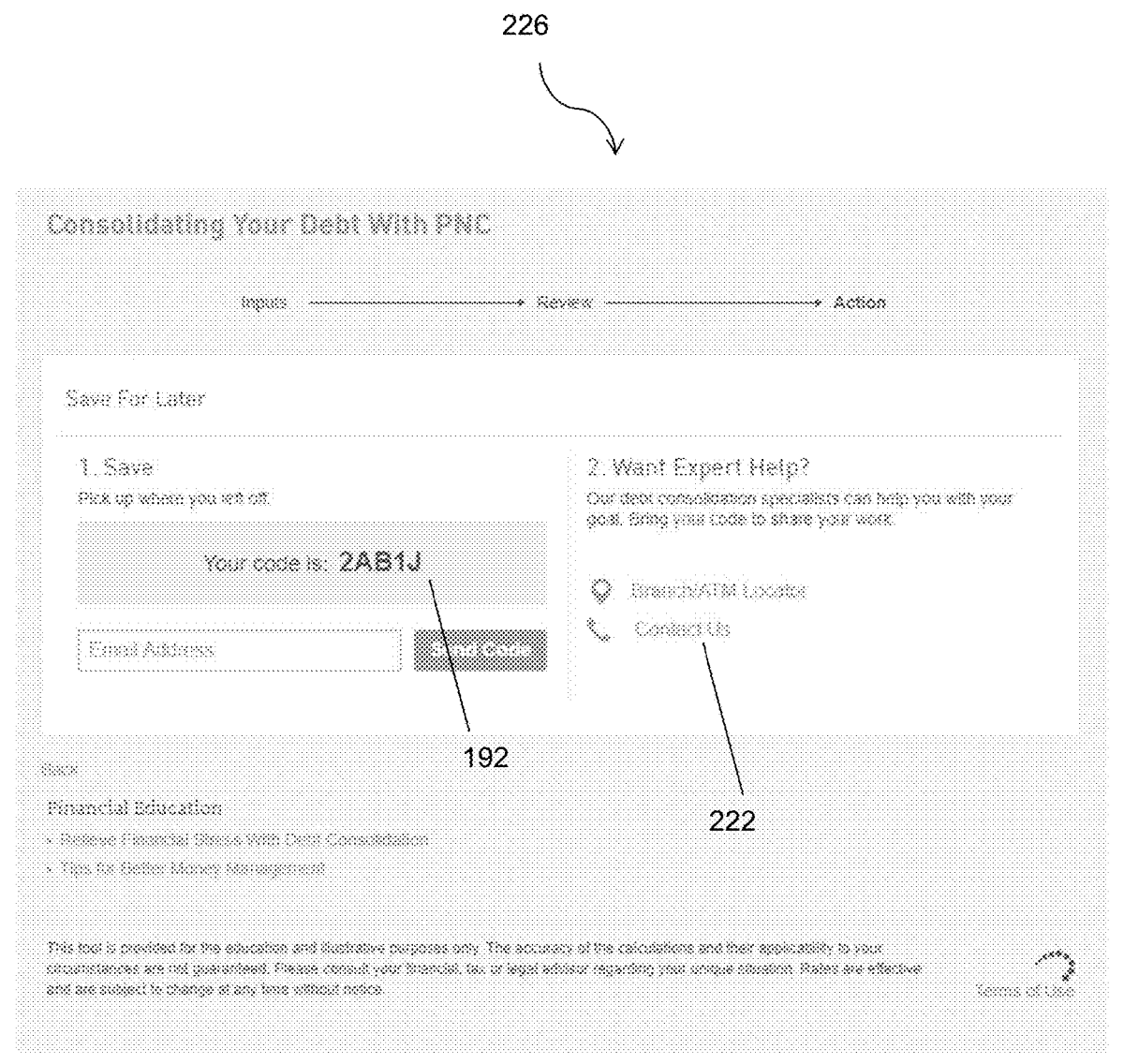

Referring to FIG. 35, in addition to taping into the user's home equity to finance the home improvement project, another financing option can be consolidating debt. While consolidating debt may not be a financial solution linked directly to financing the home improvement, it can be beneficial for a user to consider consolidating debt, especially if the user is about to take on more debt. Again, this demonstrates the dynamic nature and robustness of the system 1. FIG. 35 shows the system 1 generating a debt consolidation application display 226. This display 226, as well as the home equity financing option displays 190, may be part of the debt consolidation module 102, which will be explained in detail later. However, upon selecting the Next Step 210 button, the system 1 can navigate the user through a debt consolidation application process, in addition to the financing application process described above, by populating the debt consolidation application display 226. A user can enter the code 192 or the code 192 can be automatically populated, which will transmit the details of the financing options and home improvement project to a loan officer. A user can enter their contact information (e.g., email, phone number, etc.) to provide the loan officer the ability to contact them. The debt consolidation application display 226 includes the additional support information 222, such as Branch/ATM locator information, Contact Information, Learn More literature, Advance Lead Forms, etc. A user can begin the process of debt consolidation via this debt consolidation application display 226, or a user can exit the home improvement module 104 and enter the system 1 via the debt consolidation module 102 to do the same.

The debt consolidation module 102 will be discussed next. As shown in FIG. 36, upon entering the debt consolidation module 102, the system 1 directs a user to the debt consolidation landing page 228. The debt consolidation landing page 228 includes icons related to debt consolidation options and features. The icons can include a Debt Consolidation Calculator icon 230, a learn about debt consolidation icon 232, a browse low interest credit card icon 234, a get a personal loan icon 236, a user home equity to consolidate debt icon 238, a consolidate student debt icon 240, etc.

Figure 37:
FIGS. 37-39 show exemplary debt consolidation calculator displays tor the purposes of debt consolidation.
Figure 38:
Figure 39:

Referring to FIGS. 37-39, the debt consolidation module 102 includes a debt consolidation calculator display 242 that allows a user to begin to enter data for the purposes of debt consolidation. The system 1 is programmed to utilize a debt consolidation calculator based on information entered by a user. The data entered can include the total debt 244, the current monthly payment 246, the effective interest rate 248 (the effective interest rate can be inputted by a user or it can be calculated automatically by the system 1 by clicking the "Help me calculate my debt" debt consolidation link 250), etc. FIGS. 38-39 show an asset-collateral screen 243 of the debt consolidation calculator display 242. After the total debt 244, the current monthly payment 246, the effective interest rate 248 have been entered, a user can enter information about any assets he/she is considering using as collateral via the asset-collateral screen 243. This information can include whether the user owns a home 252, the estimated value of the home the user owns 254 (can be entered by a user or determined by the system 1), the outstanding mortgage on the home 256, etc. These data can be entered via textual inputs, radio buttons, drop down menus, slide bars, etc. A user can enter the information for the debt consolidation calculator for each debt security that will be consolidated. These data can be entered in the form of textual inputs, drop down menus, radio buttons, slide bar, etc. Debt consolidation tutorials and literature can be accessed via debt consolidation links 250 (e.g., "Relieve Financial Stress With Debt Consolidation", "Tips for Better Money Management", "Help me calculate my debt", etc.). As noted above, displays 190, 206, 220, and 226 (shown in FIGS. 27-35) can be part of the debt consolidation module 102, and thus the system 1 can be configured to navigate the user to these displays after completing debt consolidation calculator displays 242 shown in FIGS. 37-39.

Figure 40:
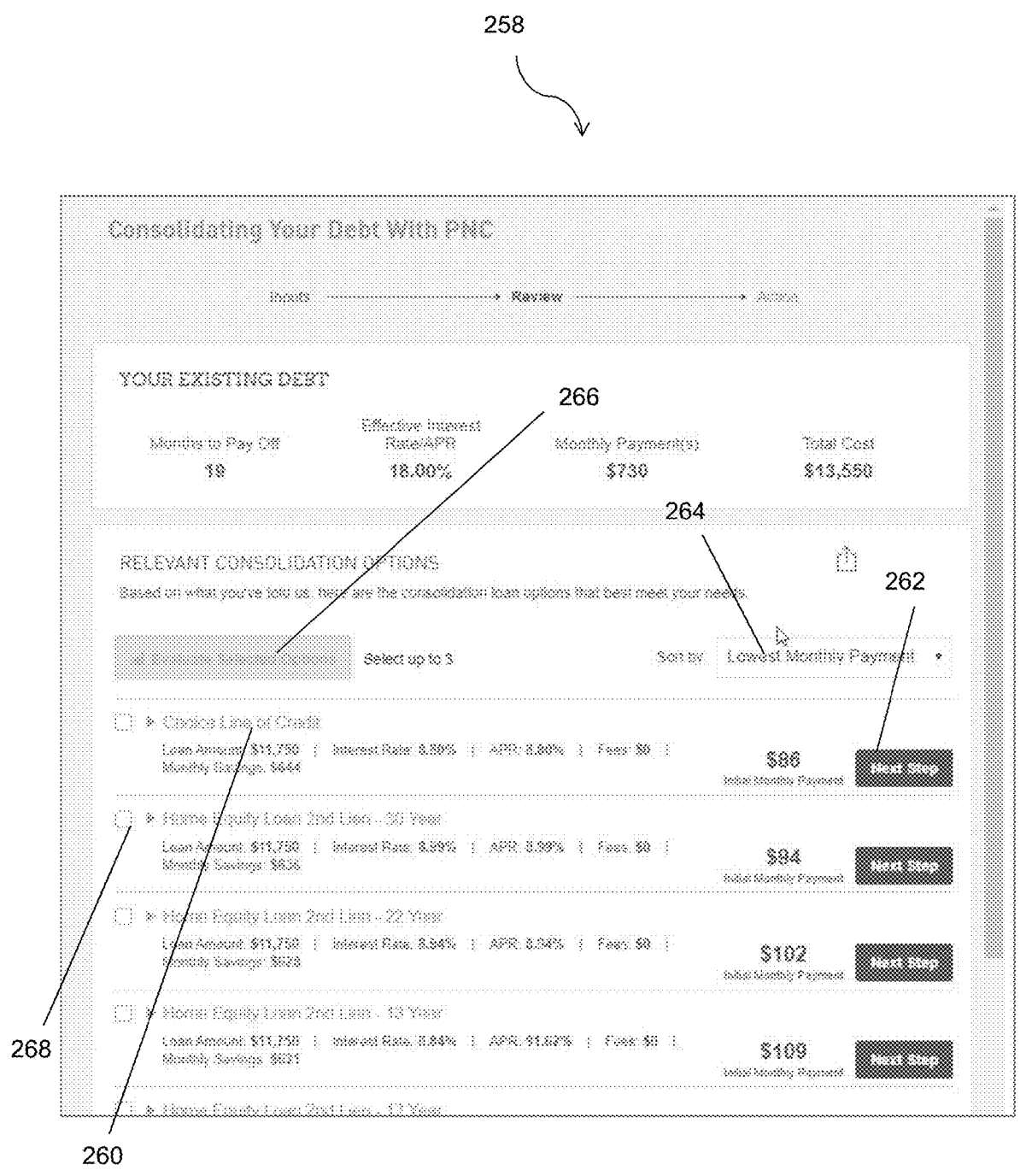
Figure 41:
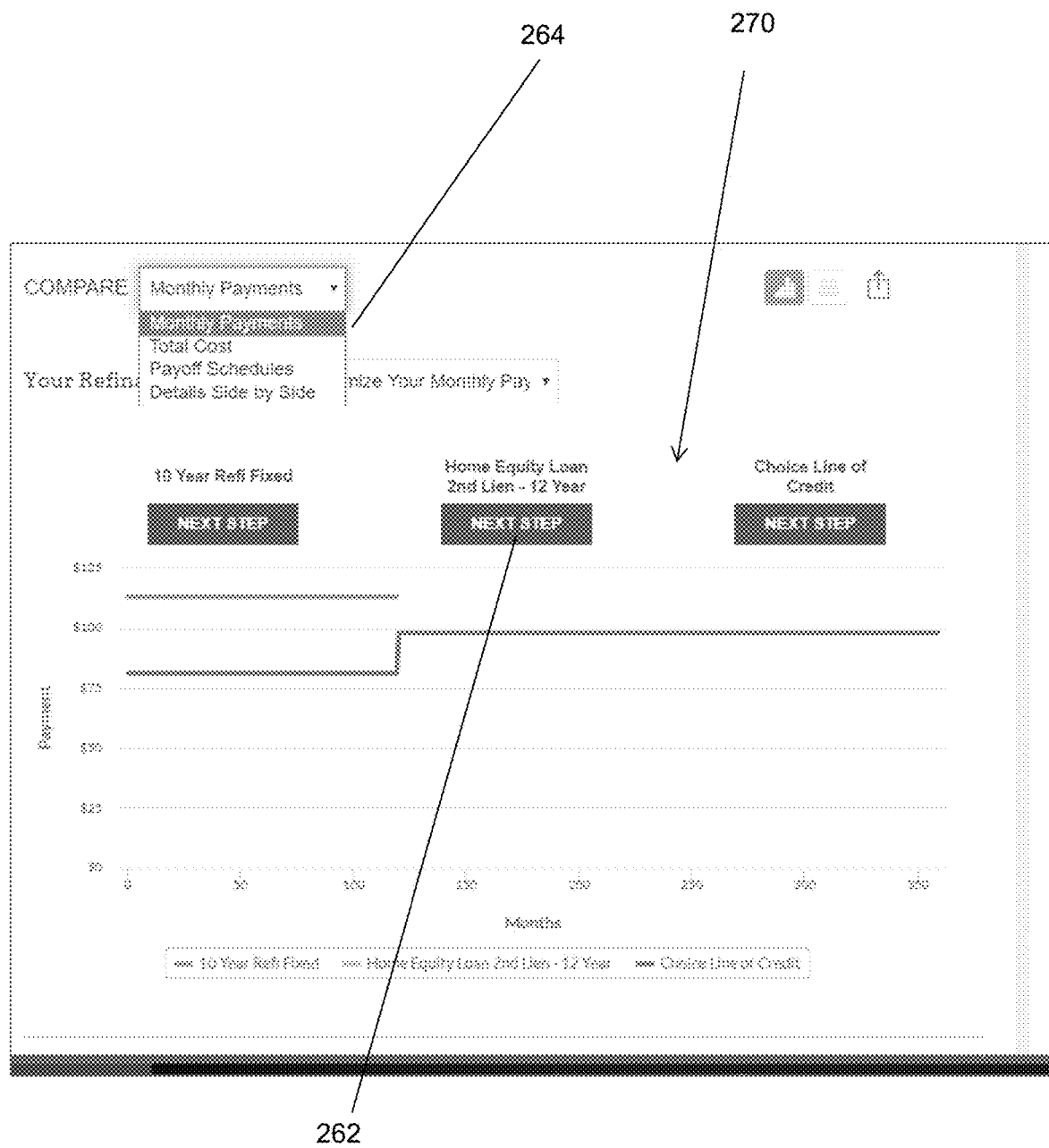
Figure 42:

FIGS. 40-42 show a debt consolidation option result display 258 of consolidation option results computed by the system 1. For instance, based on the information entered by the user and the data acquisitioned by the system 1, the system 1 generates a list (in tabular format) of debt consolidation options. Each option 260 is displayed with a truncated explanation of details and a Next Step 262 button to navigate a user through an application process. The debt consolidation option result display 258 includes a sort button to allow a user to sort the tabulated list by a criterion 264 (e.g., monthly payment, total cost, payoff schedule, etc.). The consolidation option result display 258 also includes an "Evaluate Selected Options" 266, which prompts the system 1 to provide the user with a more detailed and/or graphical comparison of selected (selectable via the selectable check boxes 268) options. When selecting the Evaluate Selected Options 266, the options selected can be presented as a side-by-side comparison 270 for a specific criterion 264 (selectable via a drop down menu). The criterion 264 can include lowest monthly payment, effective interest rate, fees, etc. For instance, FIGS. 41-42 show two different a side-by-side comparisons 270 for three selected options based on the criterion for monthly payments, comparing a 10-year refi-fixed rate option, a home equity loan $2^{nd}$ lien—12 year option, and a choice line of credit option. FIG. 41 is a graphical comparison and FIG. 42 is a tabular comparison.

Figure 43:
FIG. 43 shows an exemplary debt consolidation application display.

Referring to FIG. 43, as noted above, the system 1 can generate a debt consolidation application display 226 as part of the debt consolidation module 102. Upon selecting the Next Step 262 button, the system 1 can navigate the user through a debt consolidation application process by populating the debt consolidation application display 226. The process can be similar to the one described for display 220 in FIG. 34. A user can enter a code 192 or the code 192 can be automatically populated, which will transmit the details of the financing options and debt consolidation to a loan officer, for example. A user can enter their contact information (e.g., email, phone number, etc.) to provide the loan officer the ability to contact them. The debt consolidation application display 226 includes additional support information 222, such as Branch/ATM locator information, Contact Information, Learn More literature, Advance Lead Forms, etc.

Figure 44:
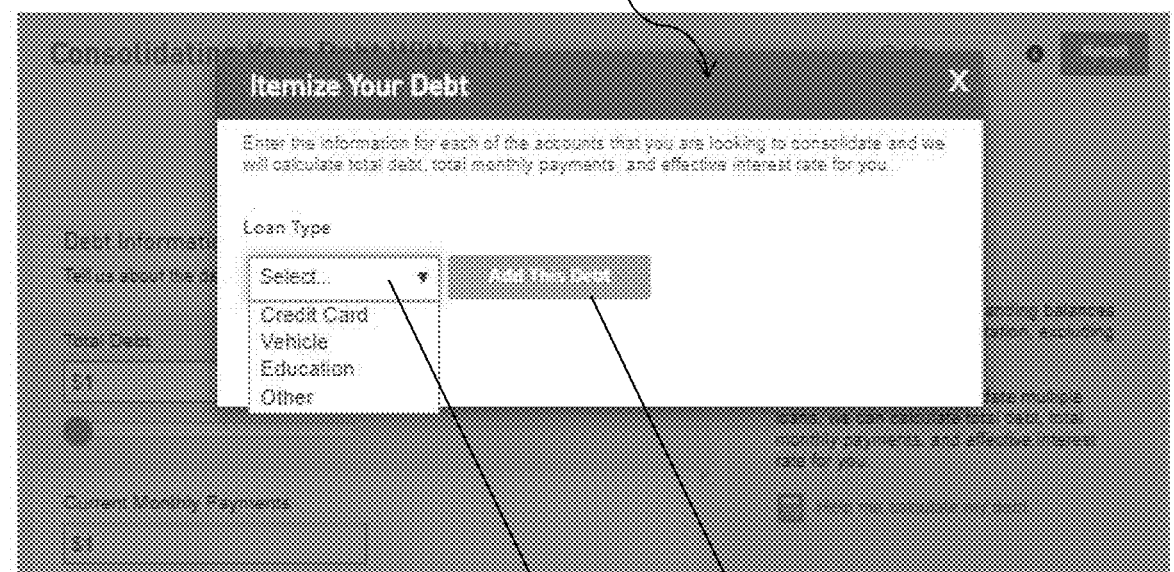
FIG. 44 shows an exemplary itemized debt itemized debt window to display.
Figure 45:
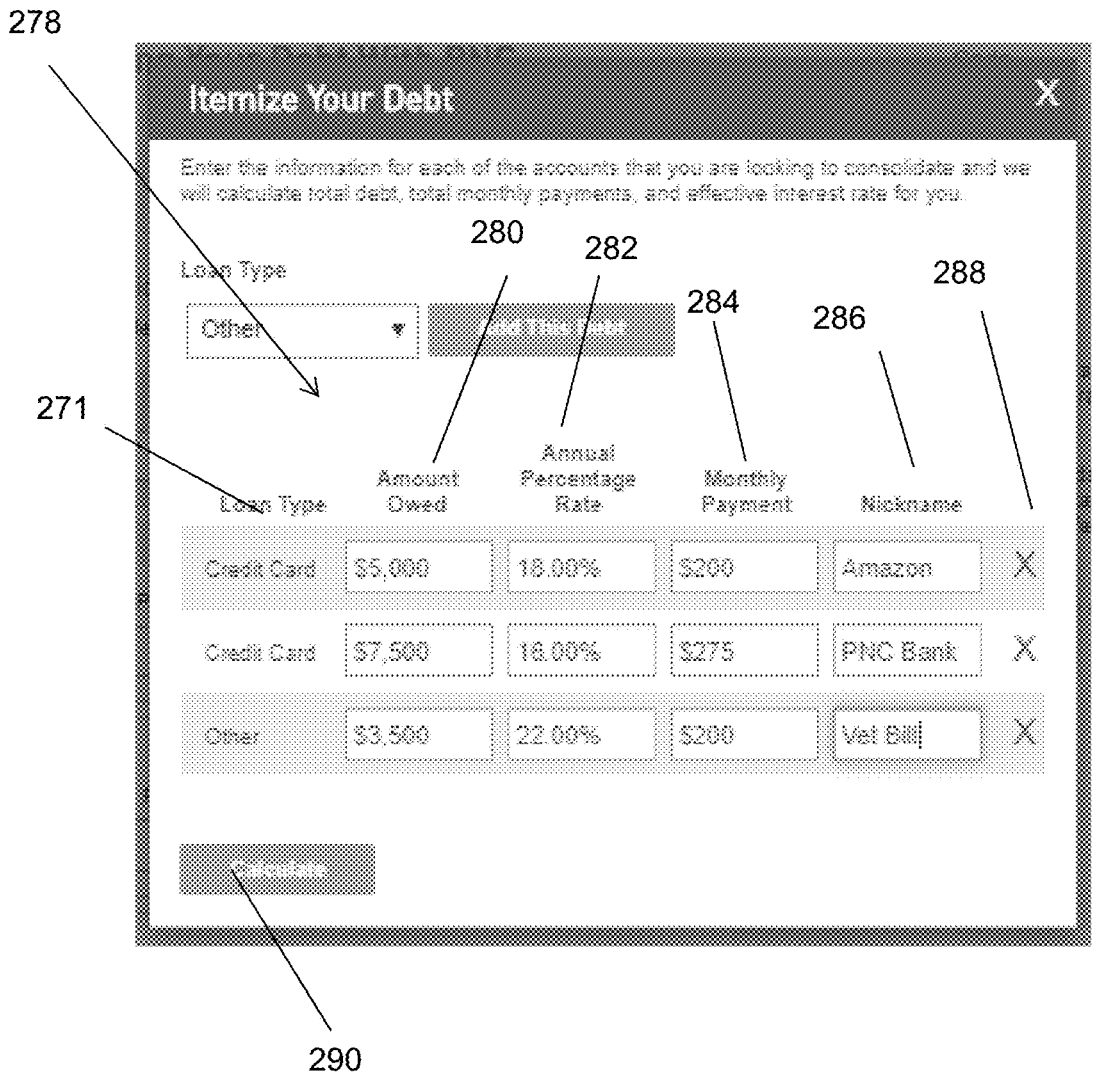
FIG. 45 shows an exemplary itemized debt table.
Figure 46:
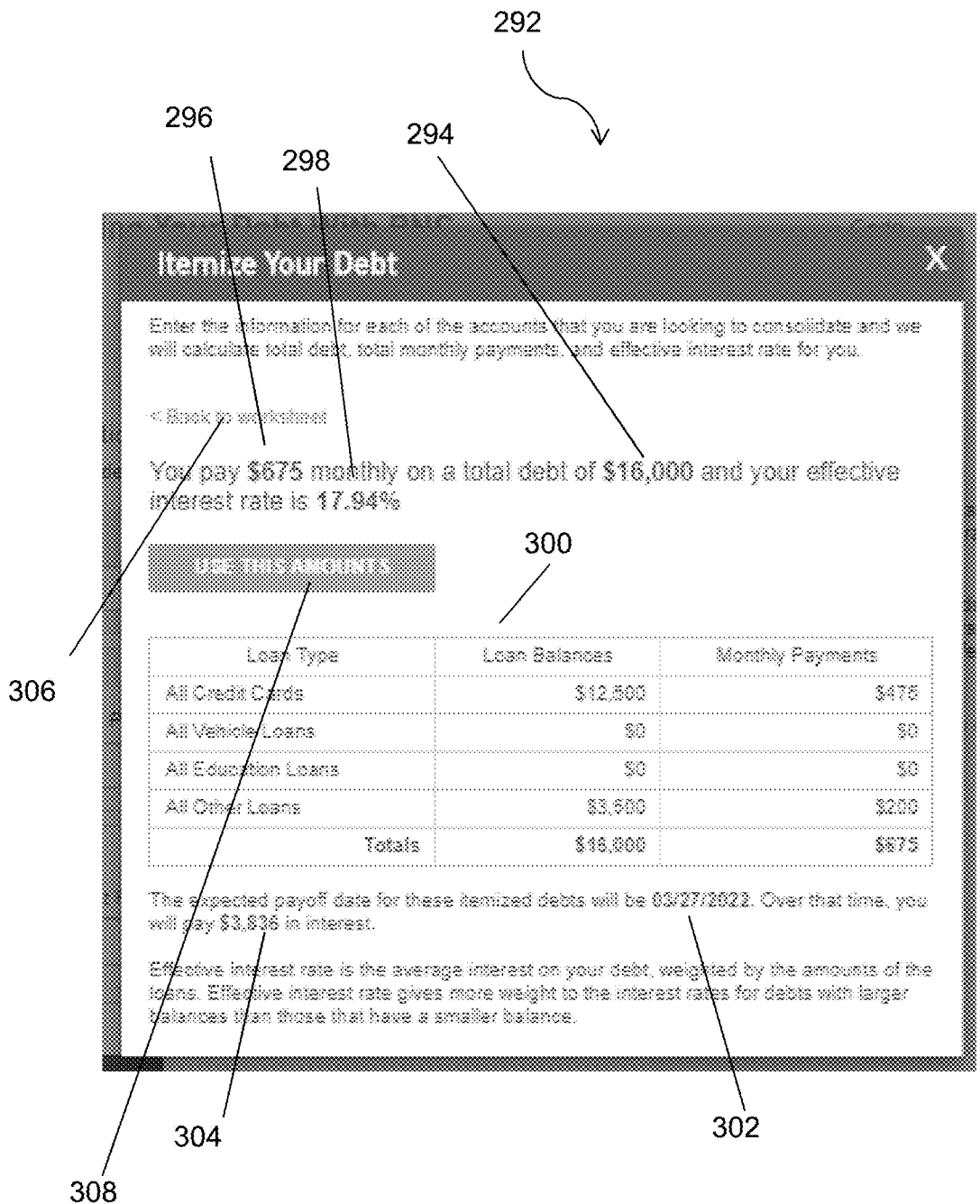
FIG. 46 shows an exemplary itemized debt confirmation window.

In some embodiments, the user can have an option to enter debts as a whole (see FIG. 37) or enter an itemized list of debts (see FIG. 44). For instance, a user can click the "Help me calculate my debt" debt consolidation link 250 to cause an itemized debt window 272 to display. The itemized debt window 272 includes a loan type drop-down box 274 and an "Add This Debt" button 276. A user can select the loan type 271(e.g., credit card, vehicle, education, other, etc.) from a drop-down menu of the drop-down box 274 and add the loan by clicking the Add This Debt" button 276. After adding a loan type, the itemized debt window 272 displays an itemized debt table 278 (see FIG. 45) for each loan type 271. For instance, FIG. 45 shows an exemplary implementation where a user entered data pertaining to a credit card type loan, a credit card type loan, and an other type loan. The itemized debt table 278 includes table headers for loan type 271, amount owed 280, annual percentage rate 282, monthly payment 284, etc. In some embodiments, the table 278 includes a nickname 286 header to allow a user to assign a nickname to the type of loan. The table 278 is configured to allow a user to enter text regarding the amount owed, annual percentage rate, monthly payment, and nickname. The table 278 also includes an X icon 288 to allow a user to delete any one or combination of loan types 271 from the list. Once the user has completed the itemized list, the user can select a calculate button 290, which will cause the system 1 to display an itemized debt confirmation window 292 (see FIG. 46). The itemized debt confirmation window 292 includes the calculated total debt 294, the calculated monthly payment 296 for the calculated total debt 294, and the calculated effective interest rate 298 for the calculated total debt 294. The confirmation window 292 further includes a debt summary table 300, an expected payoff date 302 and the overall interest 304 a user will pay if the user makes the monthly payments to satisfy the total debt 294, etc. A user can click the "back to worksheet" 306 button to edit the itemized debts. A user can select the "Use This Amounts" button 308 as confirmation to use these itemized and total amounts as the debt. Once confirmed, the debt information is used to update the debt consolidation calculator. The system 1 would then navigate to the consolidation calculator display 242 (see FIG. 37) to automatically populate the debt figures (e.g., the total debt, the monthly payment, and the effective interest rate). Again, as noted above, 190, 206, 220, and 226 (shown in FIGS. 27-35) can be part of the debt consolidation module 102, and thus the system 1 can navigate the user to these displays after completing debt consolidation calculator displays 242 shown in FIGS. 37-39.

Figure 47:
FIGS. 47-50 show exemplary side-by-side comparison displays for various debt consolidation financial solutions based on different consolidation criteria.
Figure 48:
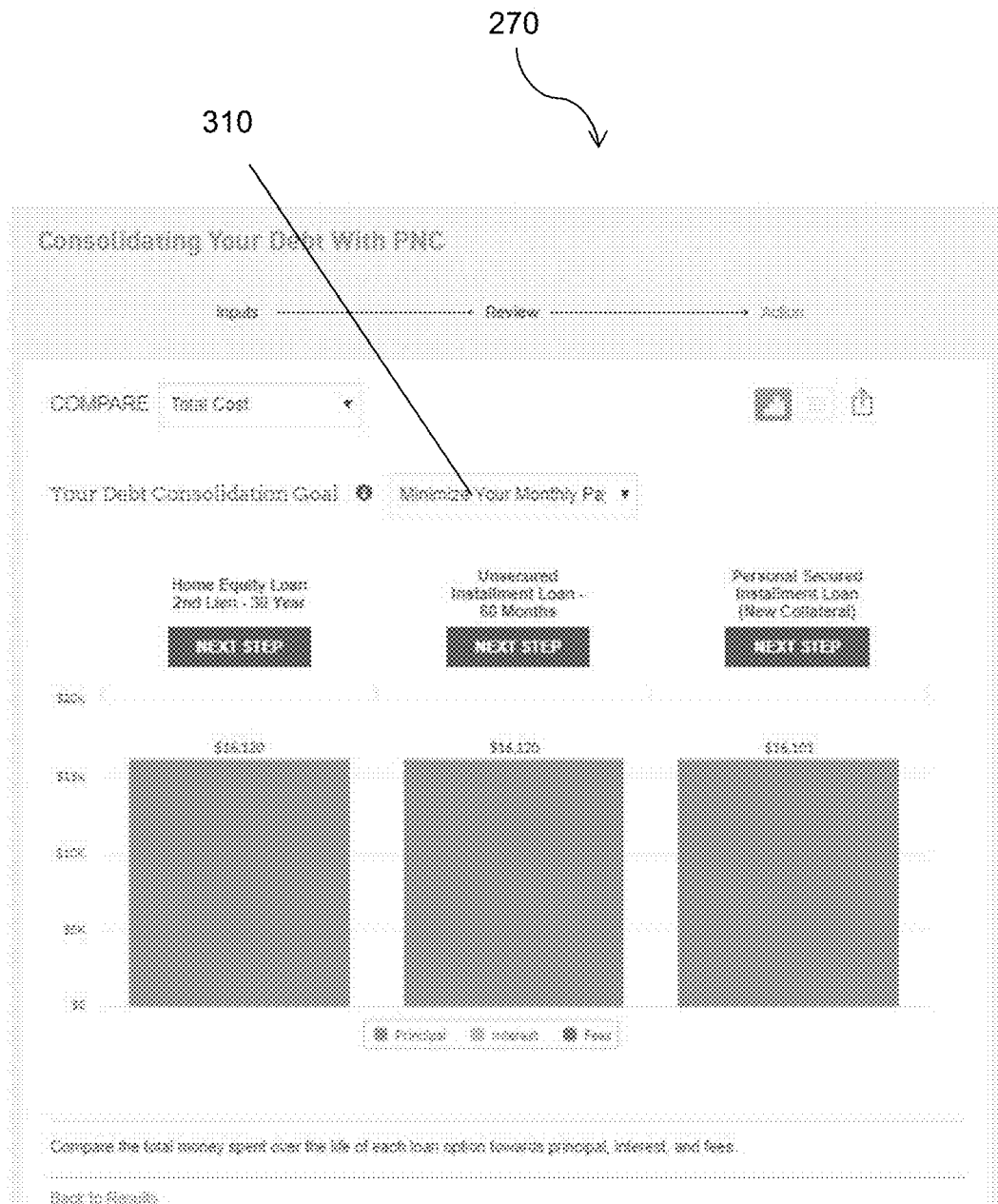
Figure 49:
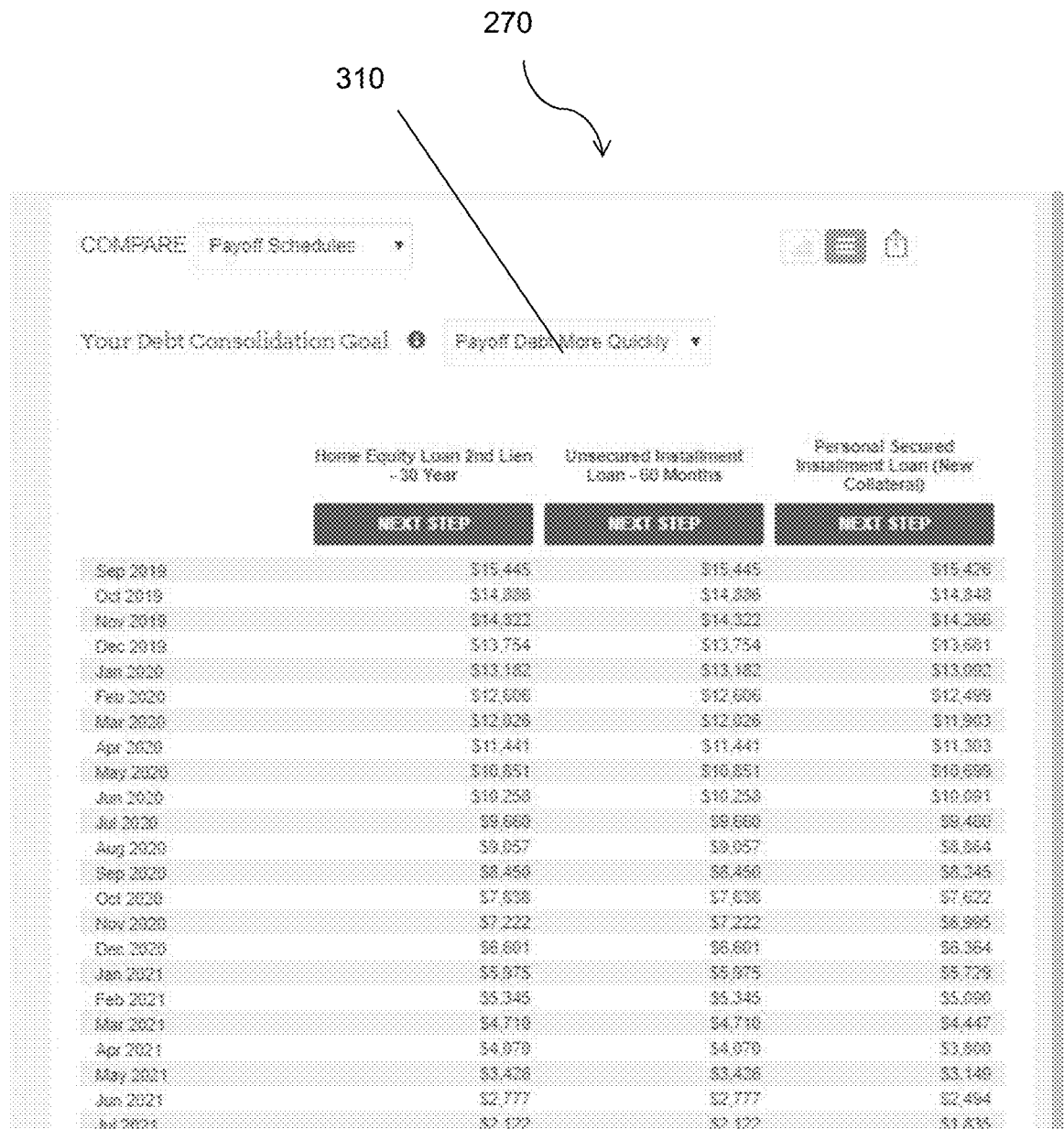
Figure 50:
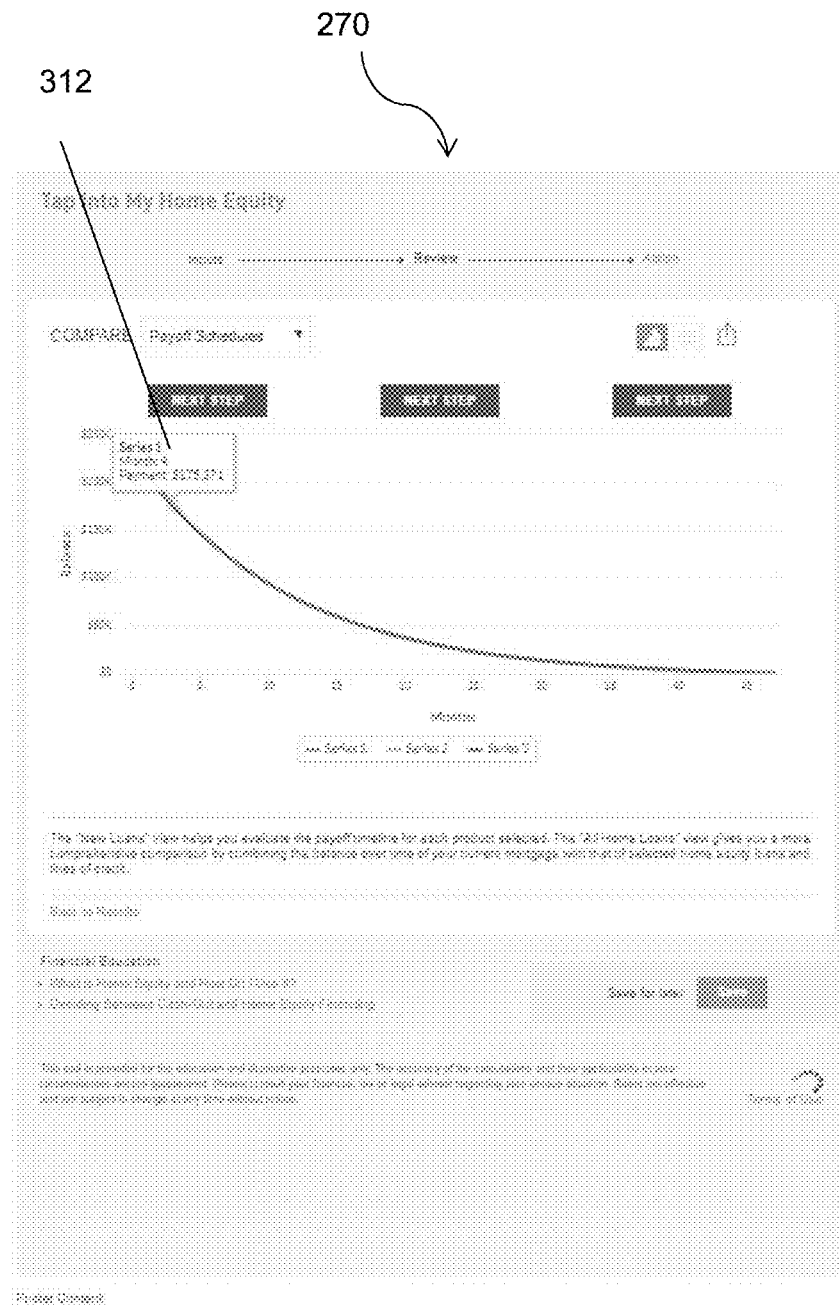

Referring to FIGS. 47-50, in some embodiments, the side-by-side comparison 270 includes a debt consolidation goal drop-down menu box 310. Upon selecting the debt consolidation goal drop-down menu box 310, a user selects a goal (e.g., payoff debt more quickly, minimize monthly payments, etc.). Once the goal is selected, the system 1 automatically reconfigures the side-by-side comparison 270 with specific attention to the selected goal. For instance, FIG. 47 shows a side-by-side comparison 270 reconfigured to compare three financial solution options based on paying off debt more quickly. FIG. 48 shows a side-by-side comparison 270 reconfigured to compare the same three financial solution options based on minimizing monthly payments. FIGS. 47-48 show graphical comparisons of the three financial solution options, in which each option is presented as a bar graph segmented into a principal segment (illustrating the portion accounted for by the principal of the loan), an interest segment (illustrating the portion accounted for by the interest), and a fees segment (illustrating the portion accounted for by the fees). FIG. 49 shows a side-by-side payoff schedule comparison 270 of the three financial solution options in tabular format. The table shows the estimated remaining balance of the loan at certain dates in the future. FIG. 50 shows a side-by-side principal paid comparison 270 of the three financial solution options in graphical format. FIG. 50 shows a line graph, in which the line is interactive. For instance, a user can hover over or click the line with the cursor and generate a text box 312 with details (e.g., the month, the payment for that month, etc.) corresponding to the position on the line.

After a user reviews the comparisons and makes a selection, the system 1 system 1 can navigate the user through the debt consolidation application process described above by populating display 220 (FIG. 34) and/or display 226 (FIG. 43).

The school loan module 106 will be discussed next. As shown in FIG. 51-63, upon entering the school loan module 106, the system 1 directs a user through a process to allow a user to obtain financing and advice related to refinancing student debt or finding a new student loan. In general, the process involves entering information and receiving options for refinancing or obtaining a student loan, entering information about collateral assets, comparing financial solution product results, and applying for a financial solution product.

Figure 51:
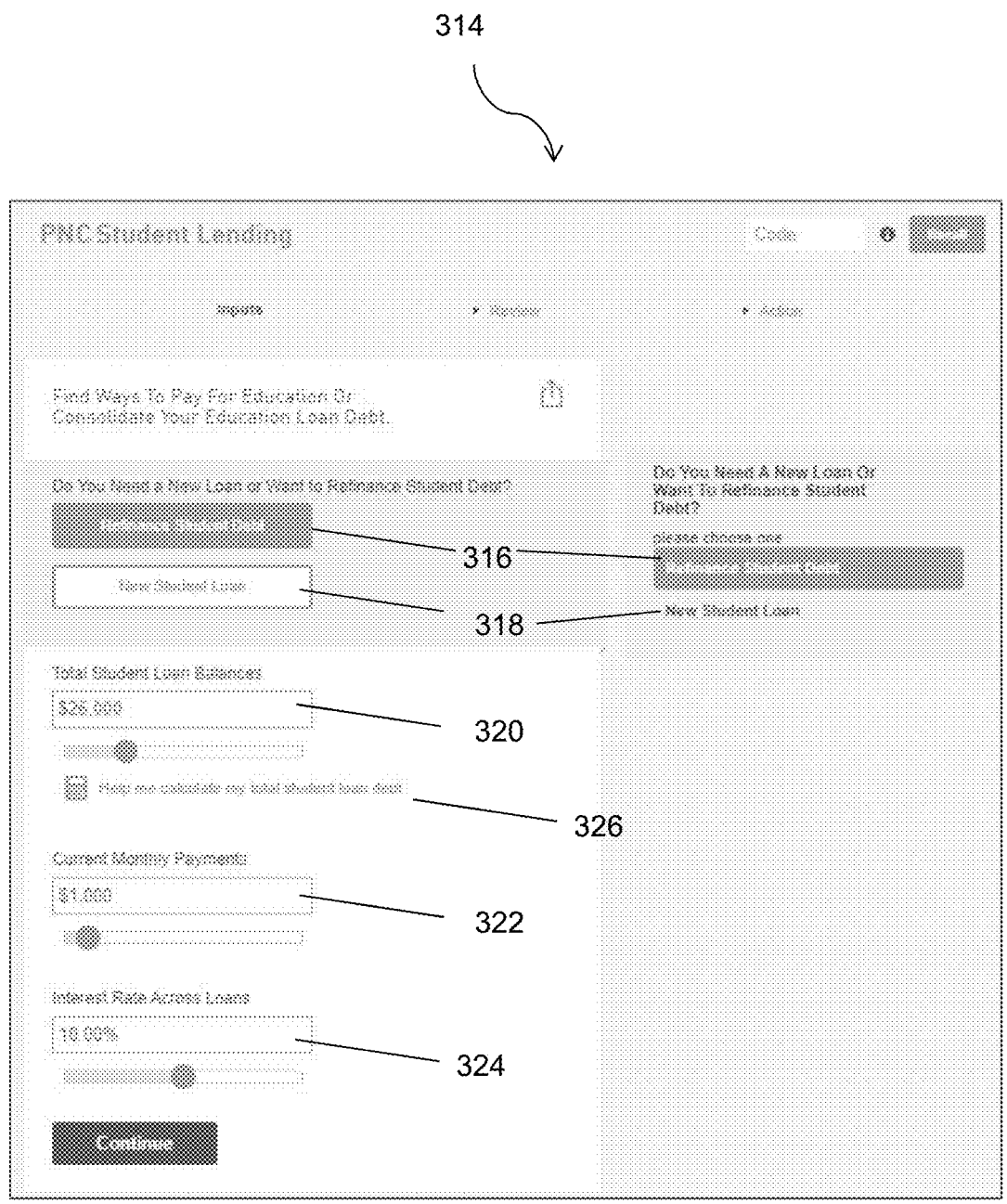
FIGS. 51-52 show an exemplary student loan calculator display.
Figure 52:
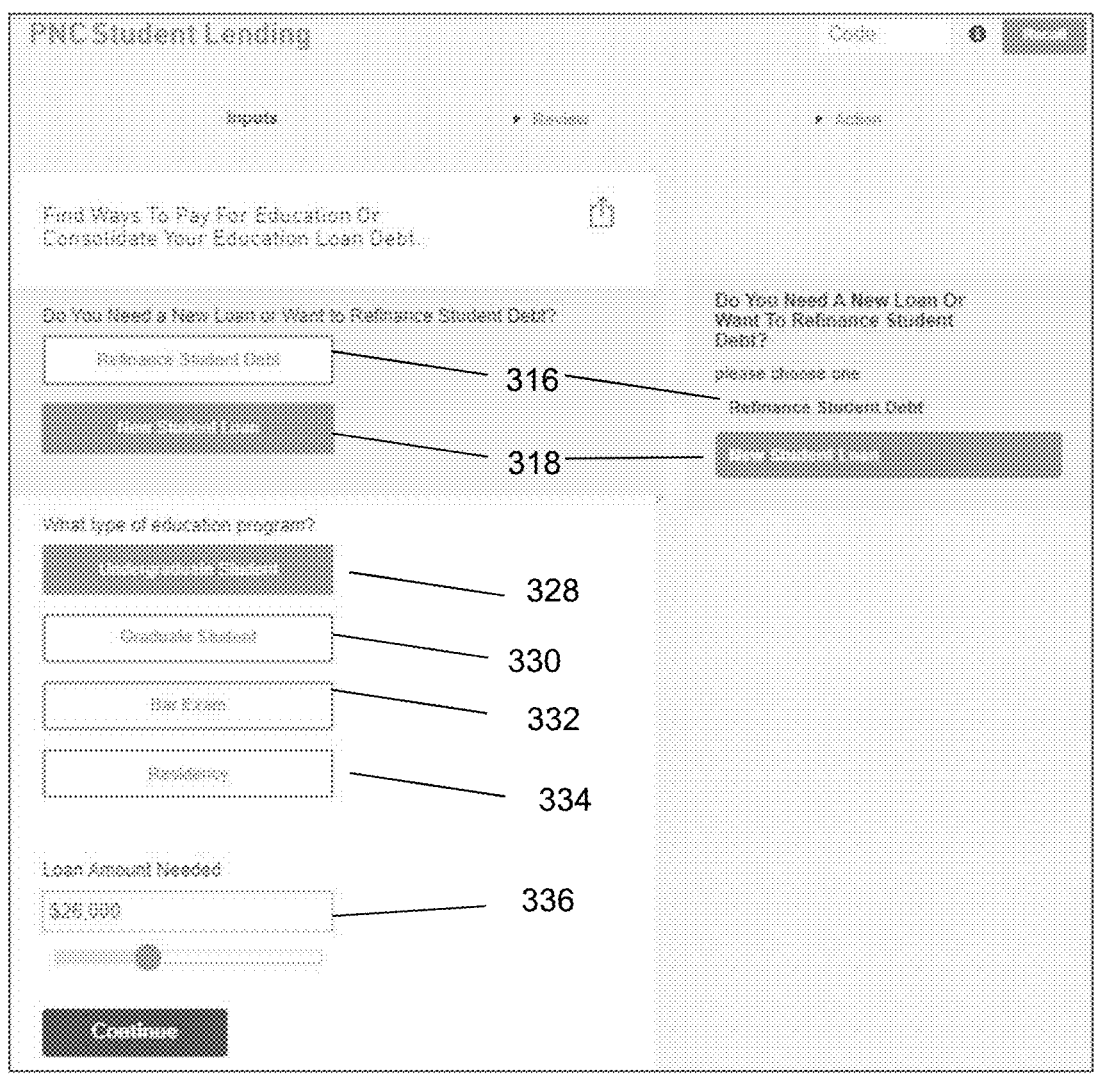

Referring to FIGS. 51-52, the school loan module 106 includes a student loan calculator display 314 that allows a user to begin to enter data for the purposes of obtain financing and advice related to refinancing student debt or finding a new student loan. The system 1 is programmed to utilize a student loan calculator based on information entered by a user. If the user is attempting to refinance, the data entered can include the option to refinance student debt 316, the total balance of the user's student loan(s) 320, the current student loan monthly payments 322, the interest rate across all of the user's student loans 324, etc. If the user is attempting to secure a new loan, the data entered can include: the option to secure a new student loan 318, the type of education program for which the loan is being secured (undergraduate loan 328, graduate loan 330, bar exam loan 332, residency loan 334, etc.), the total loan amount being sought 336, etc. These data can be entered via any one or combination of textual inputs, radio buttons, drop down menus, slide bars, etc. The total balance of the user's student loan(s) 320 and/or the interest rate across all the user's student loans 324 can be inputted by a user or it/they can be calculated automatically by the system 1 by clicking the "Help me calculate my student loan debt" link 326. It should be noted that the system 1 can calculate refinancing options and/or new student loan options. For instance, a user may want to refinance their undergraduate loans while securing new loans for a graduate program.

Figure 53:
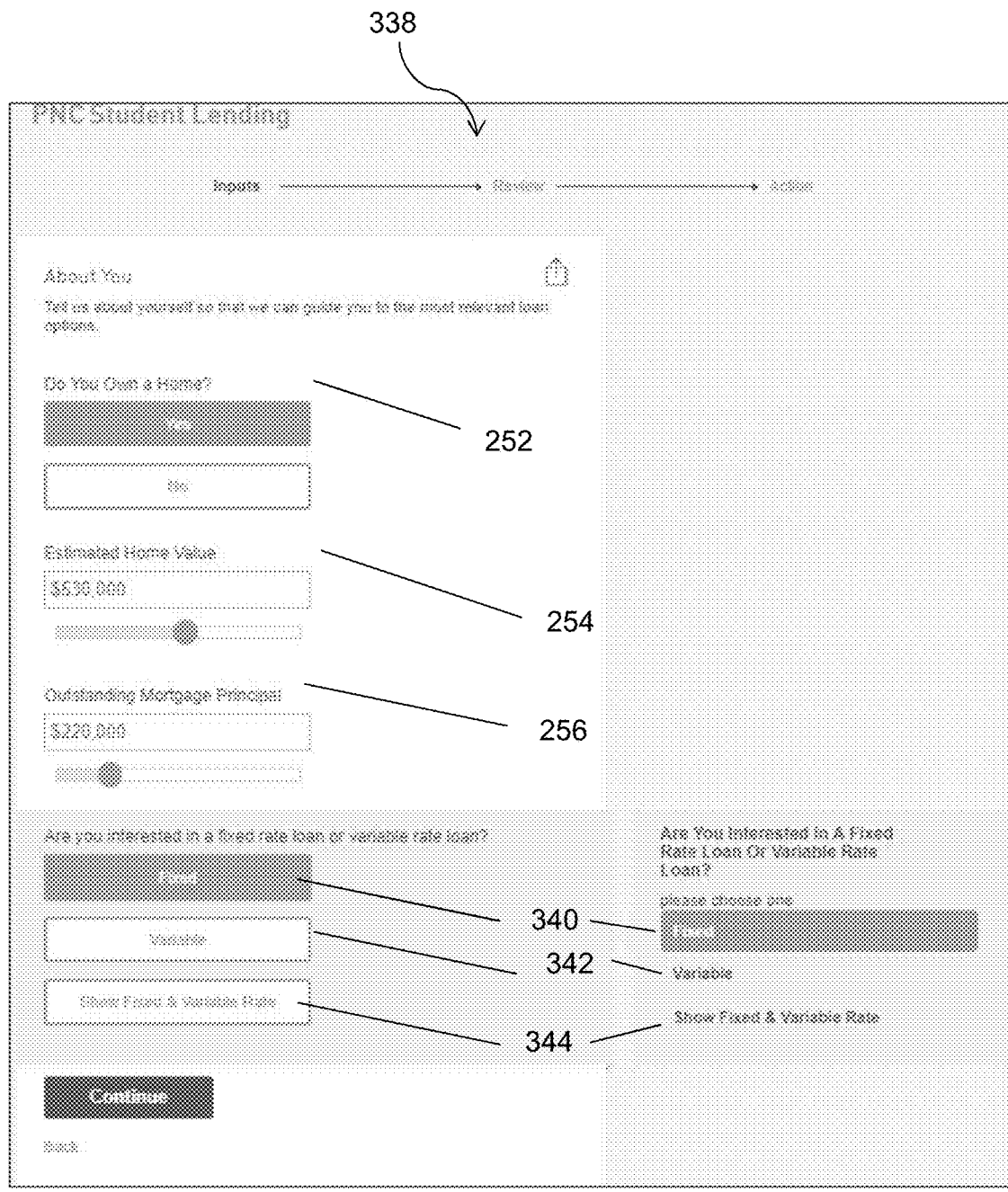
FIGS. 53-55 show an exemplary asset-collateral screen of the student loan calculator display.
Figure 54:
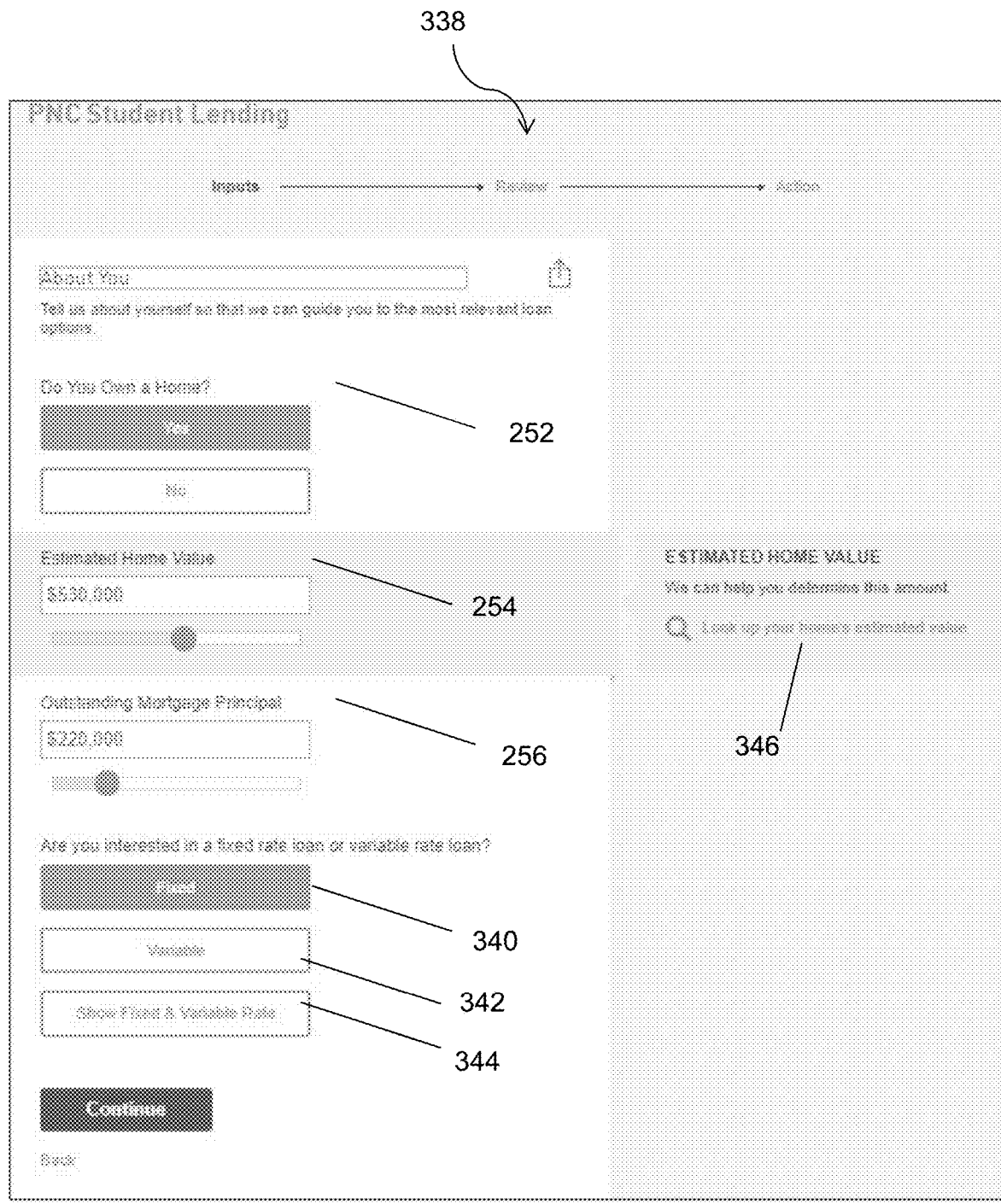
Figure 55:
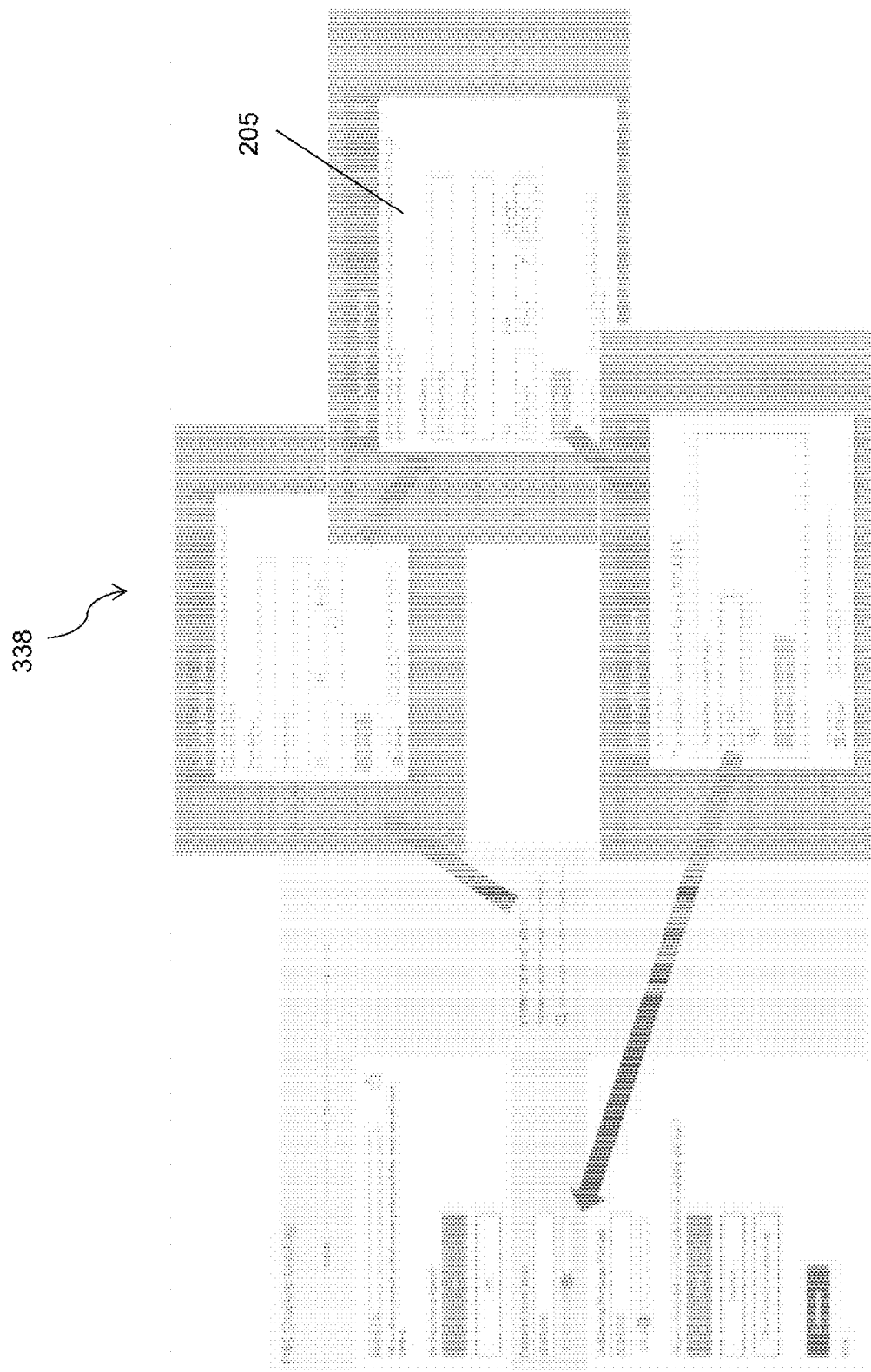

FIGS. 53-55 show an asset-collateral screen 338 of the student loan calculator display 314. This can be similar to the asset-collateral screen 243 of the debt consolidation calculator display 242. After the data for refinancing student debt and/or securing a new student loan have been entered, a user can enter information about any assets he/she is considering using as collateral via the asset-collateral screen 338. This information can include whether the user owns a home 252, the estimated value of the home the user owns 254 (can be entered by a user or determined by the system 1), the outstanding mortgage on the home 256, whether the user is interested in a fixed rate loan 340, whether the user is interested in a variable rate loan 342, etc. These data can be entered via textual inputs, radio buttons, drop down menus, slide bars, etc. A user can select a "show fixed and variable rate" button 344 to prompt the system to display current fixed and variable rates that are applicable to the user's situation. A user can enter the information for the student loan calculator for each debt security that will be or has been secured. These data can be entered in the form of textual inputs, drop down menus, radio buttons, slide bar, etc. The asset-collateral screen 338 (as well as any asset collateral screen of any of the operating modules disclosed herein) of the student loan calculator display 314 can include a "look up your home's estimated value" button 346. Upon selecting "look up your home's estimated value" button 346, the system 1 prompts the user to enter additional information about the collateral to be used. This can include prompting the user to select answers related to the use of the home being used as collateral (e.g., primary residence, second home, vacation home, investment, etc.), the type of home being used as collateral (single family home, townhouse, condo, manufactured home, etc.), estimated home value, amount owed on the home, the address of the home, if the home is mortgaged or if a line of equity is secured in the home, if the user plans to pay off the mortgage or line of credit, etc. These data can be entered via any one or combination of textual inputs, radio buttons, drop down menus, slide bars, etc. The system 1 can also acquisition pertinent information from third parties, such as Zillow for example, to assist in providing estimates and making calculations.

Figure 57:
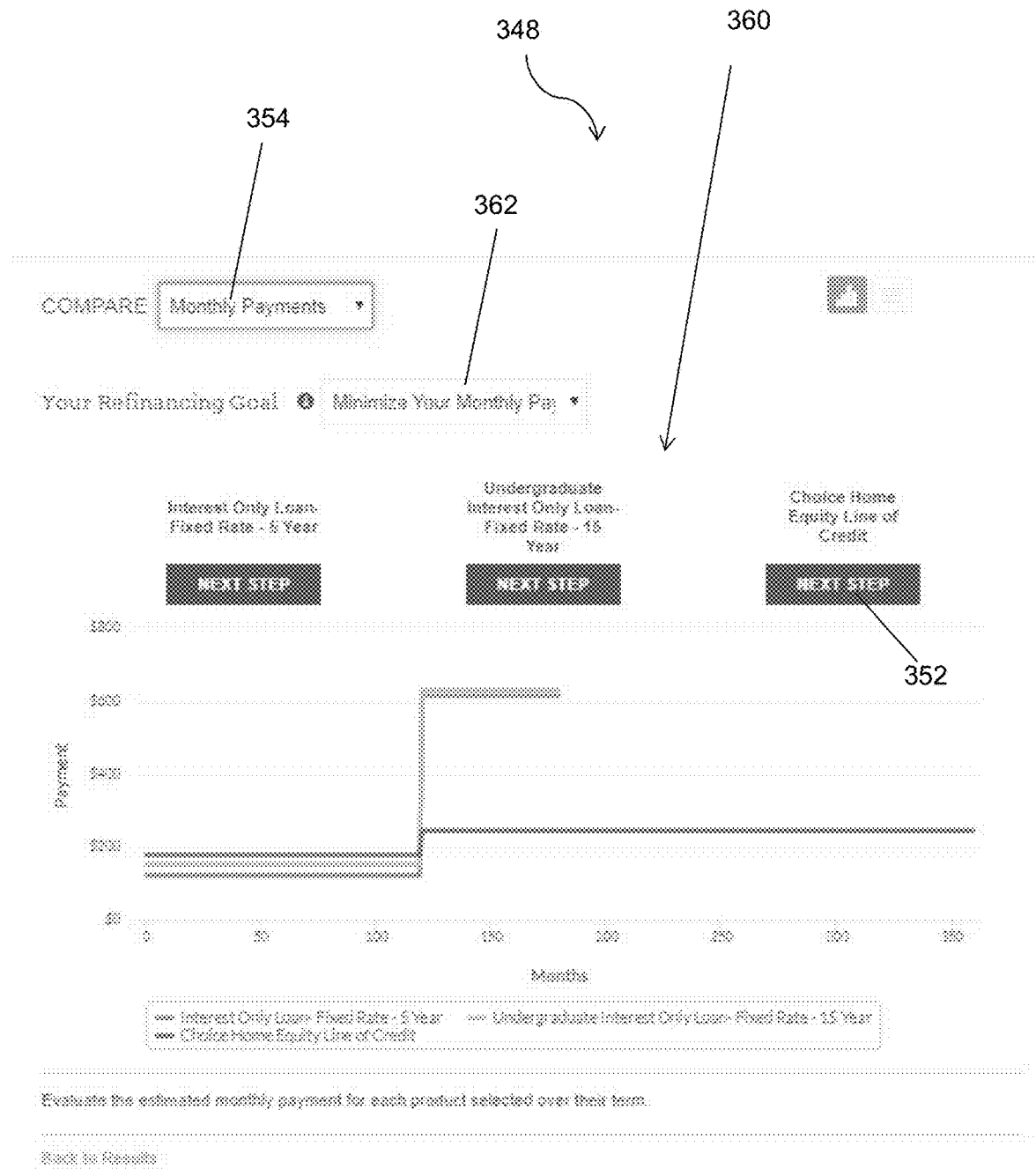
Figure 58:
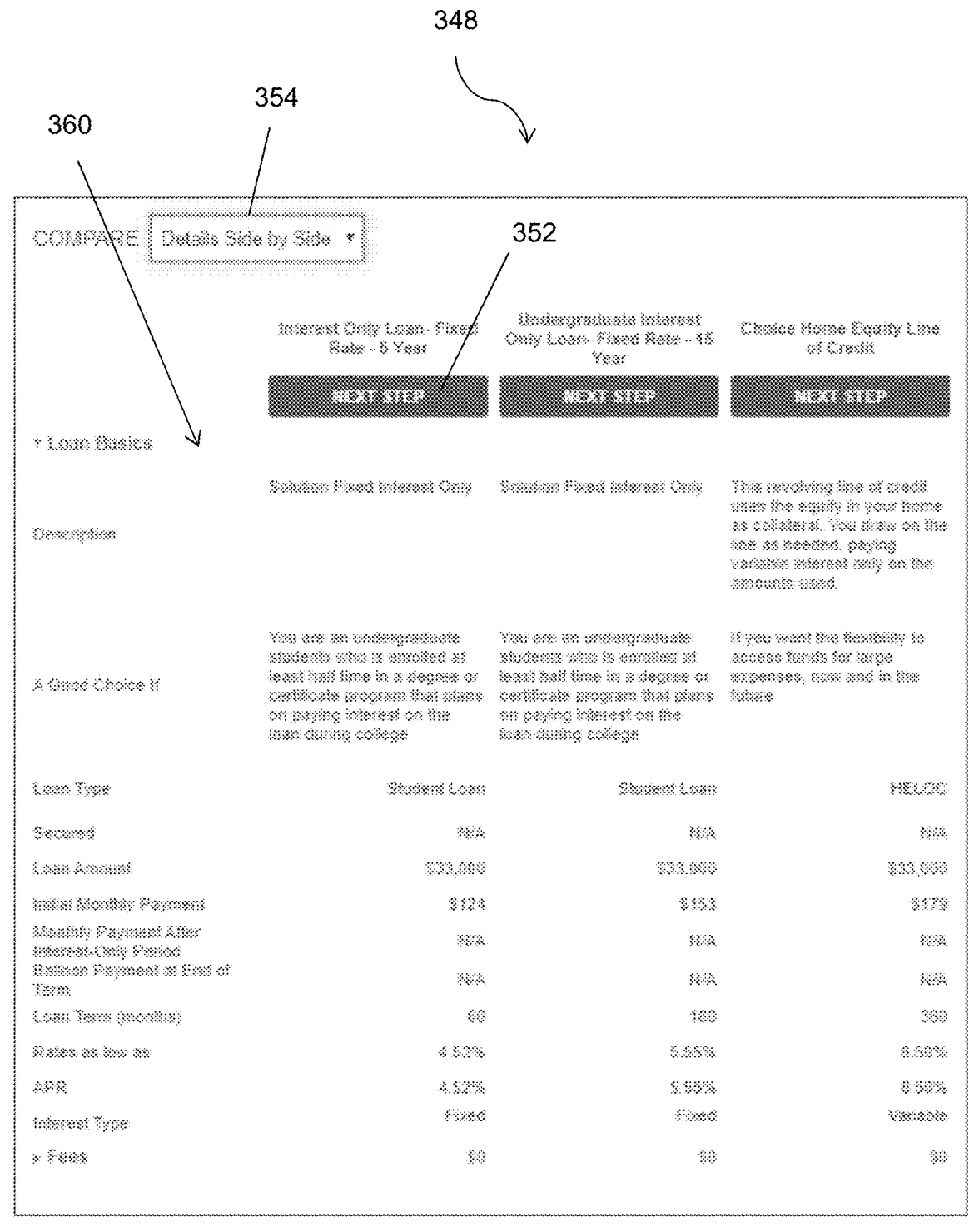
Figure 59:
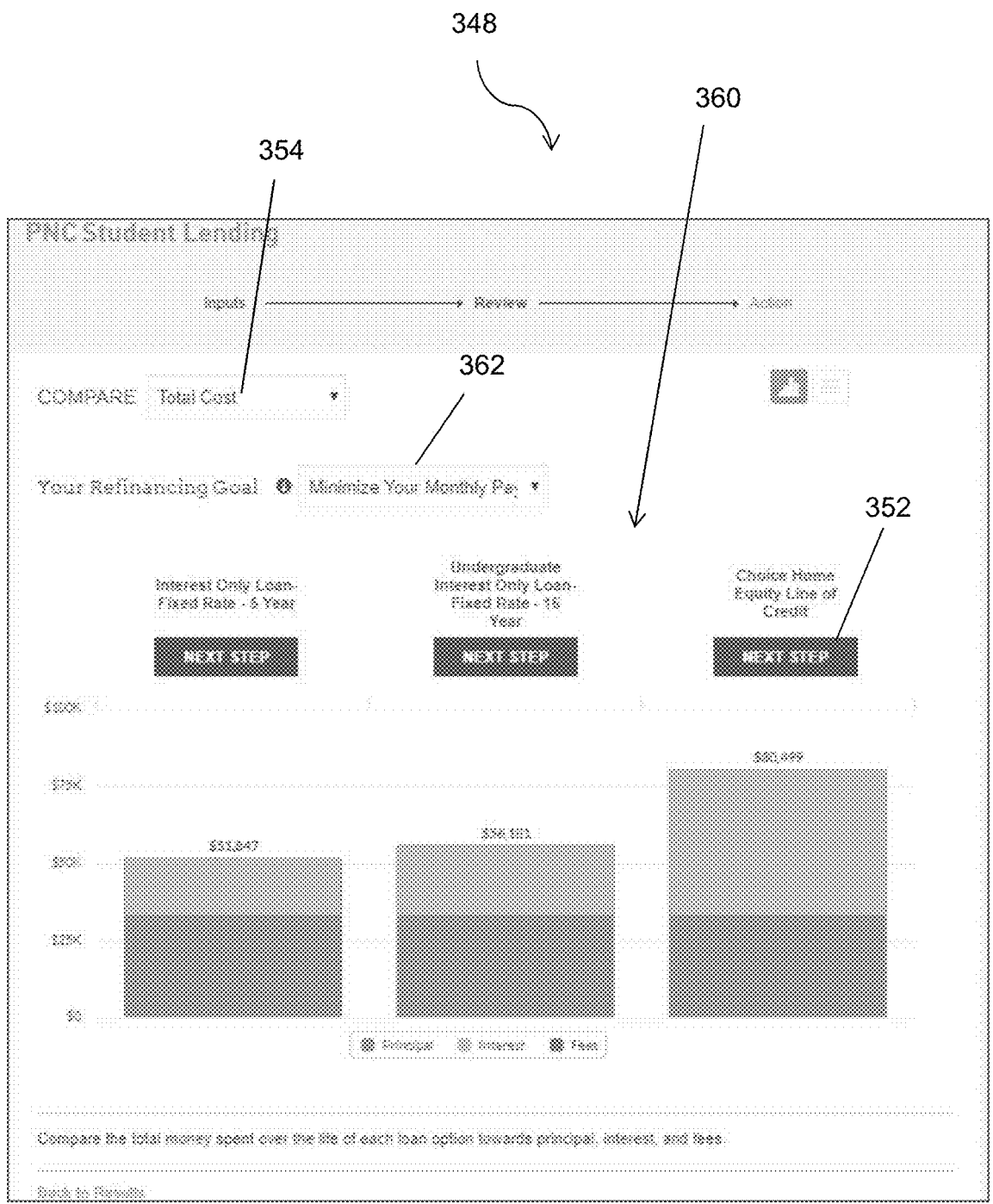
Figure 60:
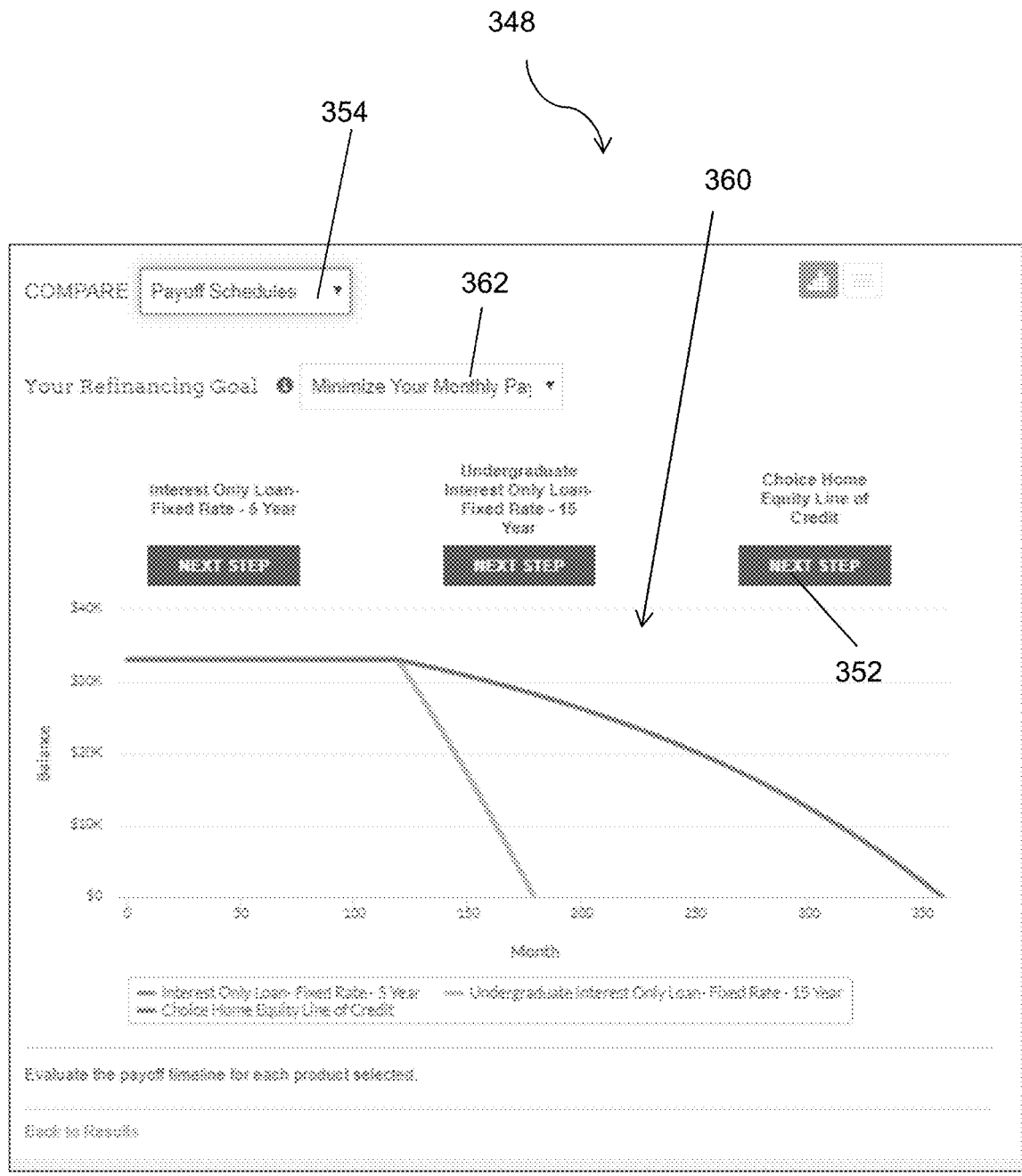

FIGS. 56-60 show a student loan option result display 348 of student loan/refinancing option results computed by the system 1. Based on the information entered by the user and the data acquisitioned by the system 1, the system 1 generates a list (in tabular format) of student loan/refinancing options. Each option 350 is displayed with a truncated explanation of details and a Next Step 352 button to navigate a user through an application process. The student loan option result display 348 includes a sort button to allow a user to sort the tabulated list by a criterion 354 (e.g., lowest monthly payment, total cost, payoff schedule, fixed rate, variable rate, deferred, interest only, immediate repayment, 5-year, 10-year, 15-year, etc.). The student loan option result display 348 also includes an "Evaluate Selected Options" 356, which prompts the system 1 to provide the user with a more detailed and/or graphical comparison of selected (selectable via the selectable check boxes 358) options. When selecting the Evaluate Selected Options 356, the options selected can be presented as a side-by-side comparison 360 for a specific criterion 354 (selectable via a drop down menu). For instance, FIGS. 57-58 show two different a side-by-side comparisons 360 for three selected options based on the criterion for monthly payments, comparing an interest only loan fixed rate—5 year option, an undergraduate interest only loan fixed rate—15 year option, and a choice home equity line of credit option. FIGS. 57, 59, and 60 are graphical comparisons and FIG. 58 is a tabular comparison.

In some embodiments, the side-by-side comparison 360 includes a student loan goal drop-down menu box 362. Upon selecting the student loan goal drop-down menu box 362, a user selects a goal (e.g., payoff debt more quickly, minimize monthly payments, etc.). Once the goal is selected, the system 1 automatically reconfigures the side-by-side comparison 360 with specific attention to the selected goal. For instance, FIG. 57 (a line graph of payment v. month), FIG. 59 (a bar graph, in which each option is presented as a bar graph segmented into a principal segment (illustrating the portion accounted for by the principal of the loan), an interest segment (illustrating the portion accounted for by the interest), and a fees segment (illustrating the portion accounted for by the fees)), and FIG. 60 (a line graph of balance v. month) show side-by-side comparisons 360 reconfigured to compare the same three financial solution options based on minimizing monthly payments.

Figure 61:
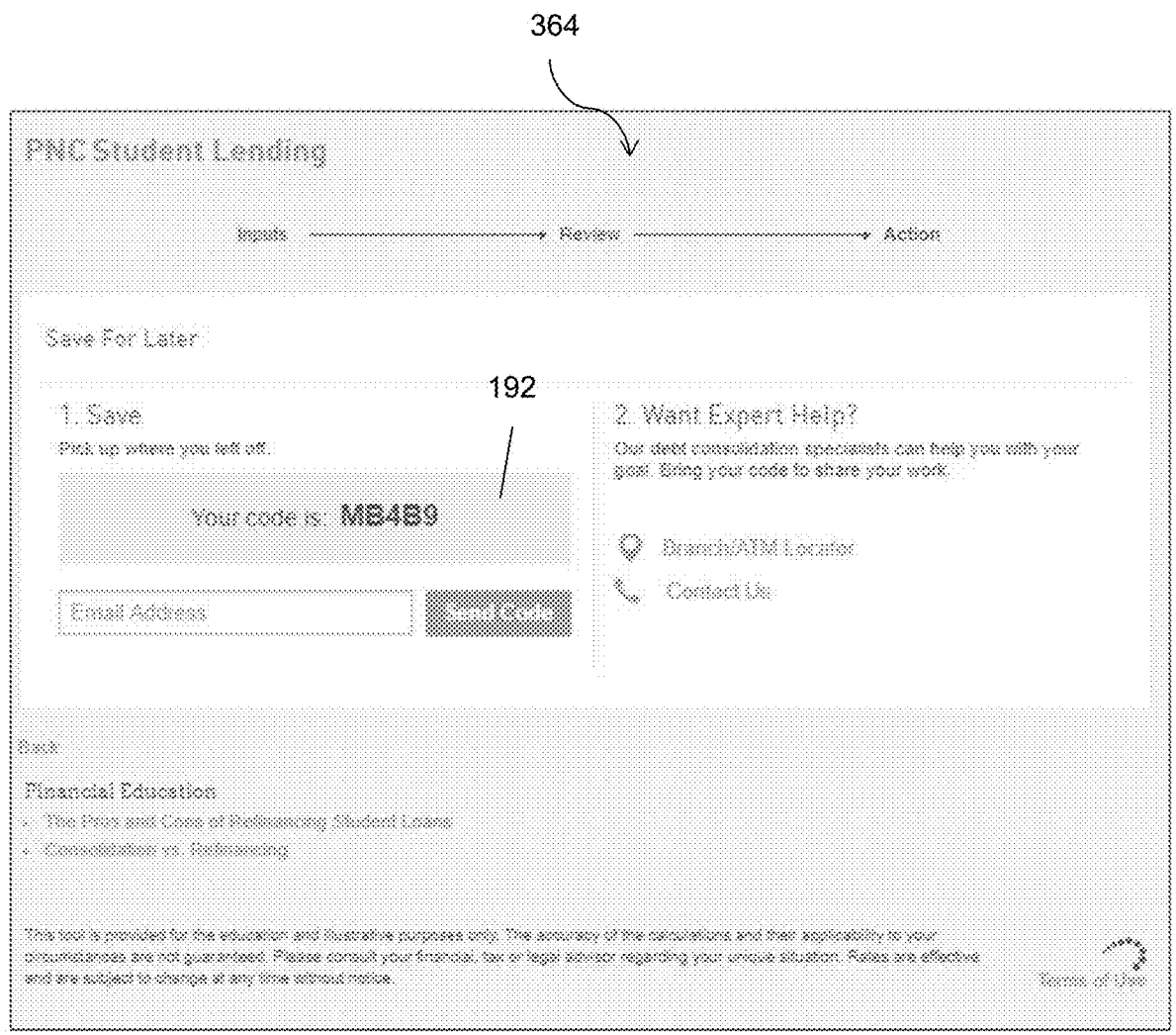
FIGS. 61-63 show an exemplary student application display.
Figure 62:
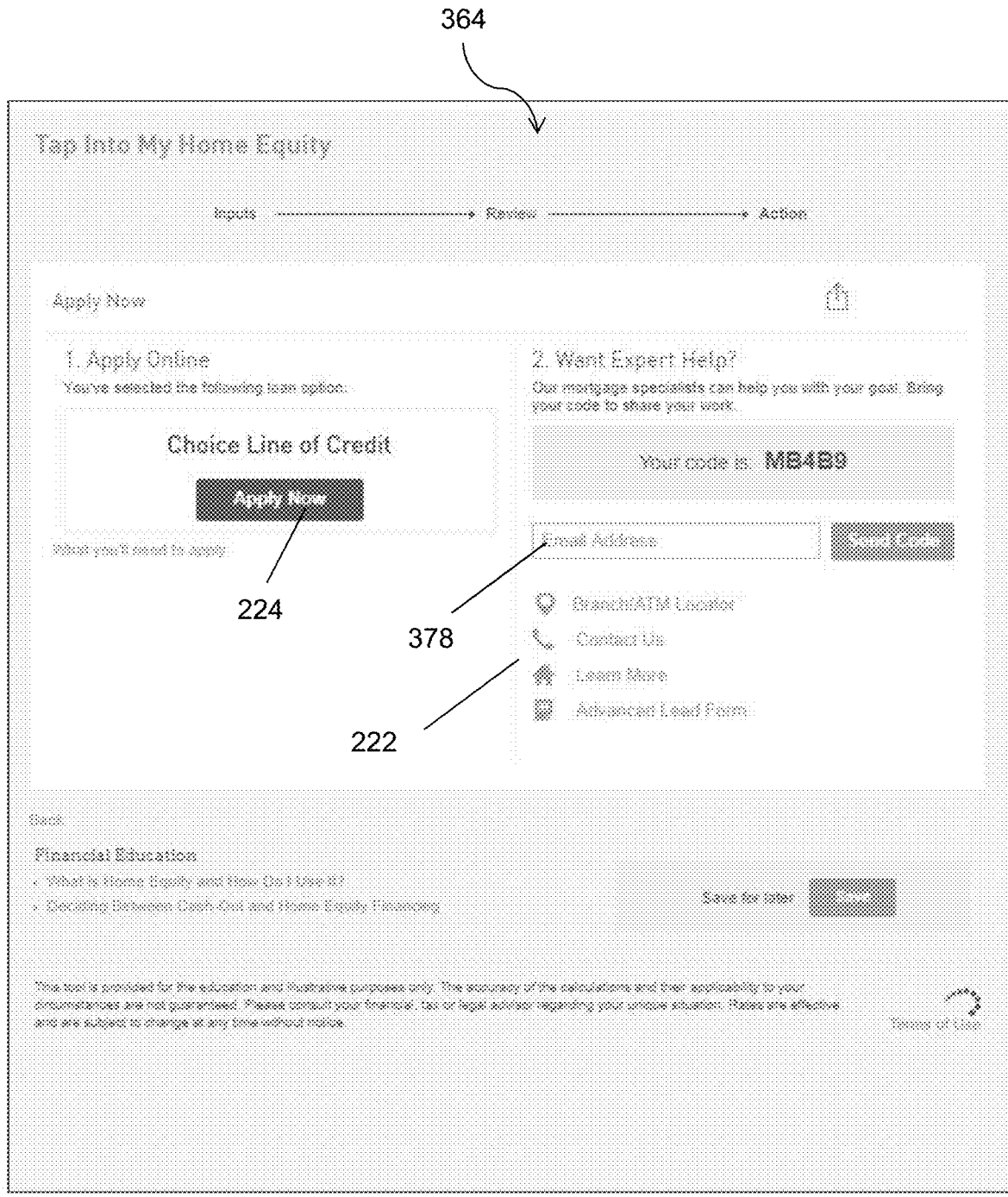
Figure 63:

Referring to FIGS. 61-63, upon selecting the Next Step 352 button, the system 1 can navigate the user through a student loan application process by populating the student application display 364. The process can be similar to the one described for display 220 in FIG. 34, for example. A user can enter a code 192 or the code 192 can be automatically populated, which will transmit the details of the financing options and student loans to a loan officer, for example. A user can enter their contact information 378 (e.g., email, phone number, etc.) to provide the loan officer the ability to contact them. Additionally, a user can enter information related to: the state where the school is located 366, the name of the school 368, whether there will be a cosigner 370, the citizenship status of the user 372, the enrollment status 374, the requested loan amount 376, etc. The student application display 364 includes additional support information 222, such as Branch/ATM locator information, Contact Information, Learn More literature, Advance Lead Forms, etc. The student application display 364 also includes an apply now 224 button to allow a user to apply for a desired financing product.

Figure 64:
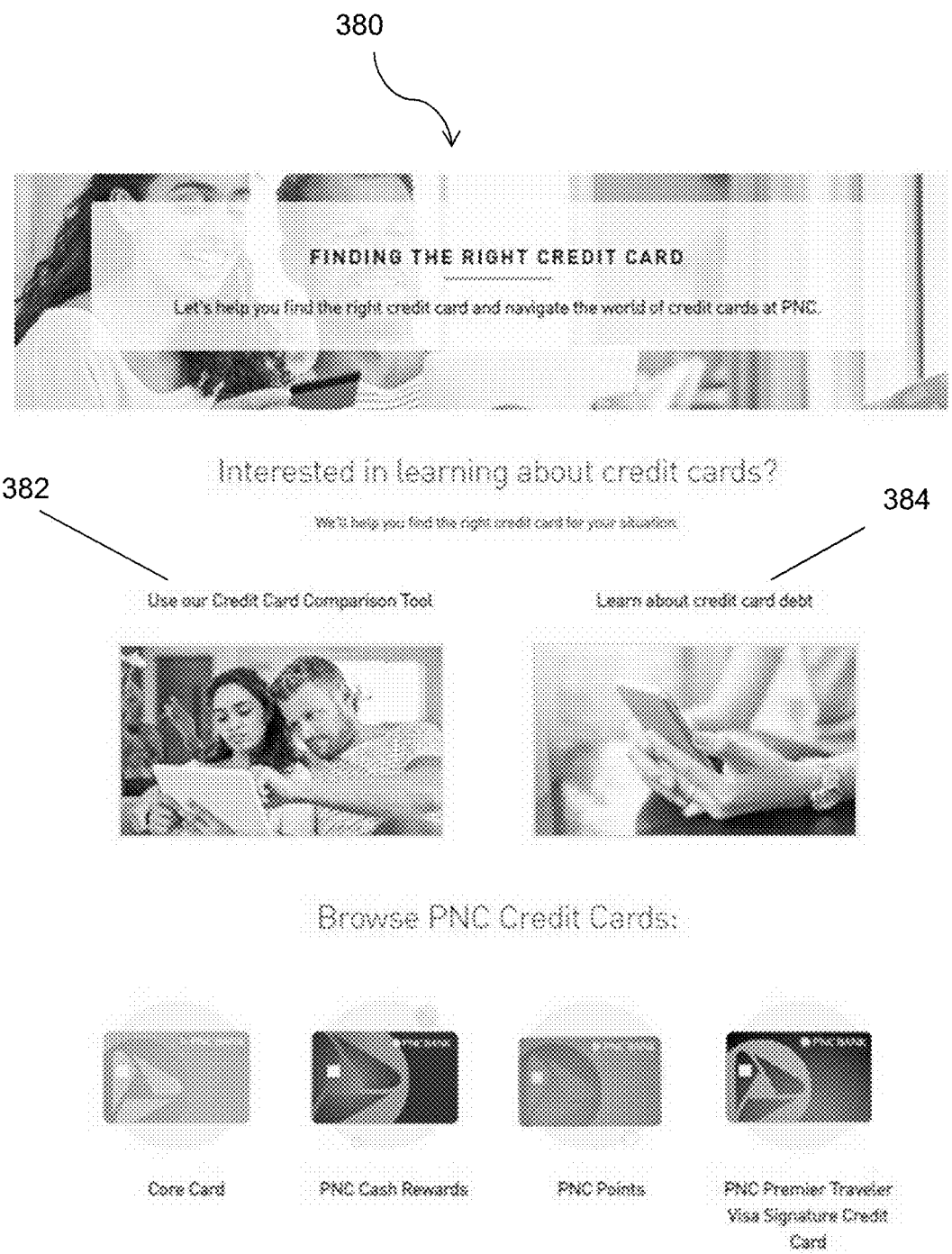
FIG. 64 shows an exemplary credit card landing page.

The credit card module 108 will be discussed next. As shown in FIG. 64, upon entering the credit card module 108, the system 1 directs a user to the credit card landing page 380. The credit card landing page 380 includes icons related to credit card options and features. The icons can include a Credit Card Comparison Tool icon 382, a Learn About Credit Card Debt icon 384, etc.

Figure 65:
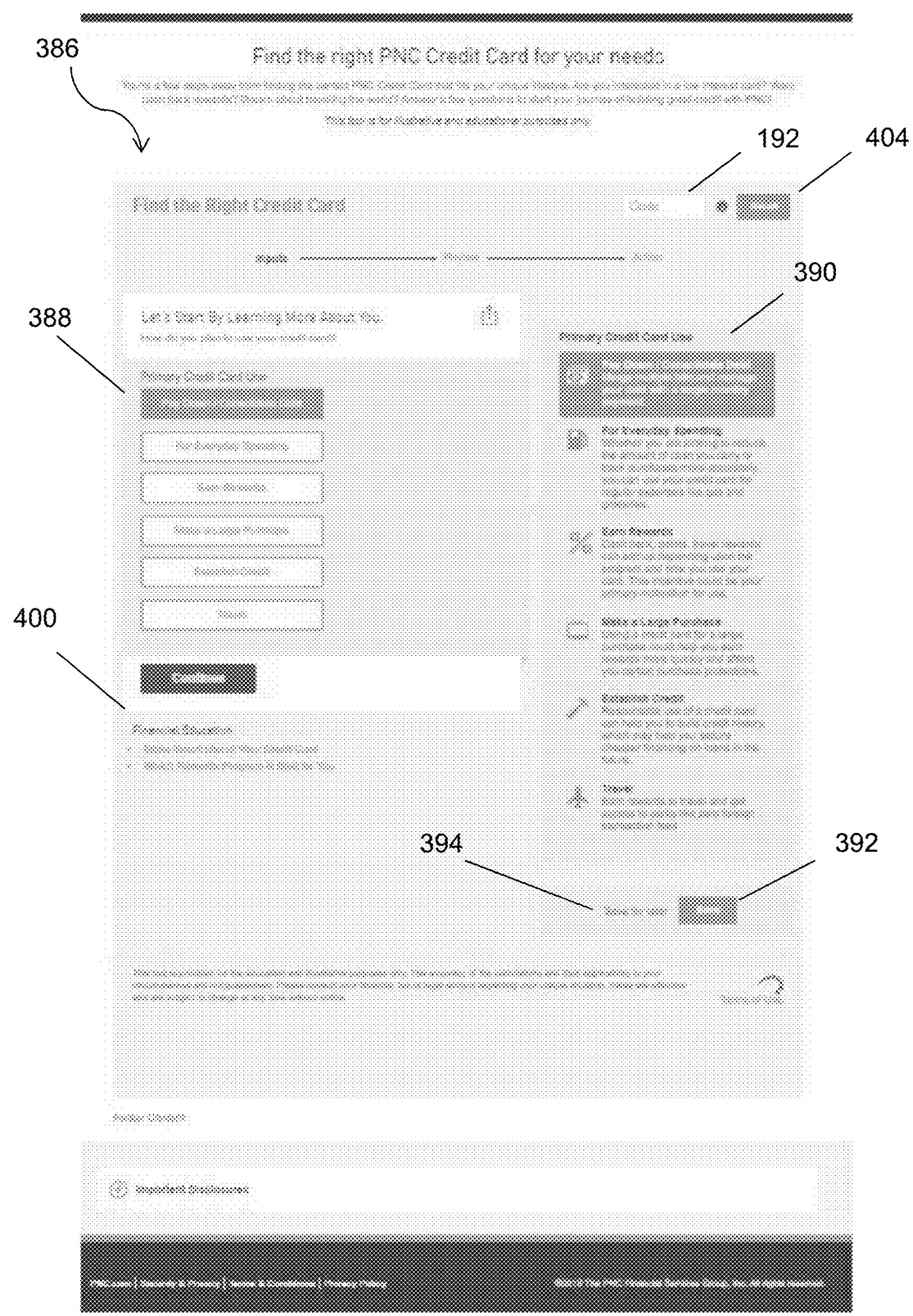
FIGS. 65-72 show an exemplary find a right credit card calculator display.
Figure 66:
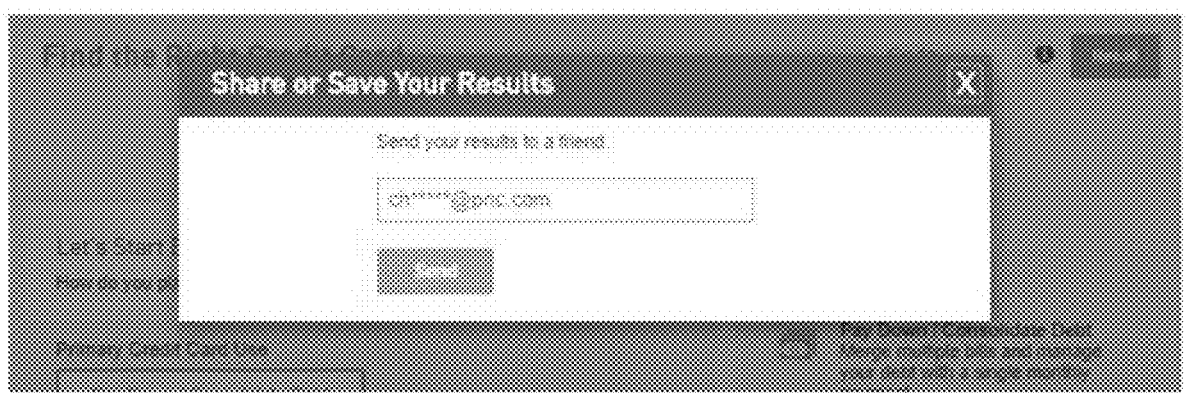

Referring to FIG. 65, clicking the Credit Card Comparison Tool icon 382 causes the system 1 to generate a Find a Right Credit Card Calculator display 386 that allows a user to begin to enter data for the purposes of finding an appropriate credit card. The system 1 is programmed to utilize a credit card calculator based on information entered by a user. The data entered can include primary use information 388 (e.g., what the user intends using the credit card for). Primary use information 388 includes pay down/consolidate debt, everyday spending, earn rewards, make large purchases, establish credit, travel, etc. The primary use information 388 can be entered via textual inputs, selection of icons, etc. In some embodiments, the Find a Right Credit Card Calculator display 386 includes a primary use descriptor screen 390 that provides additional information regarding the uses identified above. This can be done to assist a user in selecting the primary use for the credit card. The system 1 is programmed such that the primary use descriptor screen 390 is displayed so as to be juxtaposed with the primary use information 388. In addition, the system 1 is programmed such that when a user selects a primary use information (e.g., everyday spending) in the primary use information 388 block (or primary use descriptor screen 390), the system 1 automatically highlights the corresponding primary use information (e.g., everyday spending) on the primary use descriptor screen 390 (or primary use information 388 block). At any stage within the credit card module 108, a user can save their results via the save 392 icon and/or email their results via the share 394 icon. When selecting the share 194 icon, an email display 396 (see FIG. 66) is populated to allow a user to enter the email address to which the results will be sent.

Figure 67:
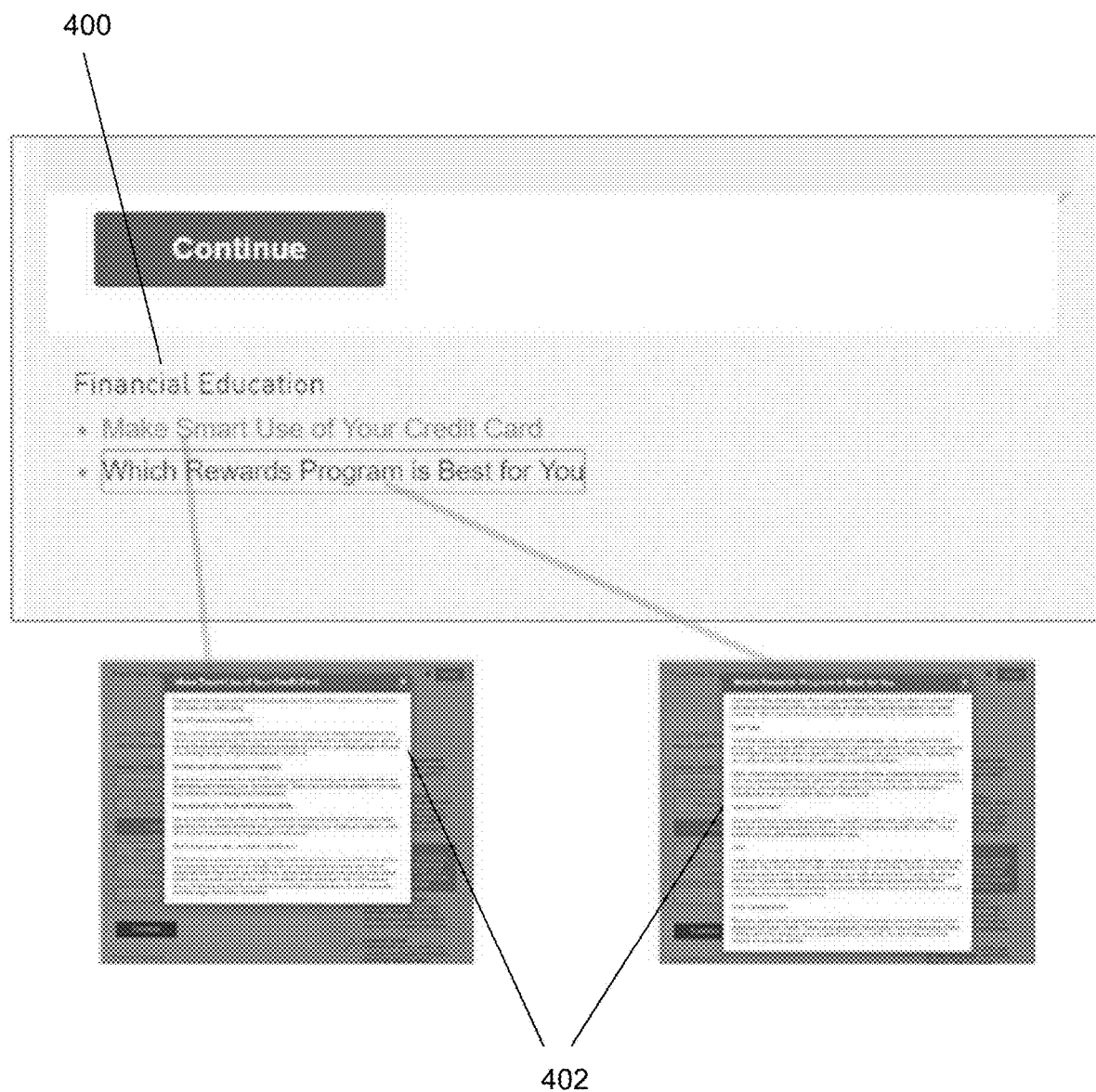
Figure 68:
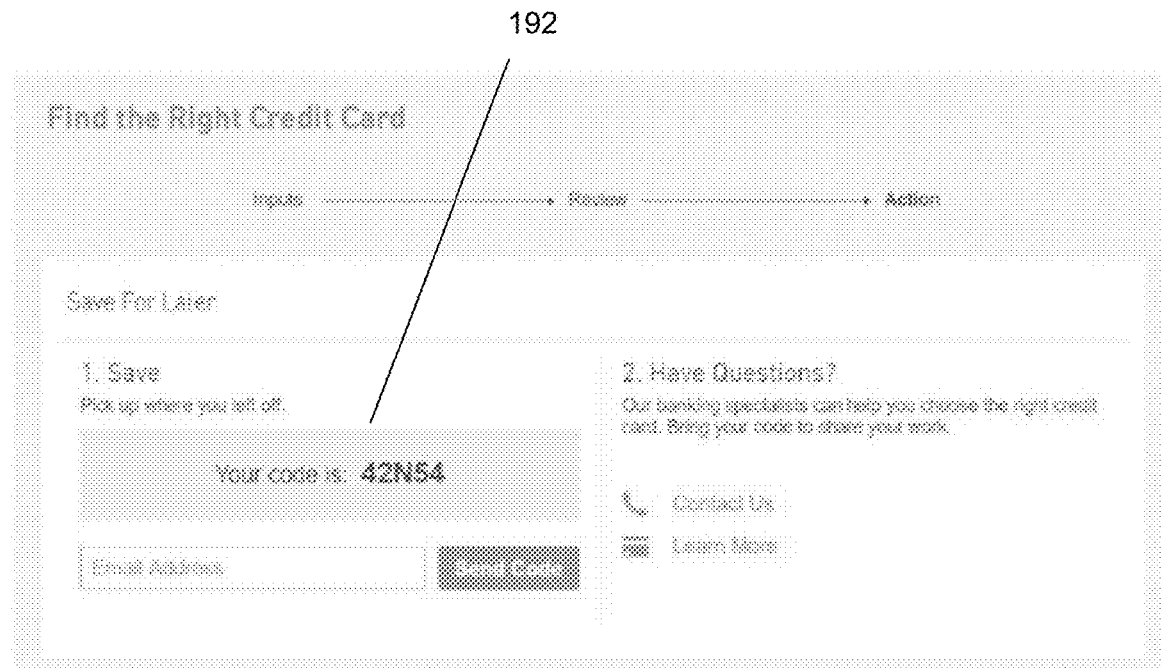

Referring to FIG. 67, in some embodiments, the Find a Right Credit Card Calculator display 386 includes a financial education 400 icon. The financial education 400 icon provides additional information to a user about how to use the credit card, the credit associated with the credit card, any rewards associated with the credit card, etc. This information is presented via pop-up windows 402. For instance, the financial education 400 icon can include a Make Smart use of Your Credit Card link that populates a window 402 describing such use, a Which Rewards Program is best for You link that populates a window 402 describing such options, etc. The presentation of the information in these windows 402 can be tailored for an individual user based on the information entered via the credit card module 108.

Similar to the code 192 described in the other modules, a user can enter a code 192 or the code 192 can be automatically populated, which will transmit the details of the credit card options to a credit officer, for example. A user can enter their contact information (e.g., email, phone number, etc.) to provide the credit officer the ability to contact them. The code 192 can also be used to allow a user to recall their saved information when logging back into the system 1. For instance, a user can select the recall 404 icon and enter their code 192, which will cause the system 1 to display the information a user entered just before logging out of the system 1.

Figure 69:
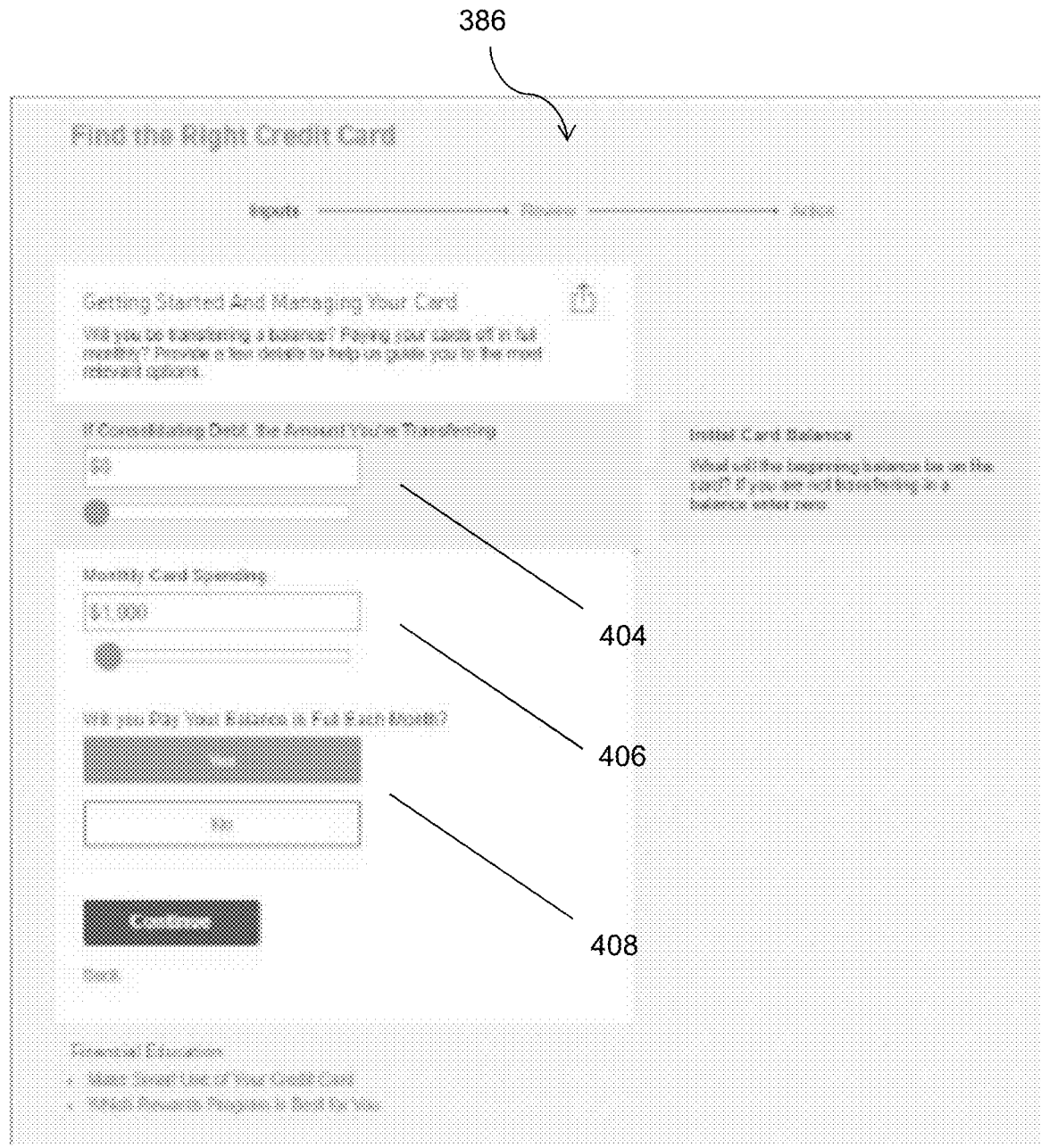
Figure 70:
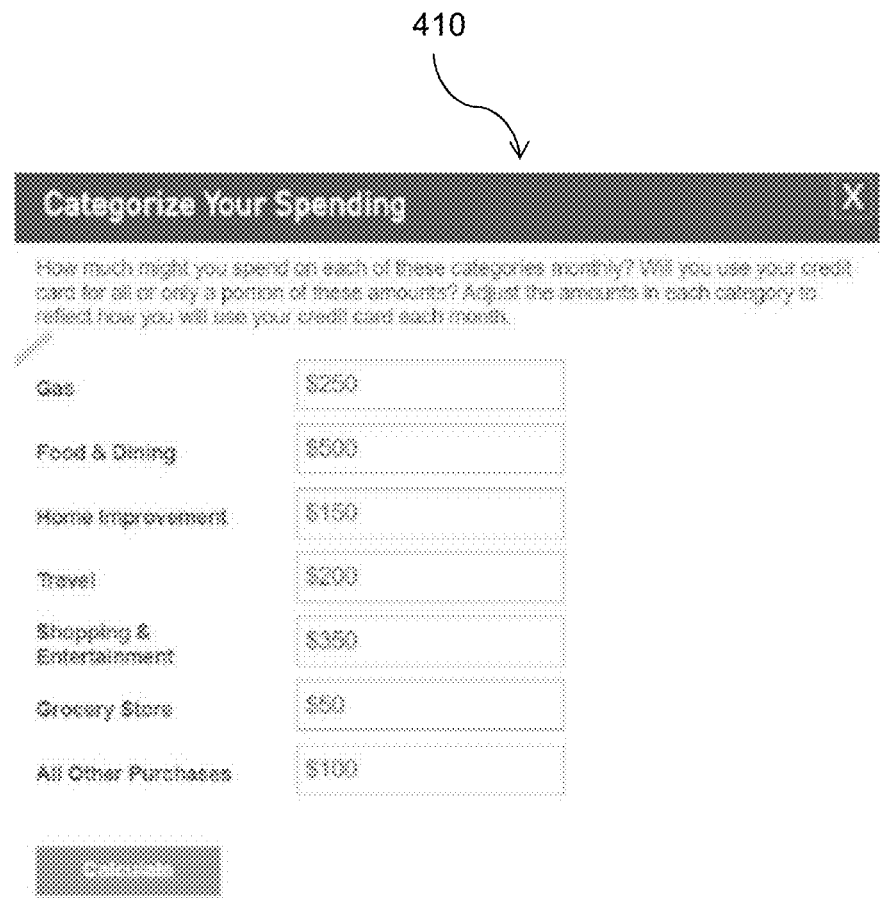
Figure 71:
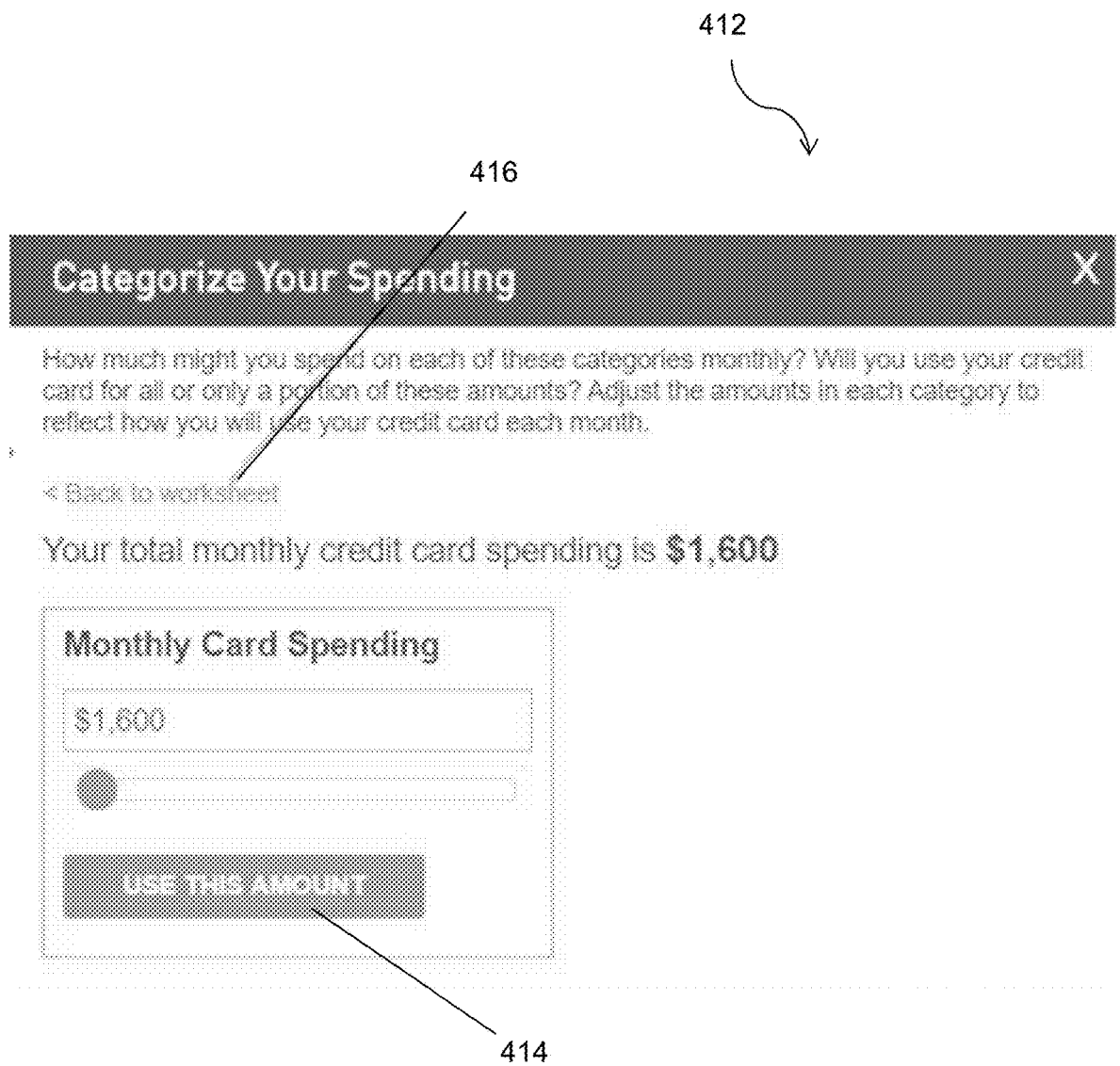

Referring to FIG. 69, after entering the primary use information, a user can select continue to navigate through the additional Find a Right Credit Card Calculator display 386 questions. This can allow a user to enter additional information regarding finding the appropriate credit card. This additional information includes amount of credit/debt being transferred 404 (e.g., if a user intends on transferring balances of other credit cards to the credit card that will be applied for via the system 1, a user will enter the total amount of the balances to be transferred), monthly card spending 406 (e.g., the user will enter the anticipated monthly amount of money that will be borrowed via the credit card to be applied for), pay balance in full each month 408 (e.g., the user will indicate whether they intend on paying off the balance each month), etc. This information can be entered via textual inputs, via a slide bar, via selection of an icon, etc. In some embodiments, the monthly card spending 406 can be entered via itemized spending categories window 410 (see FIG. 70). The itemized categories include gas, food & drink, home improvement, travel, shopping & entertainment, grocery store, other purchases, etc. For instance, a user can enter (e.g., via textual input) the anticipated monthly spending they intend to incur with the credit card for each itemized category. In some embodiments, the system 1 is programmed to generate a monthly spending total screen 412 (see FIG. 71) that is a tally of the itemized categories entered. From this screen 412, a user can view the total monthly spending from a summation of the itemized categories. A user can also accept this amount by clicking the use this amount icon 414, or increase or decrease the total monthly spending amount (e.g., deviate from the calculated total monthly spending amount) via textual input or a slide bar that changes the total monthly spending amount. In addition, or in the alternative, a user can select the Back to Worksheet 416 icon to navigate back to the itemized spending categories window 410 and modify any one or combination of the itemized categories.

Figure 72:
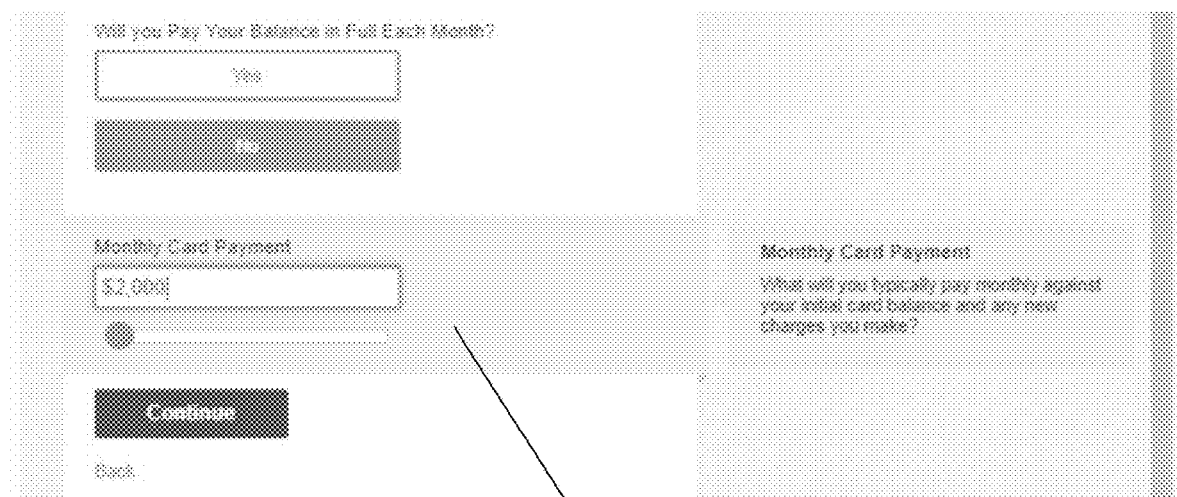

Within the pay balance in full each month 408 field, if a user indicates that they intend to not pay the balance off each month, the system 1 can generate a monthly payment amount screen 418 (see FIG. 72). This screen 418 allows a user to enter the anticipated monthly payment amount 420 they intend to submit as payment each month. The anticipated monthly payment amount 420 can be entered via textual input, slide bar, etc.

Figure 73:
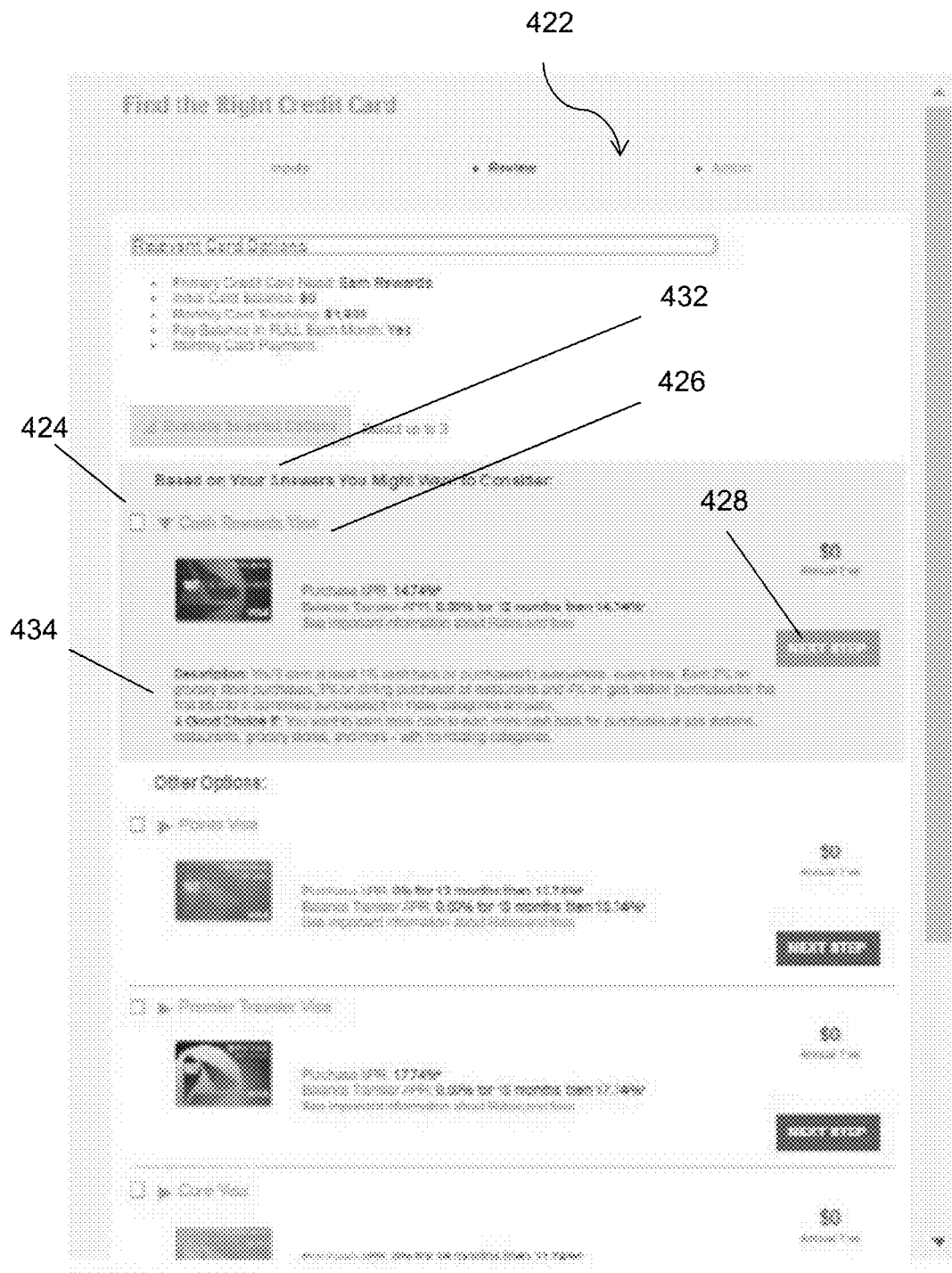
FIGS. 73-79 show an exemplary credit card calculator results display.

Referring to FIG. 73, the system 1 can be programmed to generate a credit card options screen 422 based on the information entered by the user, the data acquisitioned by the system 1, and the calculations made by the system 1. This screen 422 can be generated automatically or upon the user selecting the continue icon. From this screen 422, a user can select a credit card option via the check box(es) 424, select the credit card option links 426 to obtain additional information about the credit card option, and/or select the next step 428 icon to begin the application process. In some embodiments, this screen 422 includes a recommendation banner 432 associated with a credit card option, informing a user that this option may be well suited based on the information provided. This screen 422 can also include a general descriptor box 434, informing a user about certain features related to the credit card option and provide general advantages and disadvantages associated with that credit card option.

Figure 74:
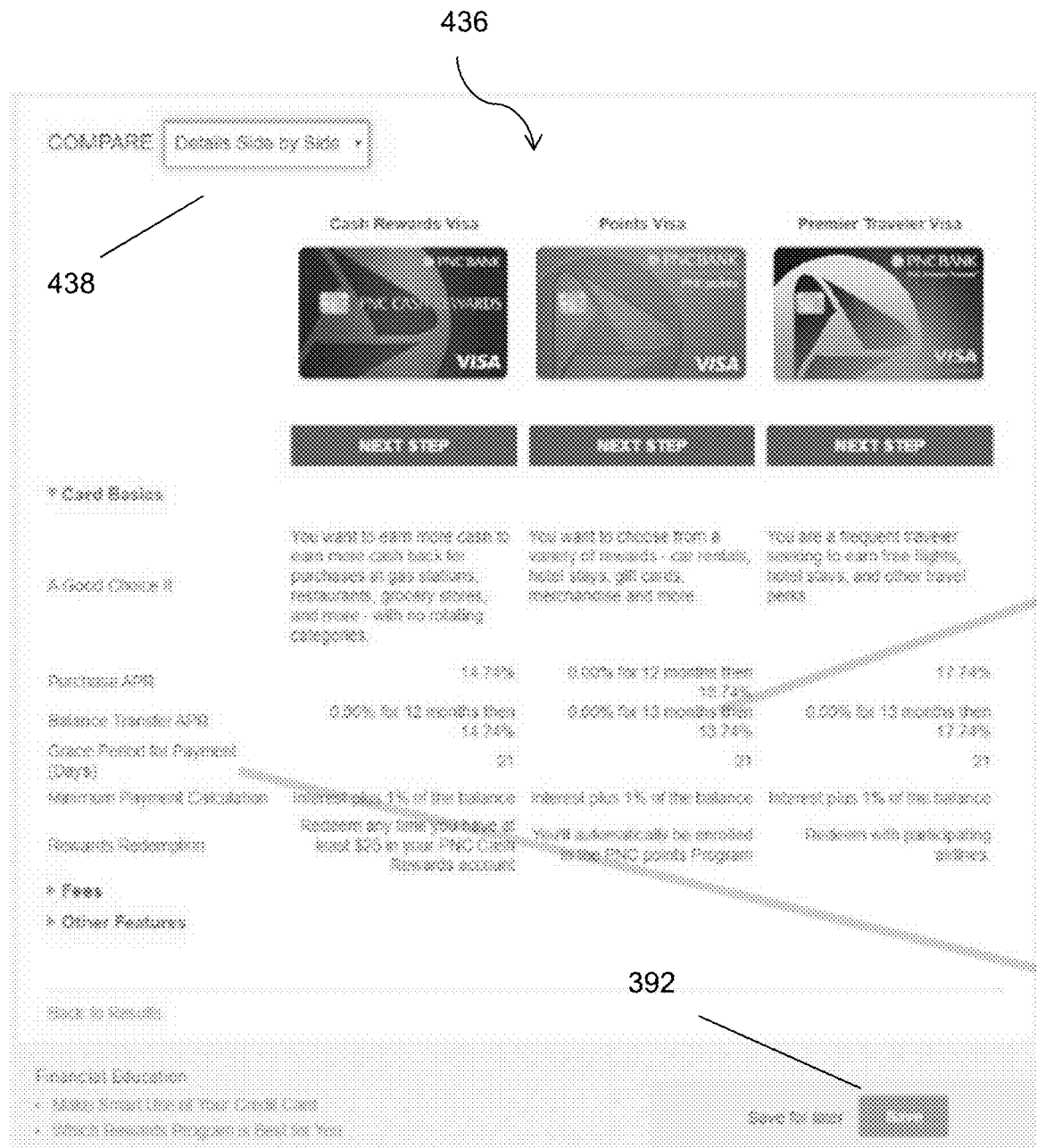
Figure 75:

Referring to FIG. 74, regarding the select a credit card option via the check box(es) 424, a user can select any one or combination of credit card options and then select the evaluate 430 icon so as to cause the system 1 to present an evaluation screen 436 of the selected credit card options. The evaluation screen 436 includes a comparator selection 438 (e.g., a user can select how to make a comparison— side-by-side, total cost, rewards programs, etc.). This screen 436 can present a comparison that evaluates purchase APR, balance transfer APR, grace period for payment, minimum payment calculation, rewards redemption, fees, other features, etc. Any one or combination of these are expandable (e.g., it can be programmed to expand the display and present more detailed information related thereto). For instance, FIG. 75 shows an expanded view for fees (the expanded display including information related to annual fees, balance transfer fees, cash advance fees, foreign transaction fees, late payment fees, returned payment fees, etc.) and other features (the expanded display including travel and emergency assistance, roadside assistance, fraud liability protection, identify theft protection, online account access, paperless statements, etc.). Again, a user can select the next step 428 icon for any of the credit card options to begin the application process. A user can also save this information via the save 392 icon.

Figure 76:
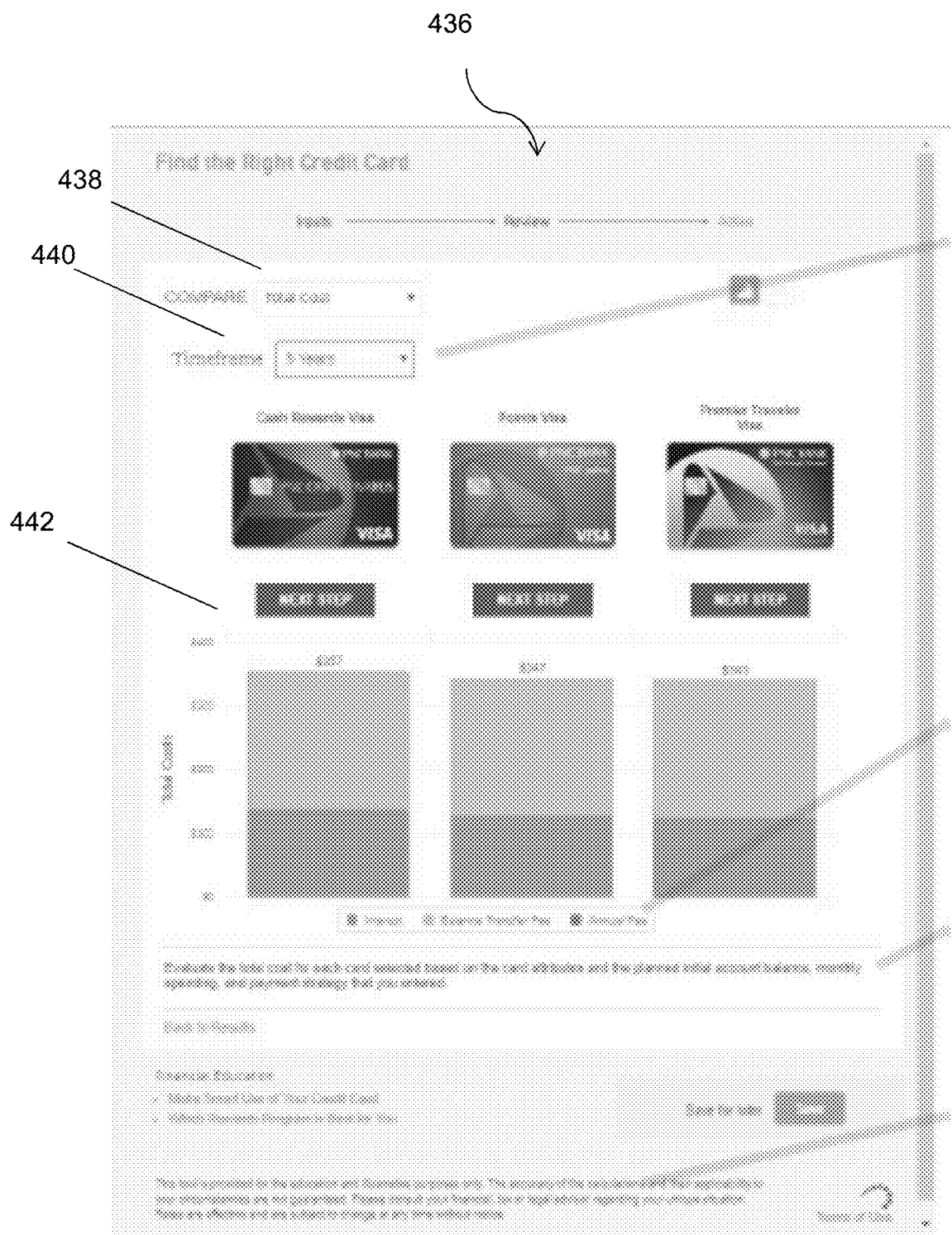

FIG. 76 shows the evaluation screen 436 display in which a user selected total cost from the comparator selection 438. The screen 436 can still present the credit card options in a side-by-side manner but with a focus on total costs (e.g., costs that would be incurred by a user based on the user's inputs and other information acquisitioned by the system 1— credit card attributes, planned initial account balance, anticipated spending and payment habits, etc.) associated with each credit card option. This screen 436 includes a timeframe selector 440 to allow a user to limit the timeframe by which the total costs will be calculated (e.g., 3-months, 6-months, 1-year, 2-years, 3-years, 4-years, 5-years, etc.). The timeframe selection can be by textual input, drop-down menu, etc. In some embodiments, this screen 436 includes a graphical comparison 442 for each credit card option. FIG. 76 shows a graphical comparison 442 as a segmented bar graph that includes interest, balance transfer fees, and annual fees as part of the total costs. As shown in FIG. 76, each of the interest, balance transfer fees, and annual fees is displayed as a segment of the bar for each credit card option.

Figure 77:
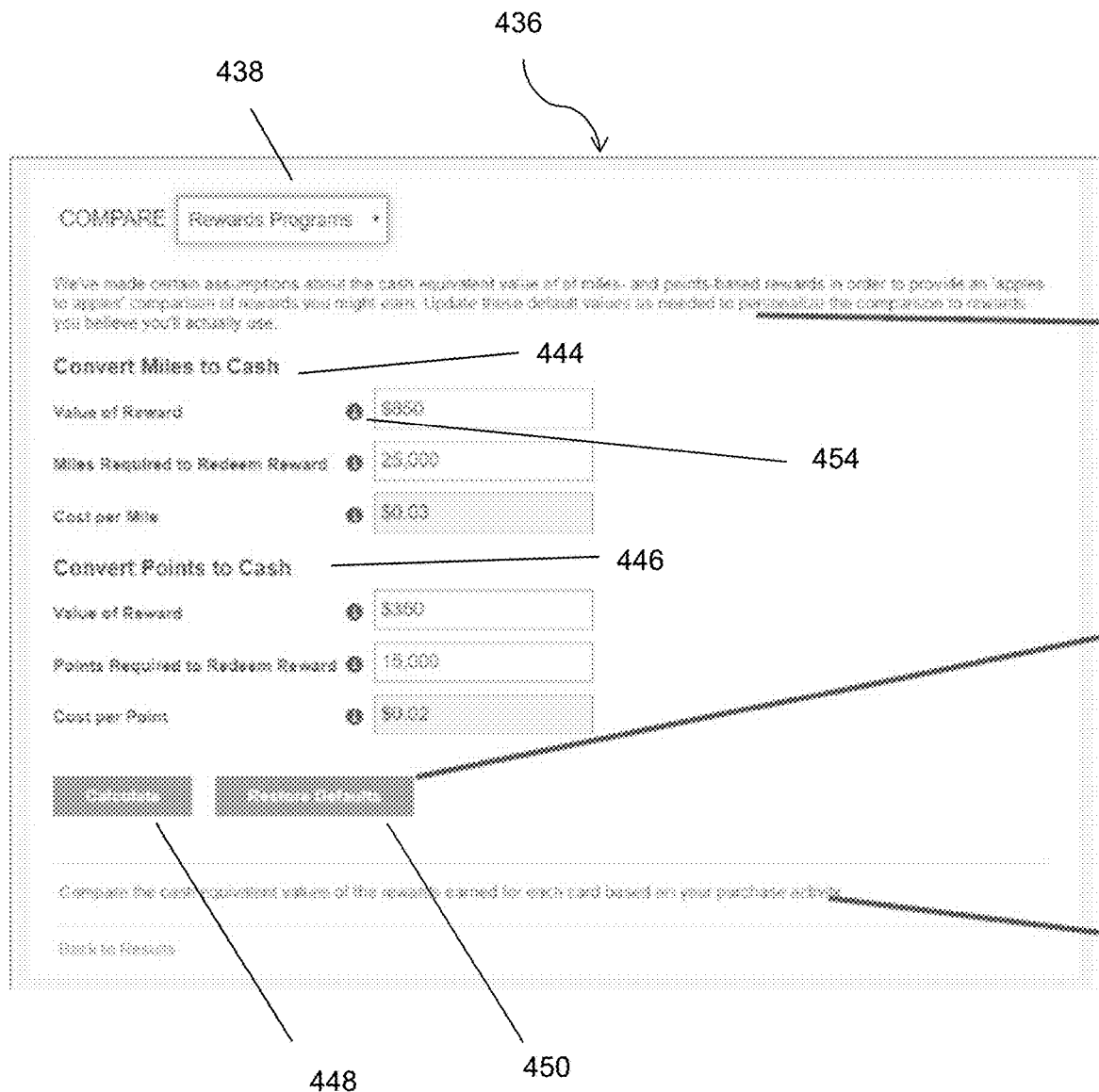
Figure 78:
Figure 79:
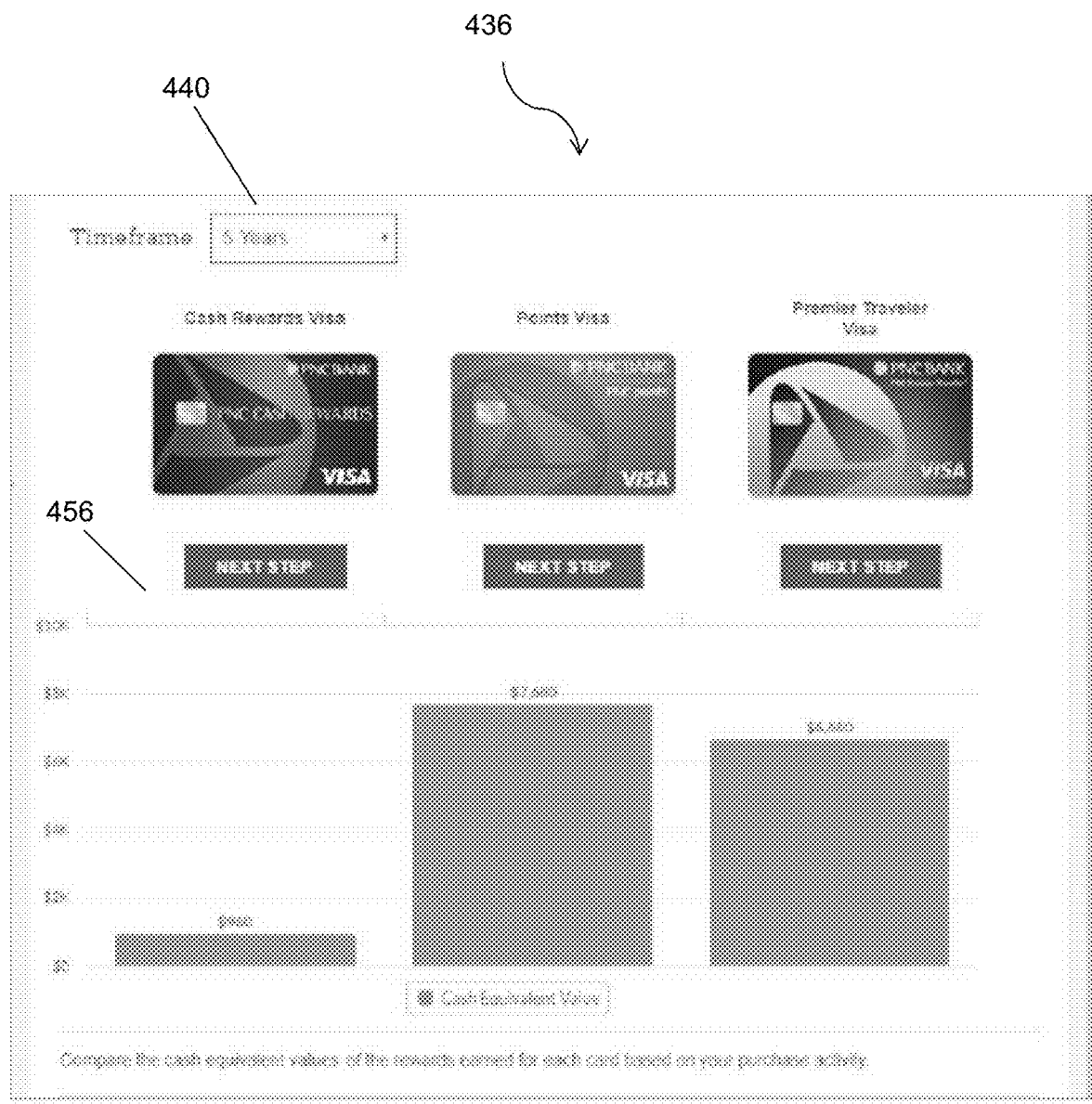

FIG. 77 shows the evaluation screen 436 display in which a user selected rewards programs from the comparator selection 438. The screen 436 can still present the credit card options in a side-by-side manner but with a focus on rewards programs associated with each credit card option. The system 1 can automatically populate information related to rewards programs but allow a user to modify this information (e.g., via textual inputs). The information can include a convert miles to cash section 444 (e.g., value of reward, miles required to redeem reward, cost per mile, etc.) and a convert points to cash section 446 (e.g., value of reward, points required to redeem rewards, cost per point, etc.). A user can select the calculate 448 icon to cause the system 1 to compare cash equivalent values of the rewards to be earned for each credit card option, which can be based in part on user inputs. The results (shown in FIG. 79) can be displayed via a side-by-side bar graph 456, which can be modified via the timeframe icon 440 as described above. A user can also select the restore icon 450 to restore the inputs of the information related to rewards programs to what the system 1 automatically populated them to before the user modified them. In some embodiments, the system 1 can be programmed to display a rewards informational display 452 that provides more detailed explanation for the information related to rewards programs (see FIG. 78). This is generated by clicking any one of the information icons 454.

Figure 80:
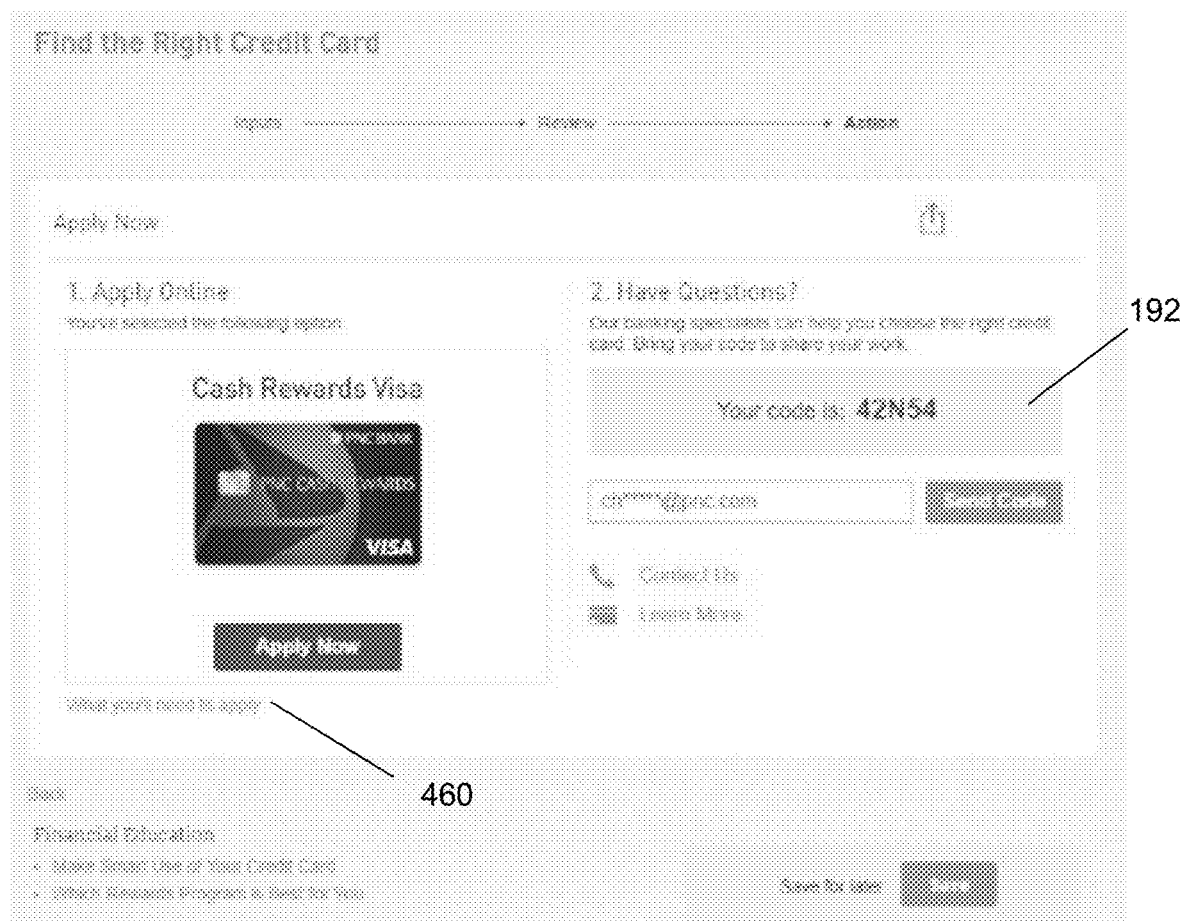
FIGS. 80-82 show an exemplary credit card application display.
Figure 81:
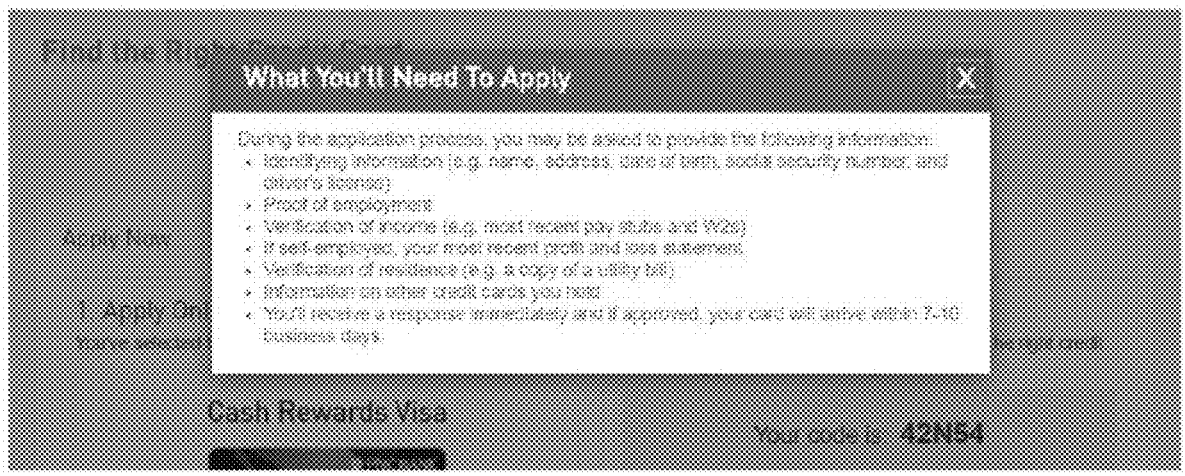
Figure 82:

Referring to FIG. 80, at any time, a user can select the next step 428 icon to begin the application process. Selection of the next step 428 icon causes the system 1 to populate the credit card application screen 458. Again, a user can enter a code 192 or the code 192 can be automatically populated, which will transmit the details of the credit card options to a credit officer, for example. A user can enter their contact information (e.g., email, phone number, etc.) to provide the credit officer the ability to contact them. This screen 458 also includes a what you need to apply icon 460, which, when clicked, populates a window 462 (see FIG. 81) describing the information a user should have at-hand or readily accessible when applying for the credit card. This screen 464 also includes an apply now icon 464, which, when clicked, begins an on-line application process for the selected credit card. For instance, clicking the apply now icon 464 causes the system 1 to display the application screen 466 shown in FIG. 82.

The financing module 110 will be discussed next. As shown in FIG. 83, upon entering the financing module 110, the system 1 directs a user to the financing landing page 468. The financing landing page 468 includes icons related to financing and advice regarding financing collateral debt (e.g., a home, a vehicle, etc.). Exemplary embodiments will describe and illustrate financing for a vehicle, but other types of collateral can be used. The icons can include a PNC Check Ready icon 470, a PNC total auto icon 472, a refinance an existing auto loan icon 474, a buy from a private party icon 476, a buy out a lease icon 478, etc.

Figure 84:
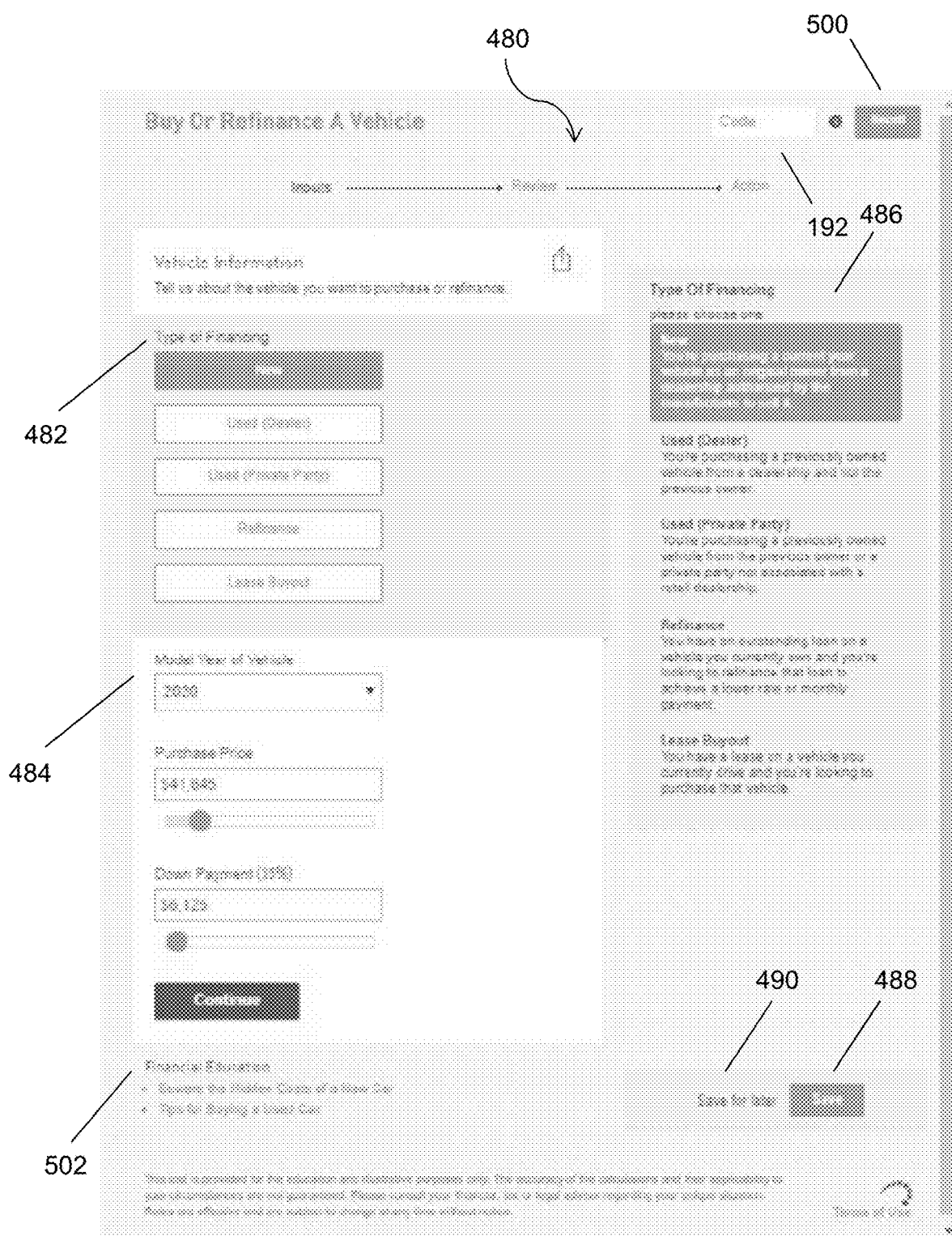
FIGS. 84-90 show an exemplary financing calculator display.
Figure 85:
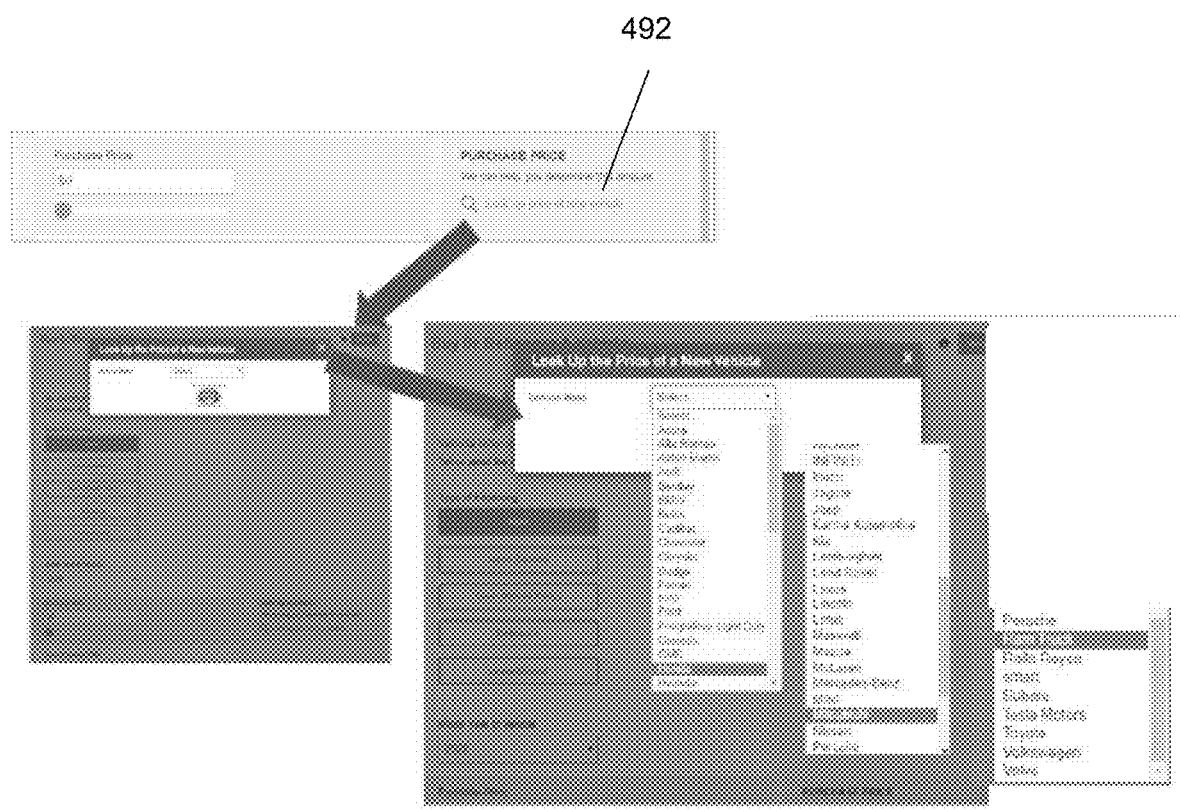
Figure 86:
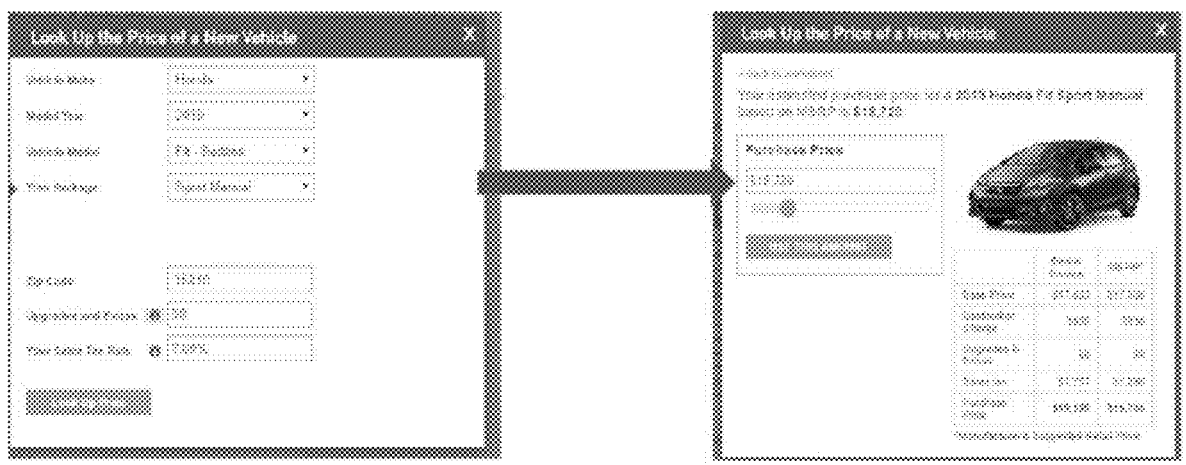
Figure 87:
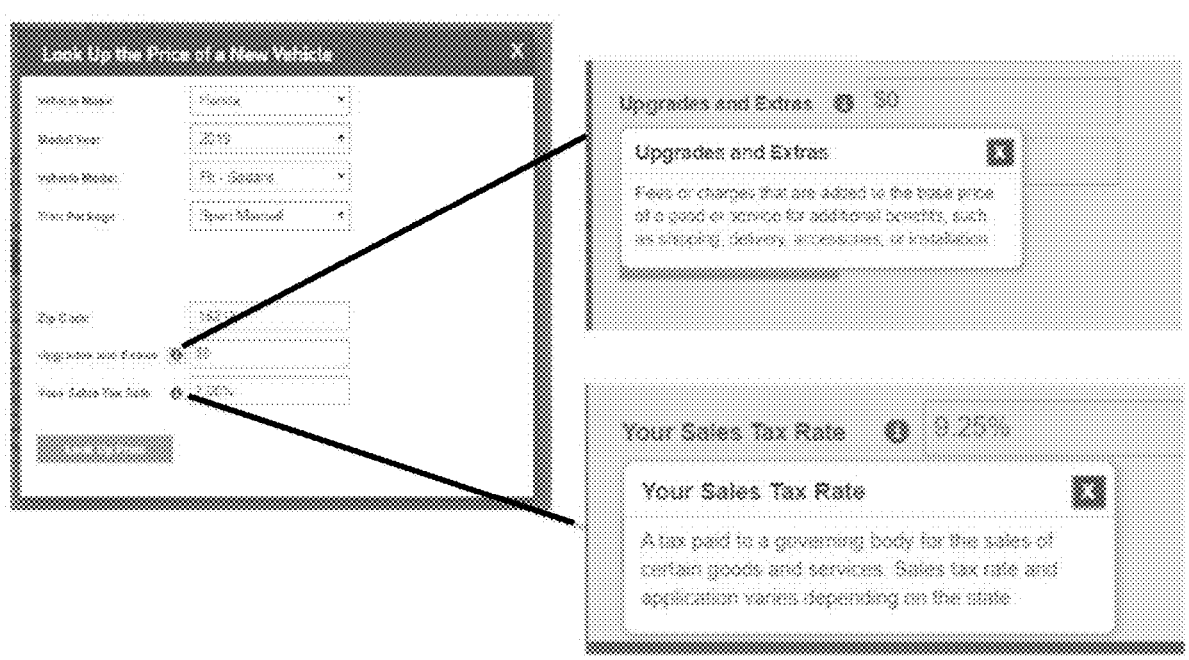

Referring to FIG. 84, clicking the refinance an existing auto loan icon 474, the buy from a private party icon 476, and/or the buy out a lease icon 478 causes the system 1 to generate a financing calculator display 480 that allows a user to begin to enter data for the purposes of financing vehicle. The system 1 is programmed to utilize a financing calculator based on information entered by a user. The data entered can include type of financing 482 (e.g., new vehicle, used vehicle from a dealer, used vehicle from a private party, refinancing an existing auto loan, lease buyout, etc.), vehicle information 484 (e.g., model/year of vehicle, purchase price for the vehicle, down payment for the vehicle, etc.), etc. This information can be entered via textual inputs, selection of icons, drop-down menus, etc. For instance, the purchase price for the vehicle can be entered via textual input if the user knows the price. In the alternative, a user can search for the price via a vehicle price link 492. Selecting the vehicle price link 492 allows a user to search for the price of the vehicle by selecting pertinent information about the vehicle from drop-down menus, and by allowing the system 1 to acquisition data from a third party system (e.g., NADA guides, for example). (See FIGS. 85-87). In some embodiments, the financing calculator display 480 includes a descriptor screen 486 that provides additional information regarding the information identified above. This can be done to assist a user in selecting or entering the correct information. The system 1 is programmed such that the descriptor screen 486 is displayed so as to be juxtaposed with the entered information. In addition, the system 1 is programmed such that when a user selects a certain type of information (e.g., new vehicle) in the information block (or descriptor screen 486), the system 1 automatically highlights the corresponding information (e.g., new vehicle) on the descriptor screen 486 (or primary use information block). At any stage within the financing module 110, a user can save their results via the save 488 icon and/or email their results via the share 490 icon.

It should be noted that clicking the refinance an existing auto loan icon 474, the buy from a private party icon 476, and/or the buy out a lease icon 478 causes the system to generally perform the similar process flows described herein. The information entered and data acquisitioned may be slightly different for each route, but the process flows will be similar. For instance, within the buy out a lease process, the system 1 will request an outstanding lease balance for the leased vehicle (e.g., the amount remaining on the user's existing lease loan), the current monthly payment for the leased vehicle, and/or the interest rate on the current lease loan—questions that may not be presented to a user if going through the refinance an existing auto loan process and/or the buy from a private party process.

Figure 88:
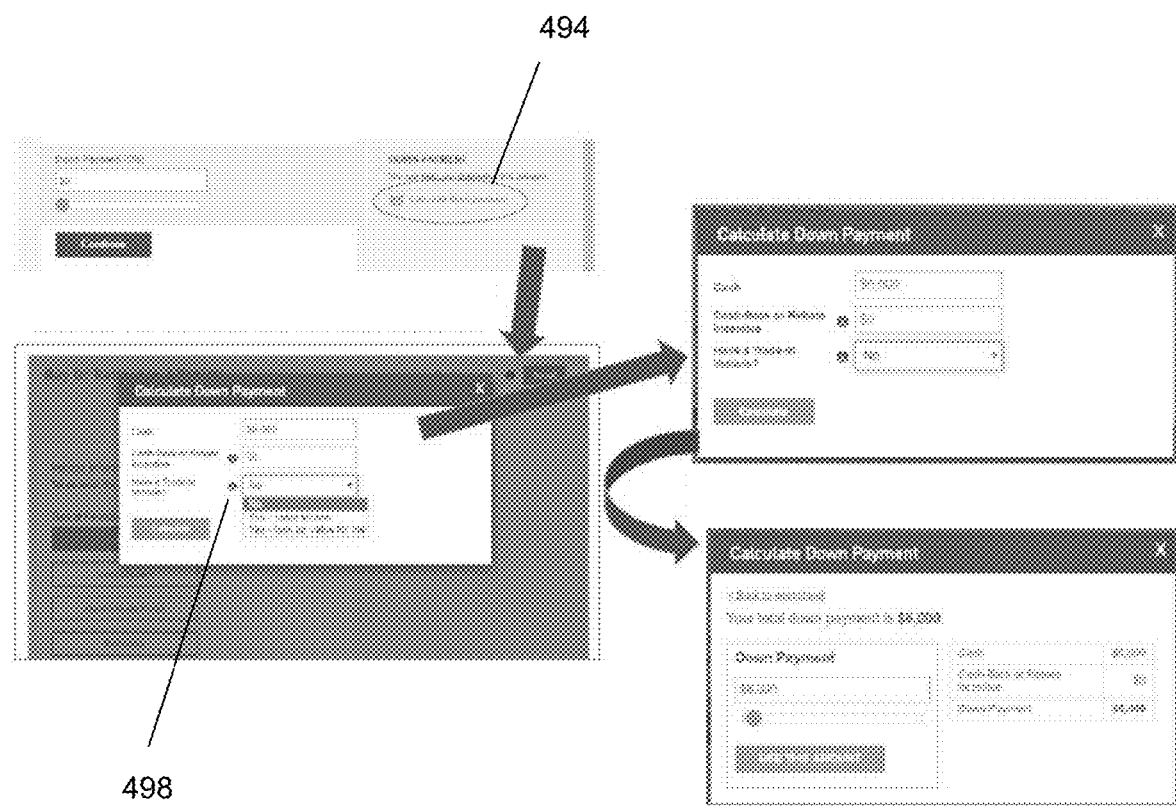
Figure 89:
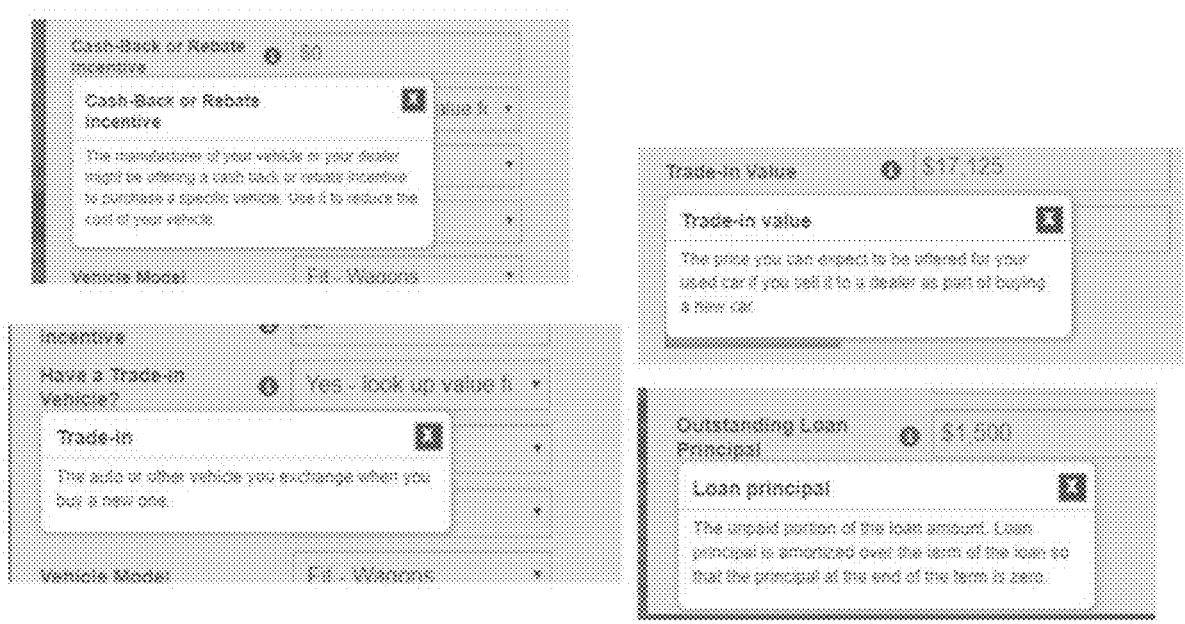

Referring to FIG. 88, a user can enter the down payment for the vehicle or have the system 1 calculate the down payment by selecting the calculate down payment icon 494. Clicking the down payment icon 494 can populate windows allowing a user to enter additional information so as to facilitate the system 1 calculating the down payment. This information can include cash down (e.g., the amount of money being used as money-down), cash-back or rebate incentive (e.g., the amount being received as a rebate or incentive program), whether a trade-in is being used to offset the total cost of the vehicle (e.g., the trade-in value), etc. In some embodiments, the system 1 can be programmed to display an informational display 496 that provides more detailed explanation for the information related to the additional information (see FIG. 89). This is generated by clicking any one of the information icons 498.

Similar to the code 192 described in the other modules, a user can enter a code 192 or the code 192 can be automatically populated, which will transmit the details of the vehicle financing information to a loan officer, for example. A user can enter their contact information (e.g., email, phone number, etc.) to provide the loan officer the ability to contact them. The code 192 can also be used to allow a user to recall their saved information when logging back into the system 1. For instance, a user can select the recall 500 icon and enter their code 192, which will cause the system 1 to display the information a user entered just before logging out of the system 1.

Figure 90:
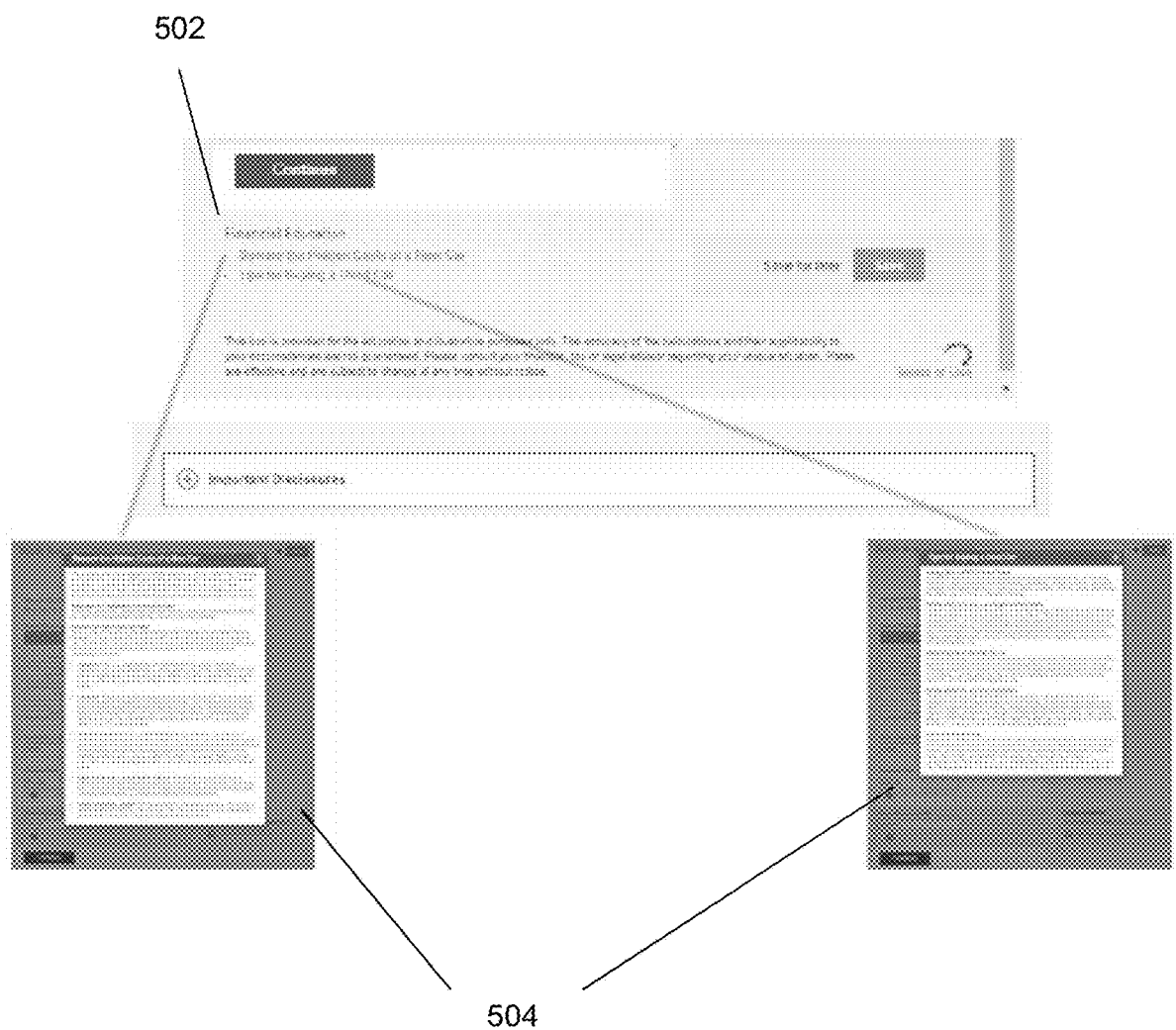

Referring to FIG. 90, in some embodiments, the financing calculator display 480 includes a financial education 502 icon. The financial education 502 icon provides additional information to a user about tips for buying vehicles and general financing advice for the same. This information is presented via pop-up windows 504. For instance, the financial education 502 icon can include a Beware the Hidden Costs of a New Car link that populates a window 504 describing such costs, a Tips for Buying a Used Car link that populates a window 504 describing such tips, a Negotiating a New Vehicle Purchase link that populates a window 504 describing tips for doing so, etc. The presentation of the information in these windows 504 can be tailored for an individual user based on the information entered via the financing module 110.

Figure 91:
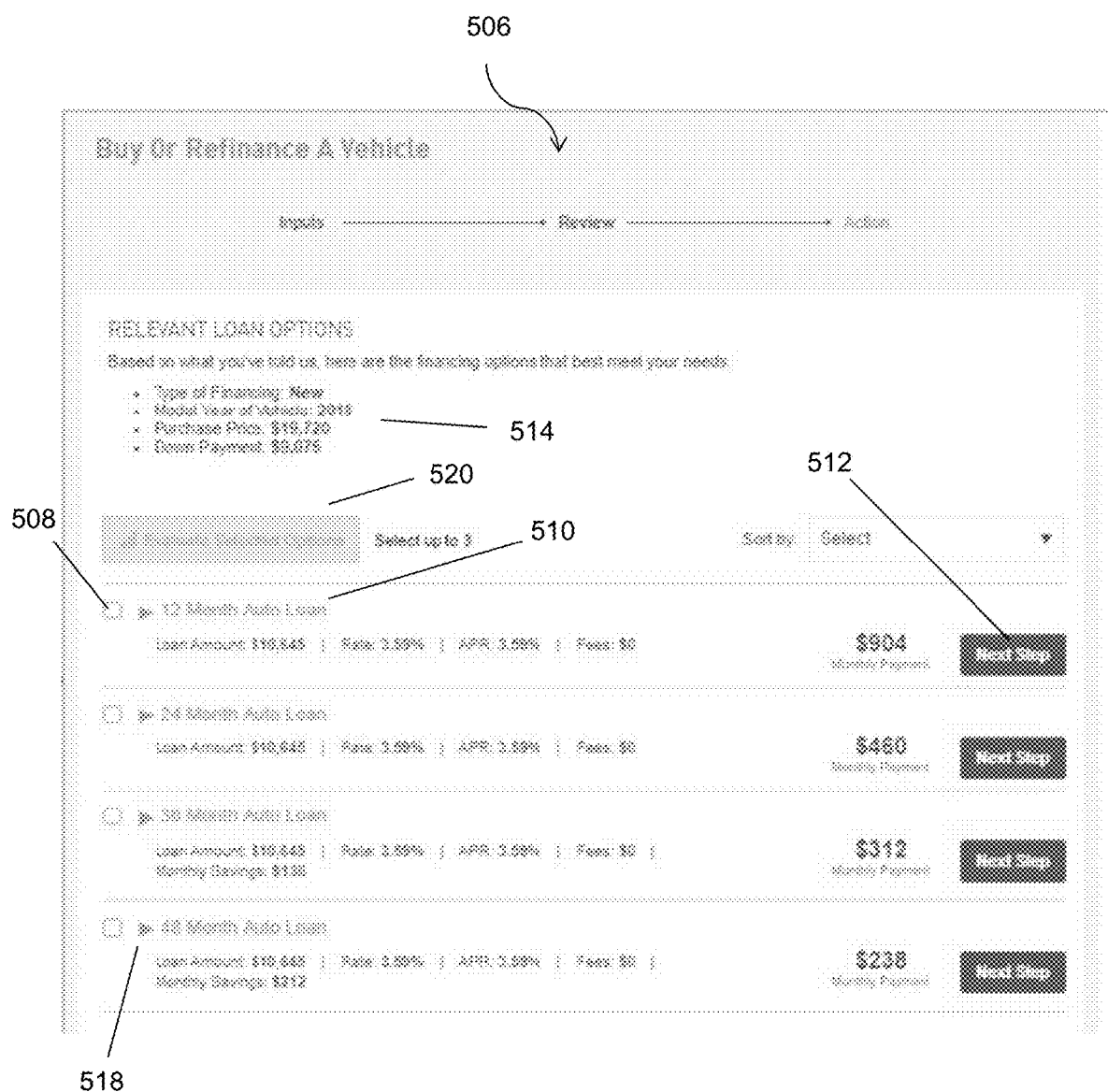
FIGS. 91-99 show an exemplary financing calculator results display.
Figure 93:
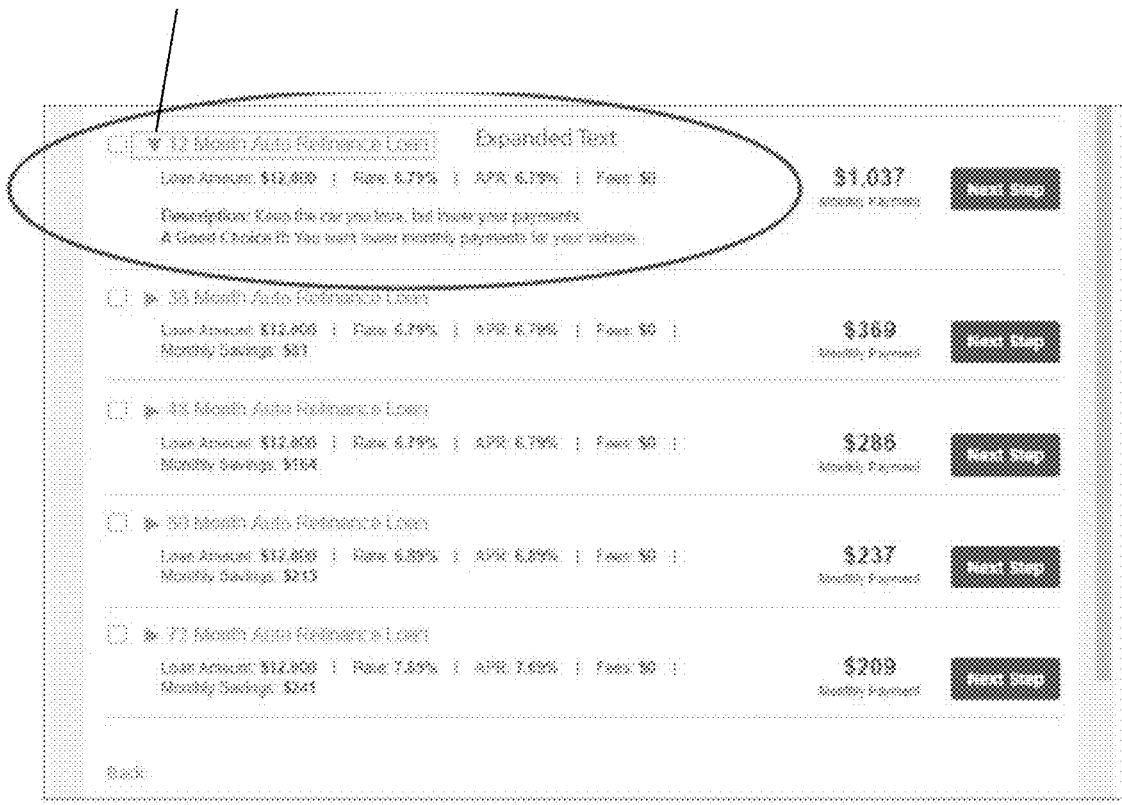
Figure 94:
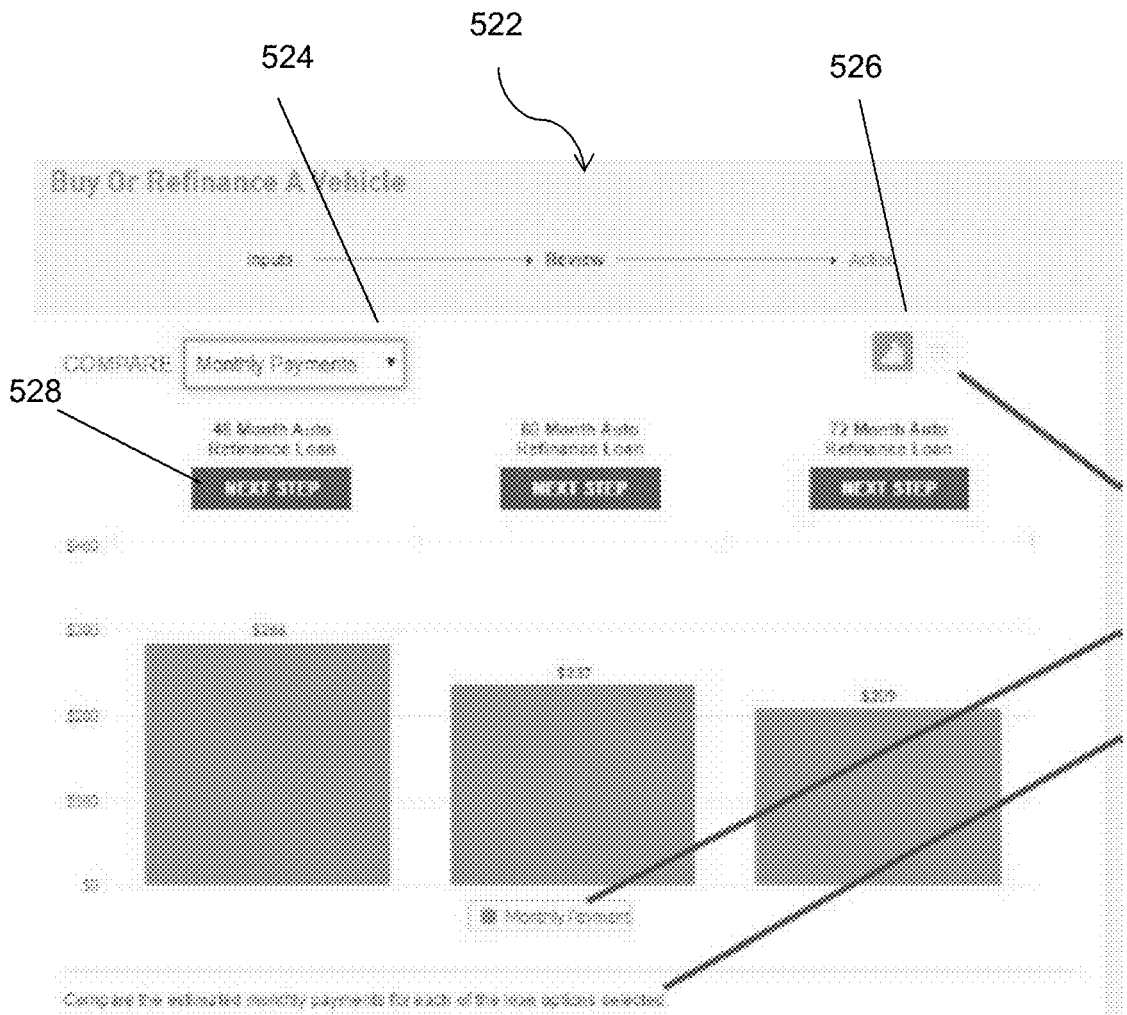
Figure 95:
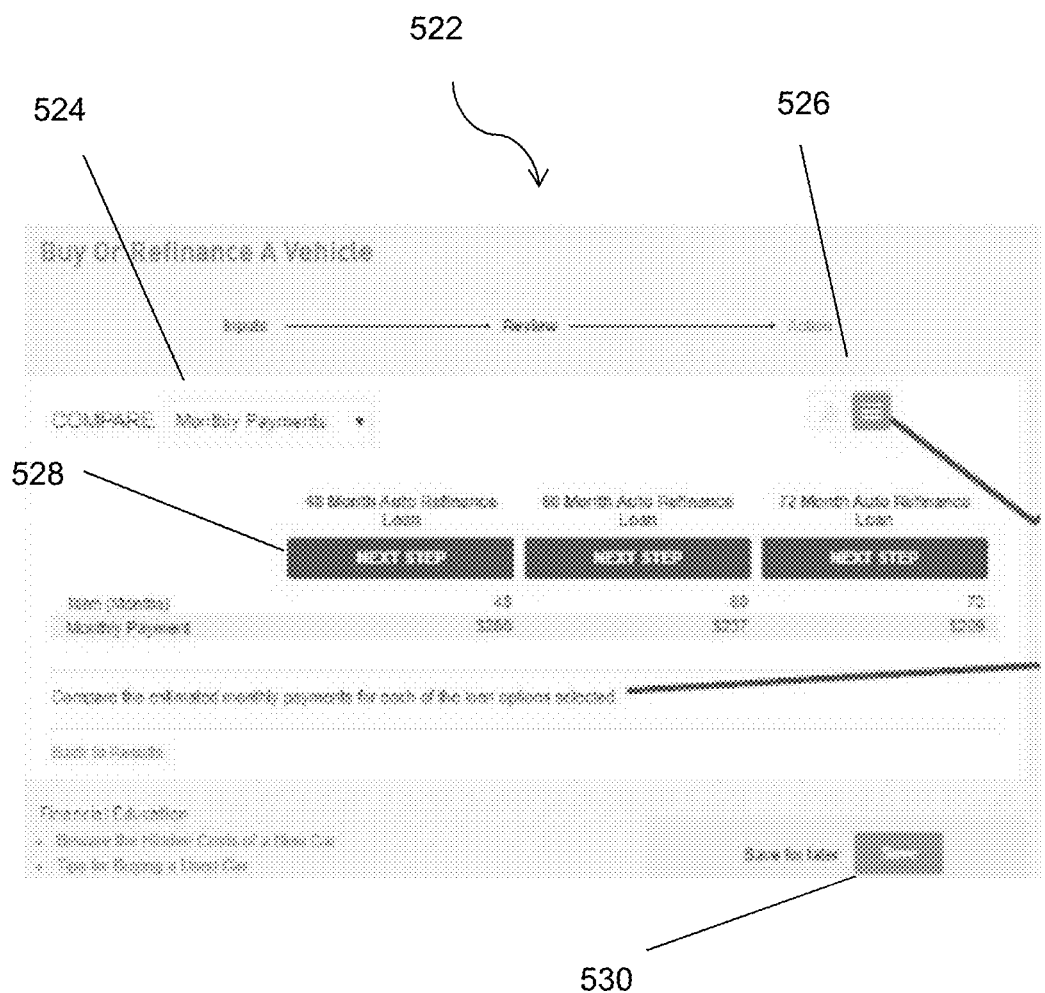

Referring to FIG. 91, the system 1 can be programmed to generate a financing options screen 506 based on the information entered by the user, the data acquisitioned by the system 1, and the calculations made by the system 1. This screen 506 can be generated automatically or upon the user selecting the continue icon. From this screen 506, a user can select a financing option via the check box(es) 508, select the financing option links 510 to obtain additional information about the financing option, and/or select the next step 512 icon to begin the application process. In some embodiments, this screen 506 includes a recommendation banner 514 associated with the financing options presented, informing a user of the most relevant loan features that may be well suited based on the information provided. This screen 506 can also include expansion arrows 518 that, when clicked, inform a user about certain features related to the financing option and provide general advantages and disadvantages associated with that financing option—see FIG. 93.

Figure 92:
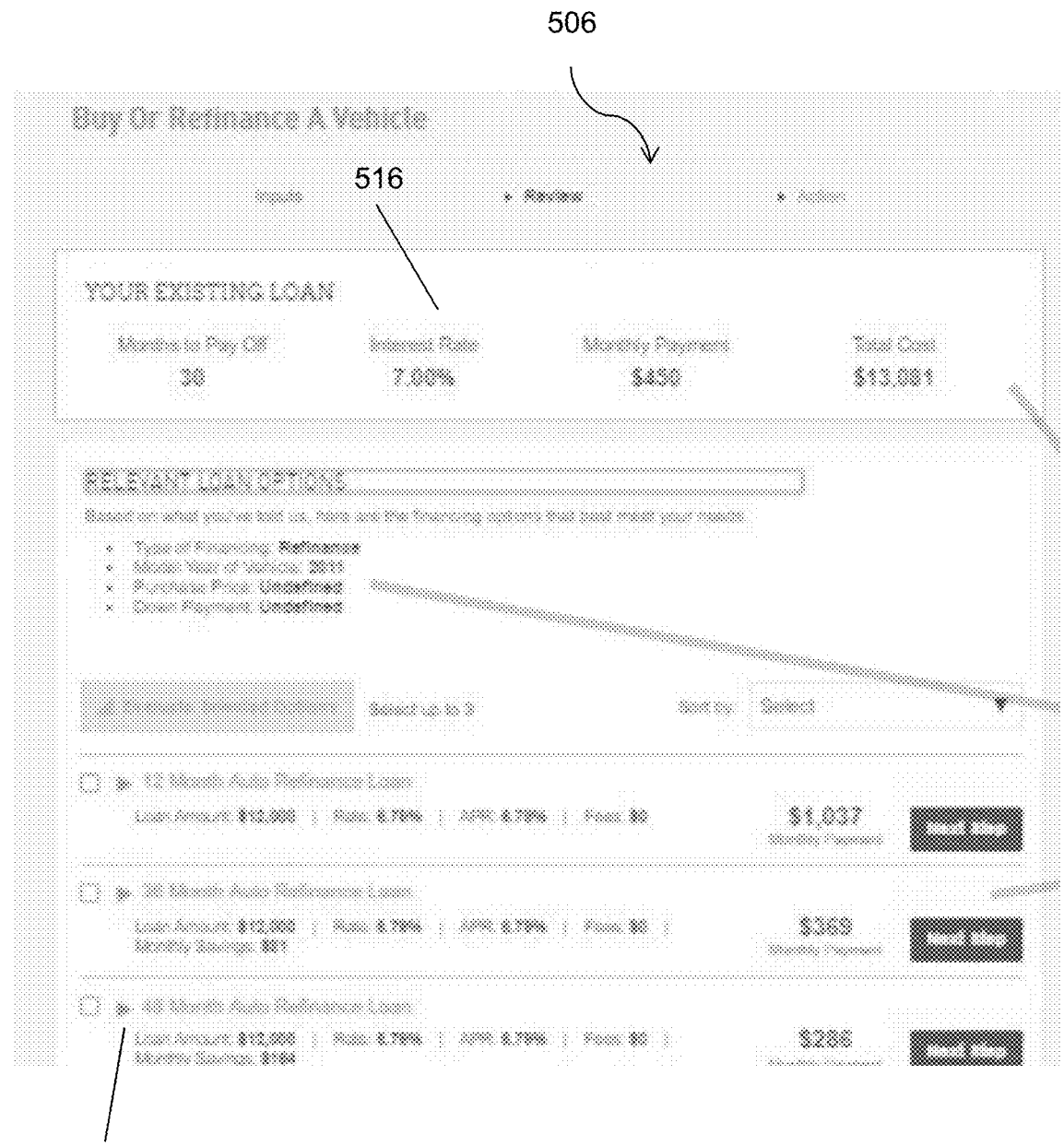

Referring to FIG. 92, as described above, the refinance an existing auto loan process may request and present information in a manner that is different from that of the other financing processes. When a user is going through the refinance an existing auto loan process, the financing options screen 506 can include an existing loan box 516 that provides a user with relevant features (e.g., months to pay off, interest rate, monthly payment, total cost, etc.) of the current lease loan to allow a user to compare the existing loan with that of the financing options generated by the system 1.

Referring to FIGS. 94-98, regarding the select a financing option via the check box(es) 508, a user can select any one or combination of financing options and then select the evaluate 520 icon so as to cause the system 1 to present an evaluation screen 522 of the selected financing options. The evaluation screen 522 includes a comparator selection 524 (e.g., a user can select how to make a comparison—side-by-side, months to pay off, interest rate, monthly payment, total cost, etc.). This screen 522 can present a comparison in graphical format (e.g., bar graph, line graph, etc.—see FIGS. 94, 96, and 97) or tabular format (see FIGS. 95, 98, and 99). IN osme embodiments, a user can toggle between the graphical and tabular formats by selecting the toggle icon 526. Again, a user can select the next step 528 icon for any of the financing options to begin the application process. A user can also save this information via the save 530 icon.

Figure 96:
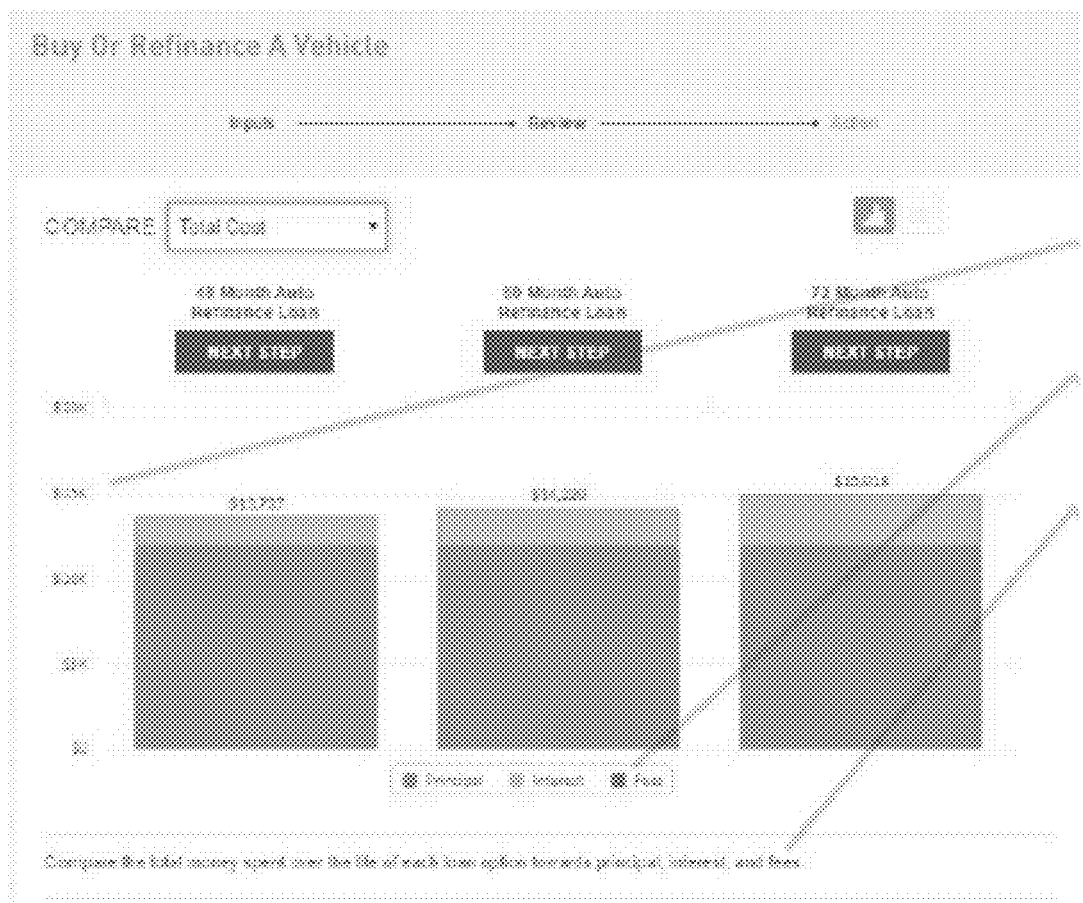
Figure 97:
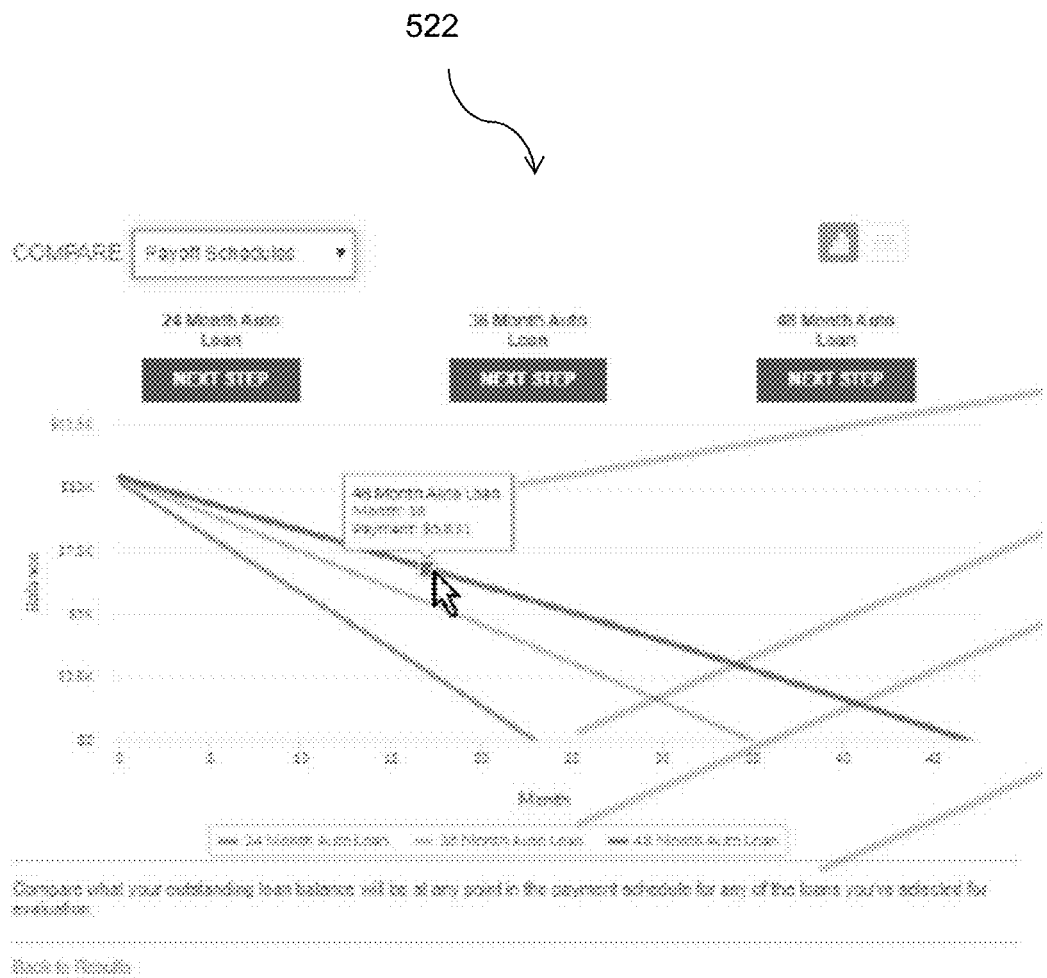
Figure 98:
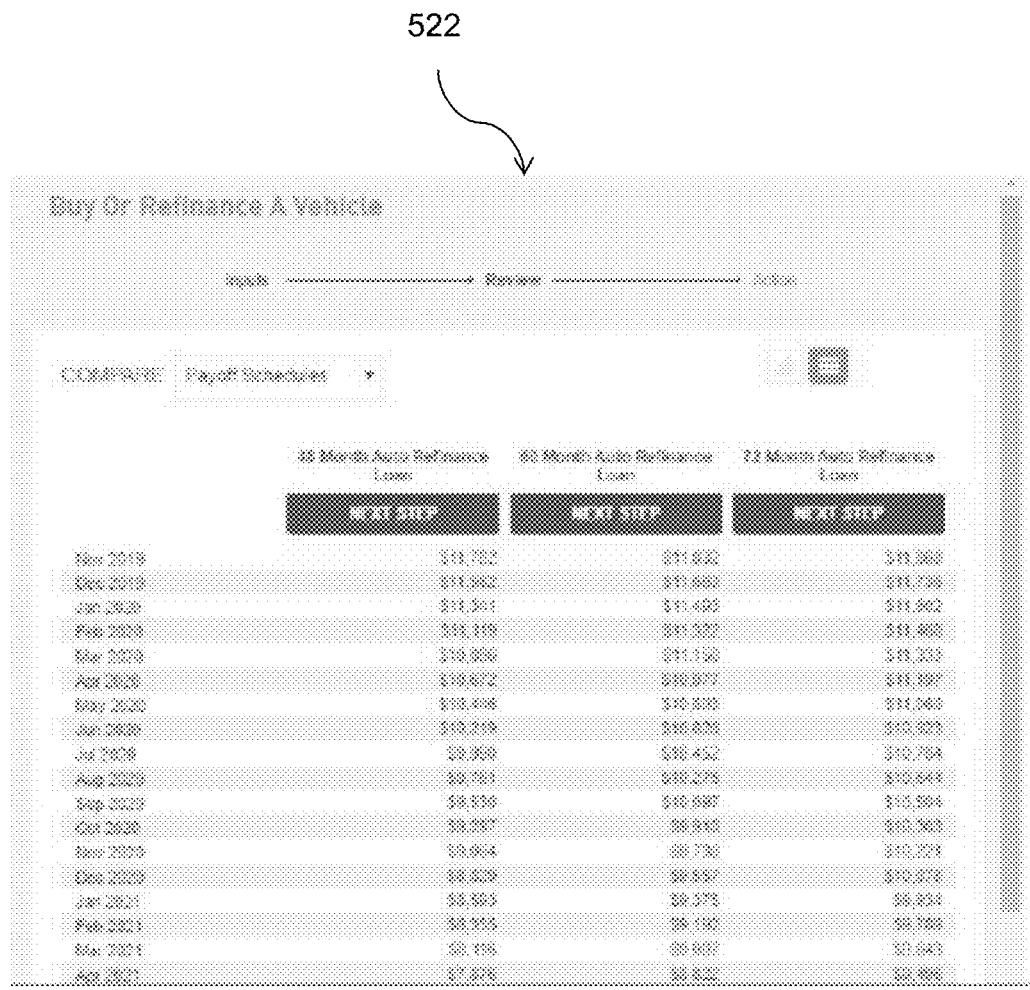
Figure 99:

FIG. 96 shows the evaluation screen 522 display in which a user selected total cost from the comparator selection 524. The screen 522 can still present the financial options in a side-by-side manner but with a focus on total costs (e.g., costs that would be incurred by a user based on the user's inputs and other information acquisitioned by the system 1) associated with each financial option. FIG. 96 shows a graphical comparison as a segmented bar graph that includes principal, interest, and fees as part of the total costs. As shown in FIG. 96, each of the principal, interest, and fees is displayed as a segment of the bar for each financial option. FIG. 97 shows the evaluation screen 522 display in which a user selected payoff schedule from the comparator selection 524. The screen 522 can still present the financial options in a side-by-side manner but with a focus on payoff schedules (e.g., the time it would take to pay off the based on the user's inputs and other information acquisitioned by the system 1) associated with each financial option. FIG. 97 is in a line graph format in which the lines on the graph can be color coded (e.g., each color representing a financial option) to represent a total paid amount over time for each financial option, the outstanding balance over time for each financial option, etc. In addition, or in the alternative, to color coding, each line can be programmed to present a pop-up indicator (e.g., a pop-up text that appears when the line is clicked or when a cursor of a mouse is hovered over it) that informs a user which financial option it represents. FIG. 98 shows the evaluation screen 522 display in which a user selected payoff schedule from the comparator selection 524. The screen 522 can still present the financial options in a side-by-side manner but with a focus on payoff schedules (e.g., the time it would take to pay off the based on the user's inputs and other information acquisitioned by the system 1) associated with each financial option. FIG. 98 is in a tabular format. FIG. 99 shows the evaluation screen 522 display in which a user selected "details" from the comparator selection 524. The screen 522 can still present the financial options in a side-by-side manner but with a focus on certain financial option details (e.g., interest rate, APR, term, discount for automatic debit, fees, maximum loan to value ratio, minimum loan amount, etc.) associated with each financial option. FIG. 99 is in a tabular format.

Figure 100:
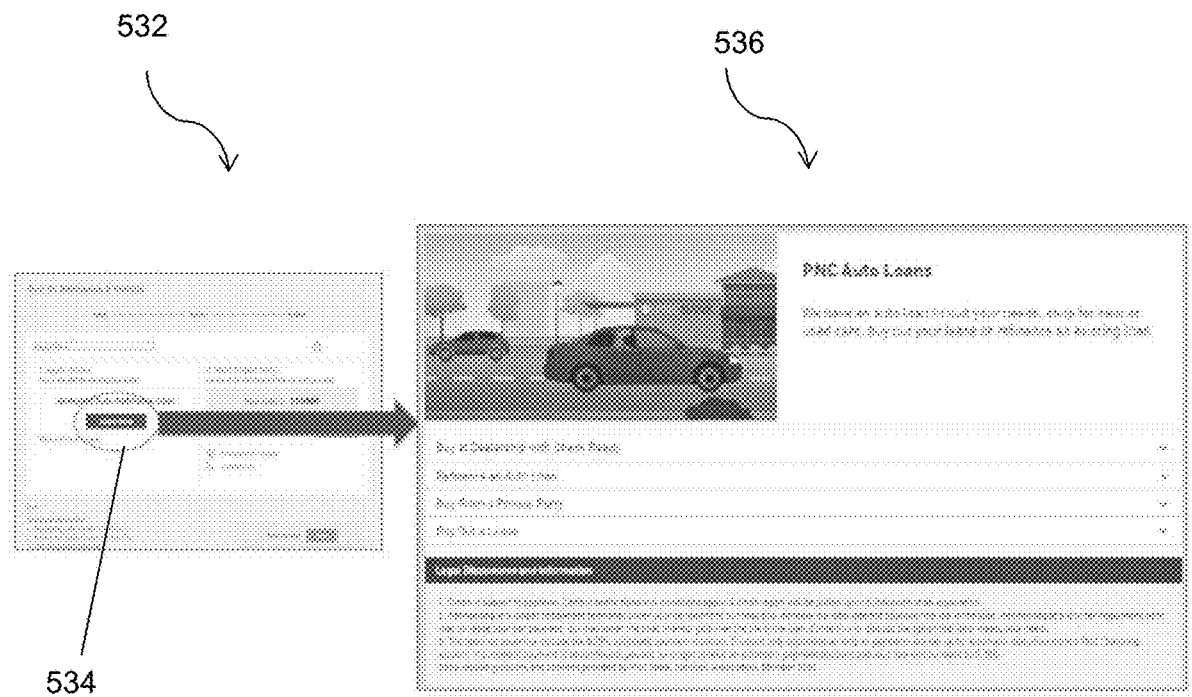
FIG. 100 shows an exemplary financing application display.

Referring to FIG. 100, at any time, a user can select the next step 512 icon to begin the application process. Selection of the next step 512 icon causes the system 1 to populate the financing application screen 532. Again, a user can enter a code 192 or the code 192 can be automatically populated, which will transmit the details of the financial options to a loan officer, for example. A user can enter their contact information (e.g., email, phone number, etc.) to provide the loan officer the ability to contact them. This screen 532 also includes an apply now icon 534, which, when clicked, begins an on-line application process for the selected financing option. For instance, clicking the apply now icon 534 causes the system 1 to display the application screen 536 shown in FIG. 100.

The methods and systems disclosed herein provide for a specifically configured system 1 and process to cause system components to interface via a centrally accessed platform (embodied by the system architecture described above) for information dissemination and activities delegation. This is achieved by a specific coordination of activities performed by a client device 3, a host system 2, one or more servers 15, 17, 19, and a communication network 7, 33, 35. In addition, a graphical user interface (GUI) having a plurality of actuatable icons facilitate access to these components to automatically acquisition and present pertinent data based on a multitude of factors and variables, wherein the interaction with the actuatable icons simultaneously and automatically delegates tasks to the various system components. One of the benefits of the system 1 and method is to quickly and accurately evaluate the various financial solution products, select an appropriate solution(s), and coordinate activities between parties to secure financing that is the best solution (s). The way in which information is displayed via the system 1 and how the system 1 is interacted with by a user(s) to simultaneously delegate activities controlled by the system 1 provides one of the technical improvements over existing systems. The specific interfacing and interactive GUIs facilitate a centrally accessed platform for automatically acquisitioning and presenting the pertinent data based on a multitude of factors and variables, wherein the interaction with the GUIs automatically delegates tasks to the various system components. This facilitates dynamically calculating multiple financial solution products and presenting them to a user.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Although the invention is illustrated and described herein with reference to specific embodiments, the invention is not intended to be limited to the details shown. Rather, various modifications may be made in the details within the scope and range equivalents of the claims and without departing from the invention, as will be appreciated by one skilled in the art.

We claim:

1. A communication system comprising:
a centrally accessed platform including a host system, a server, a database, a plurality of third party computer devices, and a communication network;
a client device in communication with the host system; and
a loan officer device in communication with the host system;
wherein:
each third party computer device includes data that is disparate from another third party computer device;
the host system is configured transmit data to the client device and generate a graphical user interface (GUI), the GUI including a field to receive a user-defined goal associated with borrowing money to consolidate a plurality of debts held by the user, the GUI further including an operating module to facilitate data entry to the host system by a user via the client device and data retrieval by the host system from the database and the plurality of third party computer devices, the data including a total consolidated debt comprising the plurality of debts held by the user, the data being stored in memory of the host system, wherein the host system is configured to generate a code or receive a code via the client device, and the code is configured to recall, via the client device and the loan officer device, the data stored in memory of the host system;
the operating module is configured to perform steps including:
generating a financial solution for borrowing money to consolidate the plurality of debts, the financial solution comprising a plurality of financial solution products dynamically calculated based on data entered and data retrieved, the financial solution presented to the user via the client device, each financial solution product associated with the user-defined goal, wherein the presentation provides the user with access to the plurality of financial solution products;
generating an itemized debt table including the plurality of debts and the plurality of financial solution products;
provide the user a selection object to select at least one financial solution product from the plurality of financial solution products;
generating, for each of the selected financial solution products, an itemized debt confirmation window that includes a debt summary table, an expected payoff date, and the overall interest the user will pay if the user makes the monthly payments to satisfy the total consolidated debt;
generating a financial solution product application display, allowing the user of the client device to apply for any one or combination of the selected financial solution products within the itemized debt confirmation window by transmitting details of the any one or combination of the selected financial solution product to the loan officer device and;

displaying to the user the itemized debt confirmation window and the financial solution product application display.

2. The communication system of claim 1, wherein the operating module is programmed to provide the user an option to enter the plurality of debts as a whole debt amount.

3. The communication system of claim 1, wherein the operating module is programmed to provide the user an option to enter the plurality of debts as itemized debt amounts.

4. The communication system of claim 3, wherein the operating module is programmed to generate an itemized debt window to assist the user with entering the plurality of debts as itemized debt amounts by providing a loan type drop-down box, allowing the user to select a loan type and enter an associated debt amount for the loan type, an associated annual percentage rate for the loan type, and an associated monthly payment for the loan type.

5. The communication system of claim 4, wherein the itemized debt window includes an X icon configured to allow the user to delete any one or combination of loan types.

6. The communication system of claim 4, wherein the operating module is programmed to utilize a debt consolidation calculator to determine a total amount of debt to be consolidated.

7. The communication system of claim 6, wherein the itemized debt confirmation window includes a calculated total debt amount, a calculated monthly payment for the calculated total debt amount, and a calculated effective interest rate for the calculated total debt amount.

8. The communication system of claim 1, wherein the plurality of financial solution products is presented as a side-by-side comparison.

9. The communication system of claim 8, wherein:
the side-by-side comparison includes a "goal" criteria selector, the criteria including paying off debt more quickly and/or minimizing monthly payments; and
the goal criteria selector, when actuated, reconfigures the side-by-side comparison in accordance with the goal criteria.

10. The communication system of claim 8, wherein the side-by-side comparison is in tabular format.

11. The communication system of claim 8, wherein the side-by-side comparison is in graphical format.

12. The communication system of claim 11, wherein the graphical format includes an interactive line graph.

13. The communication system of claim 12, wherein the interactive line graph is configured to generate a text box when a curser is hovered over the line.

14. A method for providing a centrally accessed platform for providing financial solution products, the method comprising:
forming a centrally accessed platform comprising a host system, a server, a database, a plurality of third party computer devices, and a communication network, wherein each third party computer device includes data that is disparate from another third party computer device;
placing a client device in communication with the host system;
placing a loan officer device in communication with the host system;
transmitting data from the host system to the client device and generate a graphical user interface (GUI), the GUI including a field to receive a user-defined goal associated with borrowing money to consolidate a plurality of debts held by the user, the GUI further including an operating module to facilitate data entry to the host system by a user via the client device and data retrieval by the host system from the database and the plurality of third party computer devices, the data including a total consolidated debt comprising the plurality of debts held by the user, the data being stored in memory of the host system, wherein the host system is configured to generate a code or receive a code via the client device, and the code is configured to recall, via the client device and the loan officer device, the data stored in memory of the host system; and
the operating module:
generating a financial solution for borrowing money to consolidate the plurality of debts, the financial solution comprising a plurality of financial solution products dynamically calculated based on data entered and data retrieved, the financial solution presented to the user via the client device, each financial solution product associated with the user-defined goal, wherein the presentation provides the user with access to the plurality of financial solution products;
generating an itemized debt table including the plurality of debts and the plurality of financial solution products;
providing the user a selection object to select at least one financial solution product from the plurality of financial solution products;
generating, for each of the selected financial solution products, an itemized debt confirmation window that includes a debt summary table, an expected payoff date, and the overall interest the user will pay if the user makes the monthly payments to satisfy the total consolidated debt;
generating a financial solution product application display, allowing the user of the client device to apply for any one or combination of the selected financial solution products within the itemized debt confirmation window by transmitting details of the any one or combination of the selected financial solution product to the loan officer device; and
displaying to the user the itemized debt confirmation window and the financial solution product application display.

15. The method of claim 14, further comprising:
providing the user an option to enter the plurality of debts as a whole debt amount.

16. The method of claim 14, further comprising:
providing the user an option to enter the plurality of debts as itemized debt amounts.

17. The method of claim 16, further comprising:
generating an itemized debt window to assist the user with entering the plurality of debts as itemized debt amounts by providing a loan type drop-down box, allowing the user to select a loan type and enter an associated debt amount for the loan type, an associated annual percentage rate for the loan type, and an associated monthly payment for the loan type.

18. The method of claim 17, further comprising:
utilizing a debt consolidation calculator to determine a total amount of debt to be consolidated.

19. The method of claim 14, further comprising:
presenting the plurality of financial solution products as a side-by-side comparison.

20. The method of claim 19, further comprising:
presenting the side-by-side comparison in a tabular format and/or a graphical format.

\* \* \* \* \*